US011914317B2

(12) United States Patent
Kamiya et al.

(10) Patent No.: US 11,914,317 B2
(45) Date of Patent: Feb. 27, 2024

(54) IMAGE FORMING APPARATUS INCLUDING FIXING LIQUID SPRAYING DEVICE AND COLLECTING DEVICE

(71) Applicant: BROTHER KOGYO KABUSHIKI KAISHA, Nagoya (JP)

(72) Inventors: Masataka Kamiya, Owariasahi (JP); Yutaka Kakigahara, Nagoya (JP); Satoshi Murata, Nagoya (JP); Takashi Shimizu, Nagoya (JP); Koya Morimoto, Nagoya (JP); Masamitsu Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/935,963

(22) Filed: Sep. 28, 2022

(65) Prior Publication Data

US 2023/0020065 A1 Jan. 19, 2023

Related U.S. Application Data

(63) Continuation of application No. PCT/JP2021/012208, filed on Mar. 24, 2021.

(30) Foreign Application Priority Data

Mar. 31, 2020 (JP) ................................ 2020-063473
Mar. 31, 2020 (JP) ................................ 2020-063629
(Continued)

(51) Int. Cl.
*G03G 15/20* (2006.01)
*G03G 21/16* (2006.01)
*G03G 21/18* (2006.01)

(52) U.S. Cl.
CPC ..... *G03G 15/2096* (2013.01); *G03G 21/1676* (2013.01); *G03G 21/1814* (2013.01); *G03G 2221/163* (2013.01)

(58) Field of Classification Search
CPC ........... G03G 15/2096; G03G 21/1676; G03G 21/1814; G03G 2221/163
See application file for complete search history.

(56) References Cited

U.S. PATENT DOCUMENTS

2011/0217099 A1 9/2011 Sasamoto et al.
2014/0119796 A1 5/2014 Priebe et al.
(Continued)

FOREIGN PATENT DOCUMENTS

JP 2011-185972 A 9/2011
JP 2011-197140 A 10/2011
(Continued)

OTHER PUBLICATIONS

International Search Report issued in PCT/JP2021/012208, dated Jun. 15, 2021.
(Continued)

*Primary Examiner* — Sophia S Chen
(74) *Attorney, Agent, or Firm* — Merchant & Gould P.C.

(57) ABSTRACT

An image forming apparatus includes a photosensitive drum, a developing device configured to supply toner onto the photosensitive drum, a transfer device configured to transfer the toner supplied onto the photosensitive drum onto a sheet, a spraying device configured to spray a fixing liquid toward the sheet onto which the toner has been transferred, the spraying device including a housing configured to accommodate the fixing liquid and nozzles configured to spray the fixing liquid inside the housing, and a collecting device configured to collect the fixing liquid sprayed from the nozzles and did not adhere to the sheet. The collecting
(Continued)

device includes a collection tray configured to accommodate the fixing liquid, a collection pipe connected to the collection tray and configured to allow the fixing liquid in the collection tray to pass therethrough, and a collection pump configured to send the fixing liquid in the collection pipe toward the housing.

20 Claims, 27 Drawing Sheets

(30) Foreign Application Priority Data

Mar. 31, 2020 (JP) ................................ 2020-063635
Sep. 3, 2020 (JP) ................................ 2020-148581

(56) References Cited

U.S. PATENT DOCUMENTS

| | | | |
|---|---|---|---|
| 2014/0205337 | A1 | 7/2014 | Notoya |
| 2018/0217543 | A1 | 8/2018 | Kakigahara et al. |
| 2019/0391517 | A1 | 12/2019 | Kakigahara et al. |
| 2021/0011407 | A1 | 1/2021 | Murata et al. |
| 2021/0302861 | A1* | 9/2021 | Mori .................. G03G 15/6558 |

FOREIGN PATENT DOCUMENTS

| | | | |
|---|---|---|---|
| JP | 2012-2848 | A | 1/2012 |
| JP | 2012-189668 | A | 10/2012 |
| JP | 2014-142381 | A | 8/2014 |
| JP | 2016-129956 | A | 7/2016 |
| JP | 2017-68103 | A | 4/2017 |
| JP | 2017-167245 | A | 9/2017 |
| JP | 2017-167255 | A | 9/2017 |
| JP | 2017-167256 | A | 9/2017 |
| JP | 2019-179147 | A | 10/2019 |
| JP | 2020-160277 | A | 10/2020 |

OTHER PUBLICATIONS

International Preliminary Report on Patentability issued in related international application PCT/JP2021/012208, dated Sep. 29, 2022.

* cited by examiner

IMAGE FORMING APPARATUS INCLUDING FIXING LIQUID SPRAYING DEVICE AND COLLECTING DEVICE

REFERENCE TO RELATED APPLICATIONS

This is a Continuation of International Application No. PCT/JP2021/012208 filed on Mar. 24, 2021, which claims priorities from Japanese Patent Application No. 2020-063473, Japanese Patent Application No. 2020-063629 and Japanese Patent Application No. 2020-063635 which were filed on Mar. 31, 2020, and Japanese Patent Application No. 2020-148581 which was filed on Sep. 3, 2020. The entire disclosures of the prior applications are incorporated herein by reference.

BACKGROUND ART

The present disclosure relates to an image forming apparatus.

Conventionally, an image forming apparatus includes a photosensitive drum, a developing device, a transfer device, a jetting device, and a collection tray. The jetting device jets fixing liquid for fixing toner to a sheet toward the sheet to which the toner has been transferred. The collection tray accommodates the fixing liquid that has not adhered to the sheet.

DESCRIPTION

In the conventional image forming apparatus, there is a need to collect the fixing liquid accumulated in the collection tray.

According to aspects of the present disclosure, there is provided an image forming apparatus including a photosensitive drum, a developing device, a transfer device, a spraying device, and a collecting device.

The developing device is configured to supply toner onto the photosensitive drum. The transfer device is configured to transfer the toner supplied onto the photosensitive drum onto a sheet. The spraying device is configured to spray a fixing liquid for fixing the toner onto the sheet toward the sheet onto which the toner has been transferred. The spraying device includes a housing and nozzles. The housing is configured to accommodate the fixing liquid. The nozzles are configured to jet the fixing liquid inside the housing.

The collecting device is configured to collect the fixing liquid sprayed from the nozzles and did not adhere to the sheet. The collecting device includes a collection tray, a collection pipe, and a collection pump. The collection tray is configured to accommodate the fixing liquid. The collection pipe is connected to the collection tray and is configured to allow the fixing liquid in the collection tray to pass therethrough. The collection pump is configured to send the fixing liquid in the collection pipe toward the housing.

According to such configuration, the fixing liquid sprayed from the nozzles and not adhered to the sheet can be accommodated in the collection tray and sent to the housing through the collection pipe.

Therefore, the fixing liquid that has not adhered to the sheet can be collected and sprayed from the nozzles again.

As a result, consumption of the fixing liquid can be suppressed.

FIRST EMBODIMENT

An image forming apparatus according to a first embodiment of the present invention will be described in detail with reference to FIGS. 1 to 6.

Figure 1:
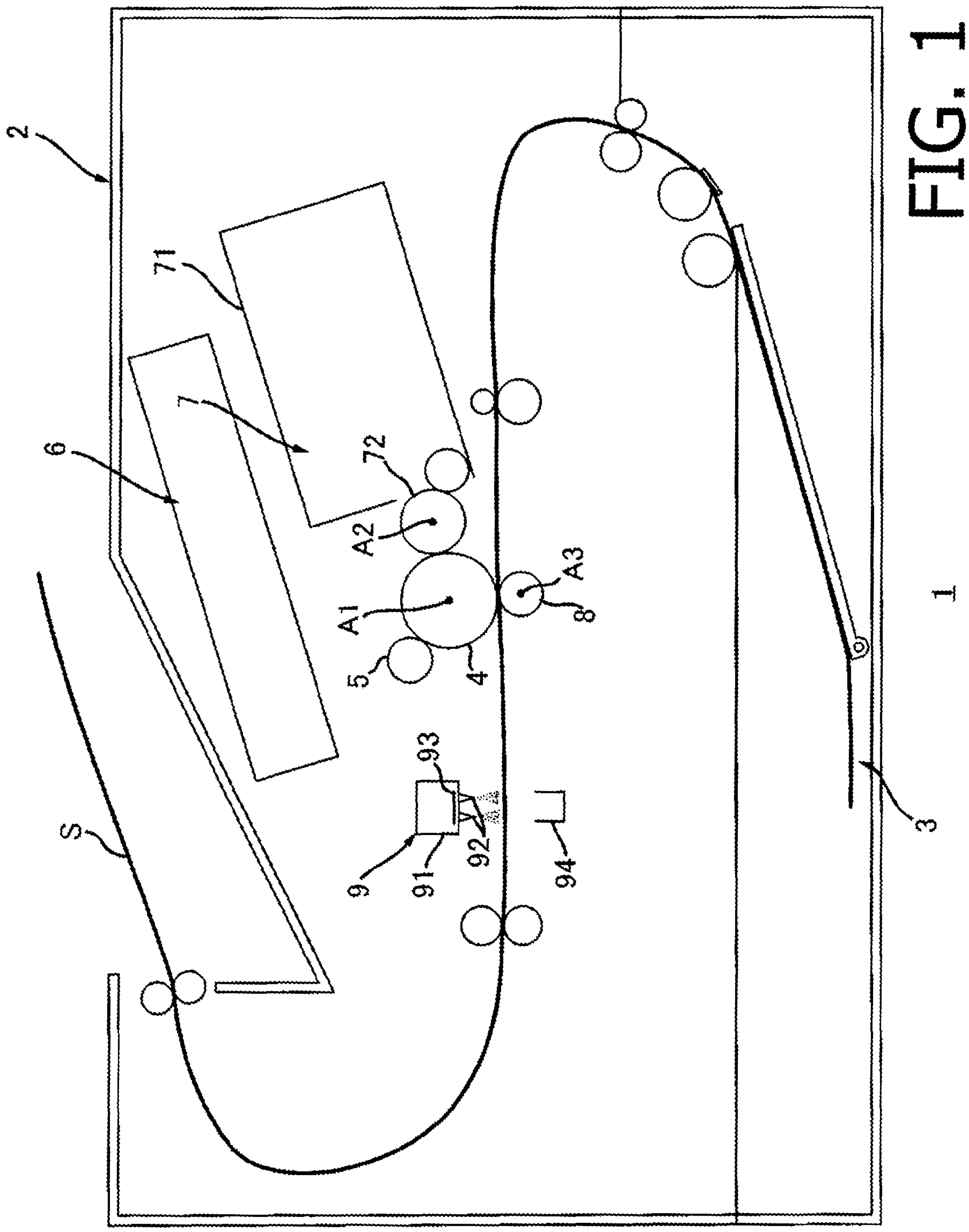
FIG. 1 is a diagram showing a schematic configuration of an image forming apparatus according to a first embodiment of the present invention.

An outline of the image forming apparatus 1 will be described with reference to FIG. 1.

The image forming apparatus 1 includes a main body housing 2, a sheet cassette 3, a photosensitive drum 4, a charger 5, an exposure device 6, a developing device 7, a transfer device 8, and a jetting device 9.

The main body housing 2 accommodates the sheet cassette 3, the photosensitive drum 4, the charger 5, the exposure device 6, the developing device 7, the transfer device 8, and the jetting device 9.

The sheet cassette 3 can accommodate sheets S. The sheet S is, for example, printing paper. The sheet S is conveyed toward the photosensitive drum 4.

The photosensitive drum 4 is rotatable about a drum axis A1. The photosensitive drum 4 extends along the drum axis A1. The photosensitive drum 4 has a cylindrical shape.

The charger 5 charges a surface of the photosensitive drum 4. The charger 5 is a charging roller. The charger 5 may be a scorotron charger.

The exposure device 6 can expose the surface of the photosensitive drum 4. In a state where the surface of the photosensitive drum 4 is charged by the charger 5, the exposure device 6 exposes the surface of the photosensitive drum 4, thereby forming an electrostatic latent image on the surface of the photosensitive drum 4. The exposure device 6 is specifically a laser scanner. The exposure device 6 may be an LED array.

The developing device 7 supplies toner onto the photosensitive drum 4. The developing device 7 may be detachable from the main body housing 2. The developing device 7 has a developing housing 71 and a developing roller 72.

The developing housing 71 can accommodate toner. In other words, the developing device 7 can accommodate toner. The toner contains toner particles and, if necessary, an external additive. The toner particles contain binder resin and, if necessary, coloring agent, pigment dispersing agent, release agent, magnetic material and charge control agent. The binder resin is the base of the toner particles. The binder resin binds components contained in the toner particles. The coloring agent imparts a desired color to the toner particles. The coloring agent is dispersed in the binder resin. The pigment dispersing agent improves dispersibility of the coloring agent. The charge control agent imparts charge to the toner particles. The charge may be either positive or negative. The external additive controls the charge, fluidity and storage stability of the toner particles.

The developing roller 72 can supply toner in the developing housing 71 to the surface of the photosensitive drum 4. The developing roller 72 comes into contact with the photosensitive drum 4. The developing roller 72 may not be in contact with the photosensitive drum 4. The developing roller 72 is rotatable about a developing axis A2. The developing roller 72 extends along the developing axis A2. The developing roller 72 has a cylindrical shape.

The transfer device 8 transfers the toner supplied onto the photosensitive drum 4 onto the sheet S. The transfer device 8 is in contact with the photosensitive drum 4. The transfer device 8 may not be in contact with the photosensitive drum 4. The transfer device 8 is a transfer roller. The transfer roller is rotatable about a transfer axis A3. The transfer roller extends along the transfer axis A3. The transfer roller has a cylindrical shape. The transfer device 8 may be a belt unit including a transfer belt.

The jetting device 9 jets fixing liquid toward the sheet S onto which the toner has been transferred. The fixing liquid fixes the toner onto the sheet S. The fixing liquid can soften the binder resin of the toner. The fixing liquid is, for example, aliphatic monocarboxylic acid ester, aliphatic dicarboxylic acid ester, carbonic acid ester, or the like.

The jetting device 9 is an electrostatic spray type jetting device. The jetting device 9 applies the fixing liquid to the sheet S by electrostatically spraying the fixing liquid toward the sheet S. The jetting device 9 includes a housing 91, a plurality of nozzle 92, a nozzle electrode 93, and a counter electrode 94.

The housing 91 can accommodate the fixing liquid.

The plurality of nozzle 92 extend downward from the housing 91. Each of the plurality of nozzle 92 communicates with an internal space of the housing 91. Each of the plurality of nozzle 92 jets the fixing liquid that is inside the housing 91. The plurality of nozzle 92 are disposed between the nozzle electrode 93 and the counter electrode 94.

The nozzle electrode 93 is disposed inside the housing 91. A nozzle voltage is applied to the nozzle electrode 93. The nozzle electrode 93 charges the fixing liquid inside the housing 91. In other words, the nozzle electrode 93 charges the fixing liquid to be supplied to the plurality of nozzle 92. The fixing liquid charged by the nozzle electrode 93 is jet from each of the plurality of nozzle 92, thereby the fixing liquid jet from each of the plurality of nozzle 92 is atomized. That is, the jetting device 9 atomizes the fixing liquid. In other words, the jetting device 9 sprays the fixing liquid.

The counter electrode 94 faces the plurality of nozzle 92 with a gap therebetween. The counter electrode 94 is disposed on a side opposite to the nozzle electrode 93 with respect to the plurality of nozzle 92. A counter voltage is applied to the counter electrode 94. The counter electrode 94 attracts the fixing liquid sprayed from each of the plurality of nozzle 92 by electrostatic force.

The sheet S onto which the toner has been transferred passes between the plurality of nozzle 92 and the counter electrode 94. At this time, the fixing liquid sprayed from each of the plurality of nozzle 92 is applied to the sheet S. The sheet S to which the fixing liquid has been applied is discharged on an upper surface of the main body housing 2.

Next, details of the image forming apparatus 1 will be described with reference to FIG. 2.

The image forming apparatus 1 further includes a supplying device 11, a collecting device 12, and a controller 100.

The supplying device 11 supplies the fixing liquid to the housing 91. The supplying device 11 includes a fixing liquid cartridge 111, a first supply pipe 112, a first supply pump 113, a first supply valve 114, a supply tank 115, a stirring member 116, a sensor 117, a second supply pipe 118, a second supply pump 119, and a second supply valve 120. In other words, the image forming apparatus 1 includes the fixing liquid cartridge 111, the first supply pipe 112, the first supply pump 113, the first supply valve 114, the supply tank

115, the stirring member 116, the sensor 117, the second supply pipe 118, the second supply pump 119, and the second supply valve 120.

The fixing liquid cartridge 111 accommodates the fixing liquid. The fixing liquid cartridge 111 is attachable to the main body housing 2.

One end of the first supply pipe 112 is connected to the fixing liquid cartridge 111 in a state where the fixing liquid cartridge 111 is attached to the main body housing 2. The other end of the first supply pipe 112 is connected to the supply tank 115. The fixing liquid in the fixing liquid cartridge 111 is sent to the supply tank 115 through the first supply pipe 112. That is, the first supply pipe 112 allows the fixing liquid in the fixing liquid cartridge 111 to pass therethrough.

The first supply pump 113 sends the fixing liquid in the first supply pipe 112 toward the supply tank 115. The first supply pump 113 is arranged between one end of the first supply pipe 112 and the other end of the first supply pipe 112. In a state where the fixing liquid cartridge 111 is attached to the main body housing 2, the first supply pump 113 is arranged between the fixing liquid cartridge 111 and the supply tank 115. Specifically, the first supply pump 113 is a gear pump.

The first supply valve 114 prevents the fixing liquid in the fixing liquid cartridge 111 from passing through the first supply pipe 112 and being sent to the supply tank 115. The first supply valve 114 is arranged between one end of the first supply pipe 112 and the other end of the first supply pipe 112. In a state where the fixing liquid cartridge 111 is attached to the main body housing 2, the first supply valve 114 is arranged between the fixing liquid cartridge 111 and the supply tank 115. In a state where the fixing liquid cartridge 111 is attached to the main body housing 2, the first supply valve 114 is arranged between the fixing liquid cartridge 111 and the first supply pump 113. When the first supply pump 113 is driven in a state where the first supply valve 114 is open, the fixing liquid in the fixing liquid cartridge 111 passes through the first supply valve 114 and is sent to the supply tank 115. On the other hand, in a state where the first supply valve 114 is closed, the fixing liquid in the fixing liquid cartridge 111 cannot pass through the first supply valve 114. Therefore, the first supply valve 114 prevents the fixing liquid in the fixing liquid cartridge 111 from passing through the first supply pipe 112 and being sent to the supply tank 115. The first supply valve 114 is, for example, an electromagnetic valve.

The supply tank 115 is connected to the other end of the first supply pipe 112. The supply tank 115 can accommodate the fixing liquid that has passed through the first supply pipe 112.

If the supply tank 115 is disposed higher than the housing 91, water pressure acts on the fixing liquid inside the housing 91 in accordance with a position of a liquid surface of the fixing liquid in the supply tank 115. That is, a pressure inside the housing 91 is a positive pressure with respect to a pressure inside the supply tank 115. Therefore, the second supply pump 119 cannot make the pressure inside the housing 91 lower than the positive pressure that acts in accordance with the position of the liquid surface of the fixing liquid in the supply tank 115.

In this regard, in the present embodiment, the supply tank 115 is disposed lower than the housing 91. Since the supply tank 115 is disposed lower than the housing 91, the pressure inside the housing 91 becomes negative with respect to the pressure inside the supply tank 115. Therefore, the second supply pump 119 can control the pressure inside the housing 91 to a desired pressure by controlling an amount of the fixing liquid to be sent to the housing 91.

The stirring member 116 is disposed in the supply tank 115. The stirring member 116 stirs the fixing liquid in the supply tank 115.

The sensor 117 detects the position of the liquid surface of the fixing liquid in the supply tank 115. Preferably, the liquid surface of the fixing liquid in the supply tank 115 is away from the other end of the first supply pipe 112. The sensor 117 is, for example, a photo sensor. The sensor 117 may be a level sensor such as a float type level sensor.

One end of the second supply pipe 118 is connected to the supply tank 115. The other end of the second supply pipe 118 is connected to the housing 91. In other words, the housing 91 is connected to the second supply pipe 118. The fixing liquid in the supply tank 115 is sent to the housing 91 through the second supply pipe 118. That is, the second supply pipe 118 allows the fixing liquid in the supply tank 115 to pass therethrough. The housing 91 can accommodate the fixing liquid that has passed through the second supply pipe 118.

The second supply pump 119 sends the fixing liquid in the second supply pipe 118 toward the housing 91. The second supply pump 119 is arranged between one end of the second supply pipe 118 and the other end of the second supply pipe 118. The second supply pump 119 is arranged between the supply tank 115 and the housing 91. Specifically, the second supply pump 119 is a gear pump.

The second supply valve 120 prevents the fixing liquid in the supply tank 115 from passing through the second supply pipe 118 and being sent to the housing 91. The second supply valve 120 is arranged between one end of the second supply pipe 118 and the other end of the second supply pipe 118. The second supply valve 120 is arranged between the supply tank 115 and the housing 91. The second supply valve 120 is arranged between the second supply pump 119 and the housing 91. When the second supply pump 119 is driven in a state where the second supply valve 120 is open, the fixing liquid in the supply tank 115 passes through the second supply valve and is sent to the housing 91. On the other hand, in a state where the second supply valve 120 is closed, the fixing liquid in the supply tank 115 cannot pass through the second supply valve 120. Therefore, the second supply valve 120 prevents the fixing liquid in the supply tank 115 from passing through the second supply pipe 118 and being sent to the housing 91. The second supply valve 120 is, for example, an electromagnetic valve.

The collecting device 12 collects the fixing liquid that has been jet from the plurality of nozzle 92 and has not adhered to the sheet S. The collecting device 12 includes a collection tray 121, a collection pipe 122, a collection pump 123, and a collection valve 124.

The collection tray 121 can accommodate the fixing liquid that has been jet from the plurality of nozzle 92 and has not adhered to the sheet S. The collection tray 121 faces the plurality of nozzle 92 with a gap therebetween. The collection tray 121 is disposed on a side opposite to the nozzle electrode 93 with respect to the plurality of nozzle 92. The counter electrode 94 is disposed in the collection tray 121. Therefore, the fixing liquid jet from the plurality of nozzle 92 can be drawn into the collection tray 121 by the counter electrode 94. As a result, the fixing liquid that has not adhered to the sheet S can be reliably accommodated in the collection tray 121.

One end of the collection pipe 122 is connected to the collection tray 121. The other end of the collection pipe 122 is connected to the supply tank 115. The fixing liquid in the collection tray 121 is sent to the supply tank 115 through the collection pipe 122. That is, the collection pipe 122 allows the fixing liquid in the collection tray 121 to pass therethrough. A portion of the collection pipe 122 extends vertically. The collection pipe 122 has a filter 125.

The filter 125 is arranged between one end of the collection pipe 122 and the other end of the collection pipe 122. The filter 125 is arranged between the collection tray 121 and the supply tank 115. The filter 125 is disposed at a portion of the collection pipe 122 extending vertically. The filter 125 extends in a direction intersecting with the vertical direction. There is a possibility that foreign matter such as toner or paper powder is mixed in the fixing liquid accommodated in the collection tray 121. The filter 125 allows the fixing liquid to pass therethrough but does not allow foreign matter mixed in the fixing liquid to pass therethrough. The filter 125 removes foreign matter mixed in the fixing liquid from the fixing liquid.

The collection pump 123 sends the fixing liquid in the collection pipe 122 toward the supply tank 115. As described above, the fixing liquid in the supply tank 115 is sent to the housing 91 through the second supply pipe 118. That is, the collection pump 123 sends the fixing liquid in the collection pipe 122 toward the jetting device 9 via the supply tank 115. In other words, the collection pump 123 sends the fixing liquid in the collection pipe 122 toward the housing 91. The collection pump 123 is arranged between one end of the collection pipe 122 and the other end of the collection pipe 122. The collection pump 123 is arranged between the collection tray 121 and the supply tank 115. The collection pump 123 is arranged between the filter 125 and the supply tank 115. Specifically, the collection pump 123 is a gear pump.

The collection valve 124 prevents the fixing liquid in the collection tray 121 from passing through the collection pipe 122 and being sent to the supply tank 115. The collection valve 124 is arranged between one end of the collection pipe 122 and the other end of the collection pipe 122. The collection valve 124 is arranged between the collection tray 121 and the supply tank 115. The collection valve 124 is arranged between the collection pump 123 and the supply tank 115. When the collection pump 123 is driven in a state where the collection valve 124 is open, the fixing liquid in the collection tray 121 passes through the collection valve 124 and is sent to the supply tank 115. On the other hand, in a state where the collection valve 124 is closed, the fixing liquid in the collection tray 121 cannot pass through the collection valve 124. Therefore, the collection valve 124 prevents the fixing liquid in the collection tray 121 from passing through the collection pipe 122 and being sent to the supply tank 115. The collection valve 124 is, for example, an electromagnetic valve.

The controller 100 controls operations of the first supply pump 113, the second supply pump 119, and the collection pump 123. The controller 100 controls the opening and closing of the first supply valve 114, the second supply valve 120, and the collection valve 124. The controller 100 is can receive a signal transmitted by the sensor 117. The controller 100 is electrically connected to the first supply pump 113, the first supply valve 114, the second supply pump 119, the second supply valve 120, the collection pump 123, the collection valve 124, and the sensor 117.

Next, control of the first supply pump 113 by the controller 100 will be described with reference to FIGS. 2 and 3.

When a print job is received (S1), the controller 100 forms an image on the sheet S in accordance with the print job. When forming an image on the sheet S, the controller 100 causes the jetting device 9 to spray the fixing liquid (S2).

Specifically, the controller 100 drives the second supply pump 119 in a state where the nozzle voltage is applied to the nozzle electrode 93 and the counter voltage is applied to the counter electrode 94. Then, the controller 100 opens the second supply valve 120 after the operation of the second supply pump 119 is stabilized. The fixing liquid is supplied to the housing 91 as the second supply valve 120 opens. The fixing liquid in the housing 91 is sprayed from each of the plurality of nozzle 92.

When the print job is finished (S3: YES), the controller 100 stops the spraying of the fixing liquid from the jetting device 9 (S4).

Specifically, after closing the second supply valve 120, the controller 100 stops the second supply pump 119. Then, the controller 100 stops the application of the nozzle voltage to the nozzle electrode 93 and stops the application of the counter voltage to the counter electrode 94. The spraying of the fixing liquid from the jetting device 9 thereby stops.

Then, the controller 100 executes a pump driving process (S6) and a pump stop process (S8), that is, the controller 100 executes the pump driving process (S6) and the pump stop process (S8) after the print job is finished (S3: YES).

In the pump driving process (S6), when the position of the liquid surface detected by the sensor 117 is lower than a threshold value (S5: YES), the controller 100 drives the first supply pump 113 to supply the fixing liquid from the fixing liquid cartridge 111 to the supply tank 115.

Specifically, as the amount of the fixing liquid in the supply tank 115 decreases by the formation an image on the sheet S in accordance with the print job, the liquid surface of the fixing liquid in the supply tank 115 lowers. After the print job is finished, if the position of the liquid surface detected by the sensor 117 is lower than the threshold value (S5: YES), the controller 100 opens the first supply valve 114 and drives the first supply pump 113 (S6). The fixing liquid is thereby supplied from the fixing liquid cartridge 111 to the supply tank 115.

When the position of the liquid surface detected by the sensor 117 is equal to or higher than the threshold value (S5: NO), the controller 100 does not execute the pump driving process (S6).

Then, the controller 100 executes the pump stop process (S8) after the pump driving process (S6).

When the position of the liquid surface detected by the sensor 117 is equal to or higher than the threshold value (S7: YES), in the pump stop process (S8), the controller 100 stops the driving of the first supply pump 113 in order to stop the supply of the fixing liquid from the fixing liquid cartridge 111 to the supply tank 115.

Specifically, as the fixing liquid is supplied from the fixing liquid cartridge 111 to the supply tank 115 by the pump driving process (S6), the liquid surface of the fixing liquid in the supply tank 115 rises. When the position of the liquid surface detected by the sensor 117 becomes equal to or higher than the threshold value (S7: YES), the controller 100 stops the driving of the first supply pump 113 (S8) and closes the first supply valve 114. The supply of the fixing liquid from the fixing liquid cartridge 111 to the supply tank 115 thereby stops.

Figure 2:
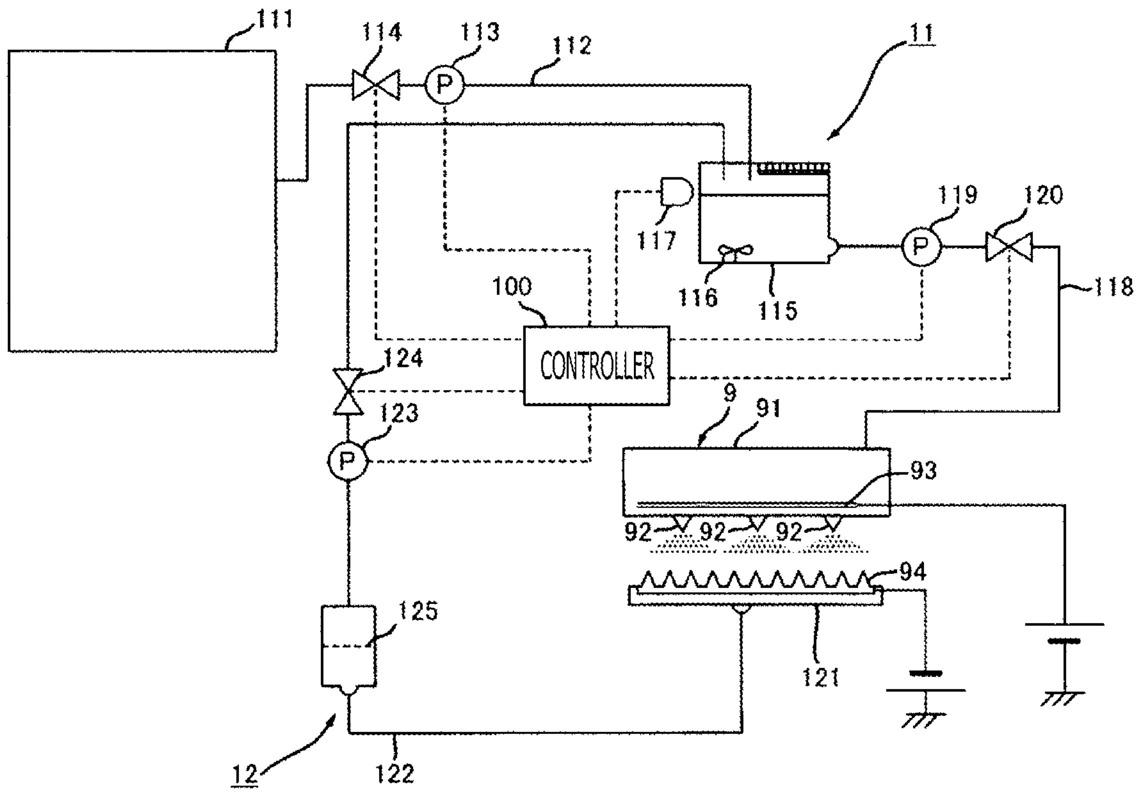
FIG. 2 is a piping diagram of a supplying device and a collecting device according to the first embodiment.
Figure 3:
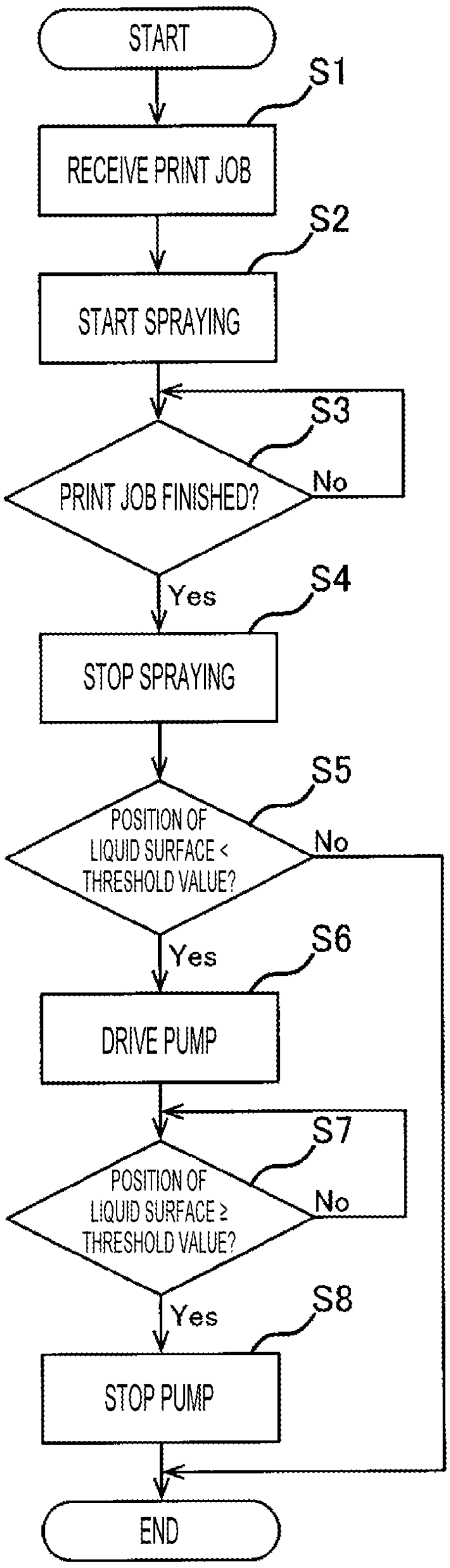
FIG. 3 is a flowchart for explaining control of a first supply pump according to the first embodiment.

Effects of the First Embodiment (1) According to the image forming apparatus 1 of the first embodiment, as shown in FIG. 2, the fixing liquid jet from the plurality of nozzle 92 and not adhered to the sheet S can be accommodated in the collection tray 121, sent to the supply tank 115 through the collection pipe 122, and sent from the supply tank 115 to the housing 91.

Therefore, the fixing liquid that has not adhered to the sheet S can be collected and jet again from the plurality of nozzle 92.

As a result, the consumption amount of the fixing liquid can be suppressed.

(2) According to the image forming apparatus 1 of the first embodiment, as shown in FIG. 2, the counter electrode 94 is disposed in the collection tray 121.

Therefore, the fixing liquid jet from the plurality of nozzle 92 can be drawn into the collection tray 121 with the counter electrode 94.

As a result, the fixing liquid that has not adhered to the sheet S can be reliably collected in the collection tray 121.

(3) According to the image forming apparatus 1 of the first embodiment, as shown in FIG. 2, the fixing liquid in the fixing liquid cartridge 111 can be supplied to the housing 91 via the supply tank 115.

Therefore, by keeping the amount of the fixing liquid in the supply tank 115 constant, the fixing liquid can be stably supplied to the housing 91 even if the amount of the fixing liquid in the fixing liquid cartridge 111 decreases.

As a result, the jetting state of the fixing liquid from the plurality of nozzle 92 can be stabilized.

(4) According to the image forming apparatus 1 of the first embodiment, as shown in FIG. 2, the collection pipe 122 is connected to the supply tank 115.

Therefore, the fixing liquid from the collection tray 121 can be accommodated in the supply tank 115 together with the fixing liquid from the fixing liquid cartridge 111.

As a result, the fixing liquid from the collection tray 121 can be reused while stabilizing the jetting state of the fixing liquid from the plurality of nozzle 92.

(5) According to the image forming apparatus 1 of the first embodiment, as illustrated in FIG. 2, the supplying device 11 includes the sensor 117 that detects the position of the liquid surface of the fixing liquid in the supply tank 115. As shown in FIG. 3, when the position of the liquid surface detected by the sensor 117 is lower than the threshold value (S5: YES), the controller 100 drives the first supply pump 113 (S6) to supply the fixing liquid from the fixing liquid cartridge 111 to the supply tank 115. Then, when the position of the liquid surface detected by the sensor 117 is higher than the threshold value (S7: YES), the controller 100 stops the driving of the first supply pump 113 (S8) to stop the supplying of the fixing liquid from the fixing liquid cartridge 111 to the supply tank 115.

Therefore, the amount of the fixing liquid in the supply tank 115 can be made constant based on the position of the liquid surface detected by the sensor 117.

As a result, the jetting state of the fixing liquid from the plurality of nozzle 92 can be stabilized.

(6) According to the image forming apparatus 1 of the first embodiment, as shown in FIG. 2, the collection pipe 122 includes the filter 125.

Therefore, even if foreign matter such as toner or paper powder is mixed in the fixing liquid in the collection tray 121, the fixing liquid can be reused by removing the foreign matter with the filter 125.

(7) According to the image forming apparatus 1 of the first embodiment, as shown in FIG. 2, a portion of the collection pipe 122 extends vertically. The filter 125 extends in the direction intersecting the vertical direction.

Therefore, the fixing liquid can be brought into contact with the entire surface of the filter 125 by causing the fixing liquid to pass through the filter 125 vertically.

As a result, partial clogging of the filter 125 can be suppressed, and frequency of replacement of the filter 125 can be reduced.

Modification of First Embodiment

Next, modifications of the first embodiment will be described with reference to FIGS. 4 to 6. In the modifications, members similar to those in the first embodiment described above are denoted by the same reference numerals, and the description thereof will be omitted.

Figure 4:
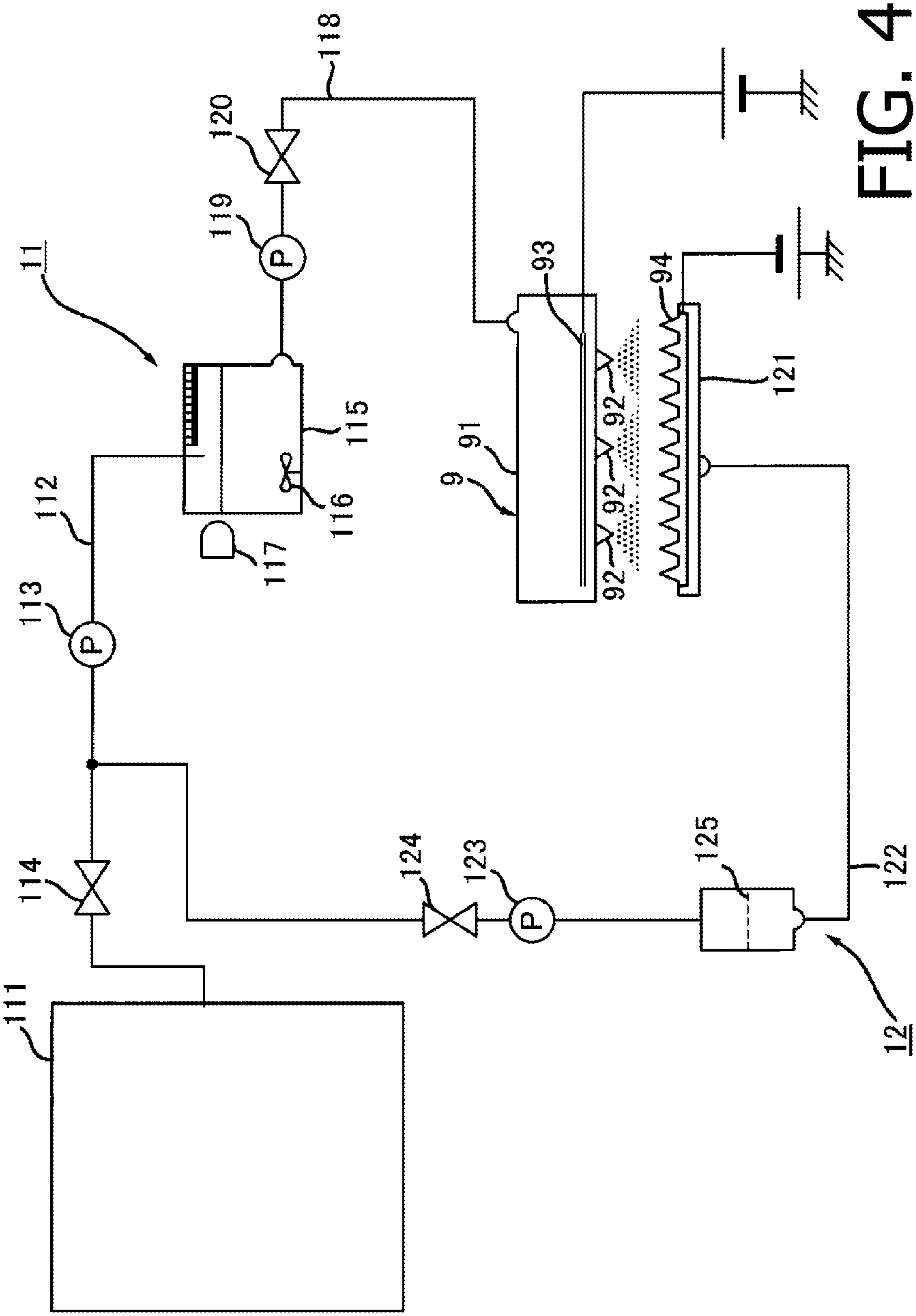
FIG. 4 is an explanatory diagram for explaining a first modification of the image forming apparatus according to the first embodiment.

(1) As shown in FIG. 4, the other end of the collection pipe 122 may be connected to the first supply pipe 112. The other end of the collection pipe 122 is connected to the first supply pipe 112 between the first supply valve 114 and the first supply pump 113. The first supply pipe 112 allows the fixing liquid that has passed through the collection pipe 122 to pass therethrough. The fixing liquid that has passed through the collection pipe 122 passes through the first supply pipe 112 and is accommodated in the supply tank 115.

In this modification, it is possible to obtain the same effects as those of the first embodiment described above.

Figure 5:
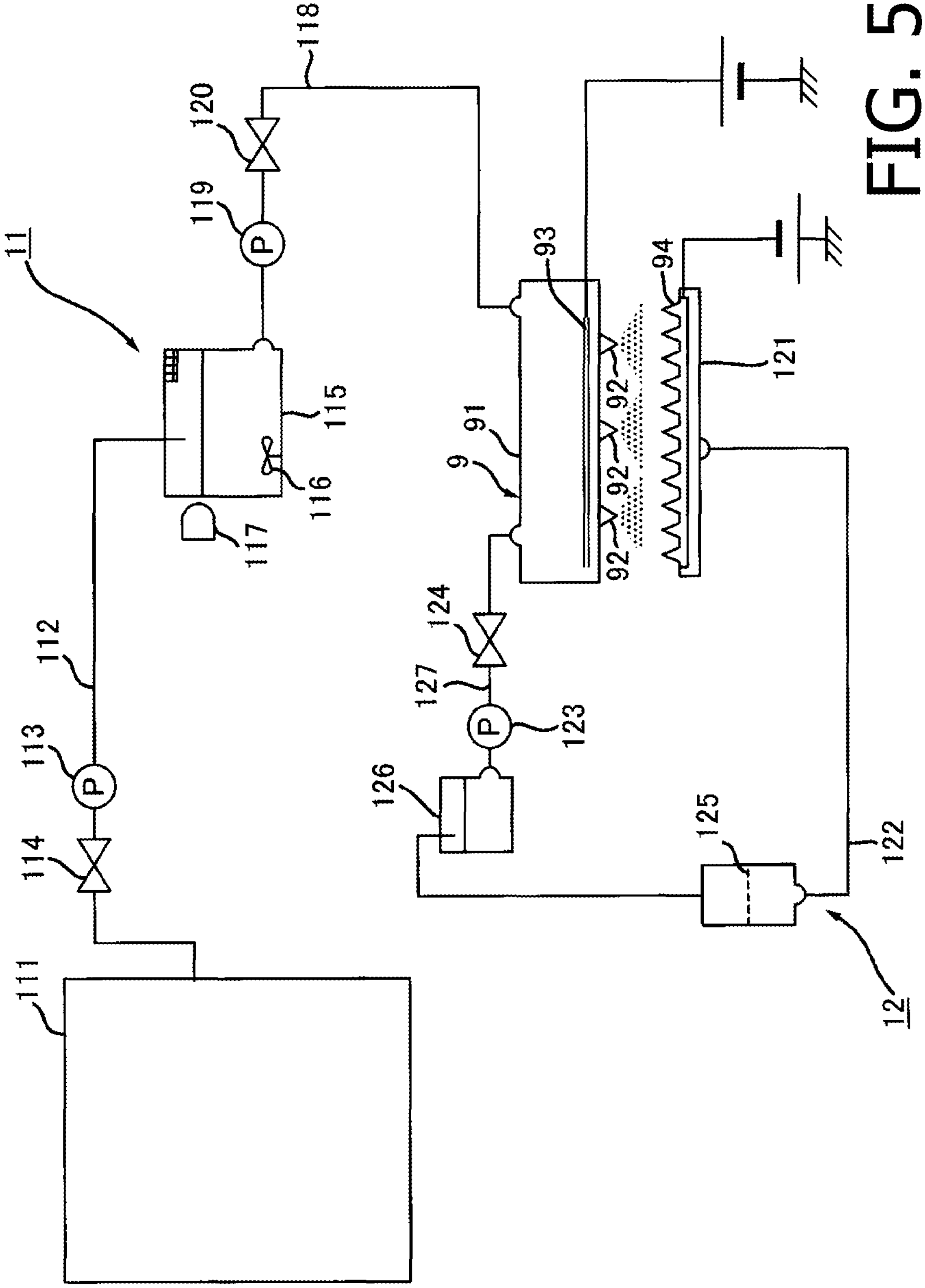
FIG. 5 is an explanatory diagram for explaining a second modification of the image forming apparatus according to the first embodiment.

(2) As shown in FIG. 5, the collecting device 12 may be independent of the supplying device 11. Specifically, the collecting device 12 includes a collection tank 126 and a second collection pipe 127. In other words, the image forming apparatus 1 includes the collection tank 126 and the second collection pipe 127.

The collection tank 126 is connected to the other end of the collection pipe 122. The collection tank 126 can accommodate the fixing liquid that has passed through the collection pipe 122. The collection tank 126 is disposed lower than the housing 91.

One end of the second collection pipe 127 is connected to the collection tank 126. The other end of the second collection pipe 127 is connected to the housing 91. In other words, the housing 91 is connected to the other end of the second collection pipe 127. The fixing liquid in the collection tank 126 is sent to the housing 91 through the second collection pipe 127. That is, the second collection pipe 127 allows the fixing liquid in the collection tank 126 to pass therethrough. The housing 91 can accommodate the fixing liquid that has passed through the second supply pipe 118 and the fixing liquid that has passed through the second collection pipe 127.

In this modification, it is possible to obtain the same effects as those of the first embodiment described above.

Figure 6:
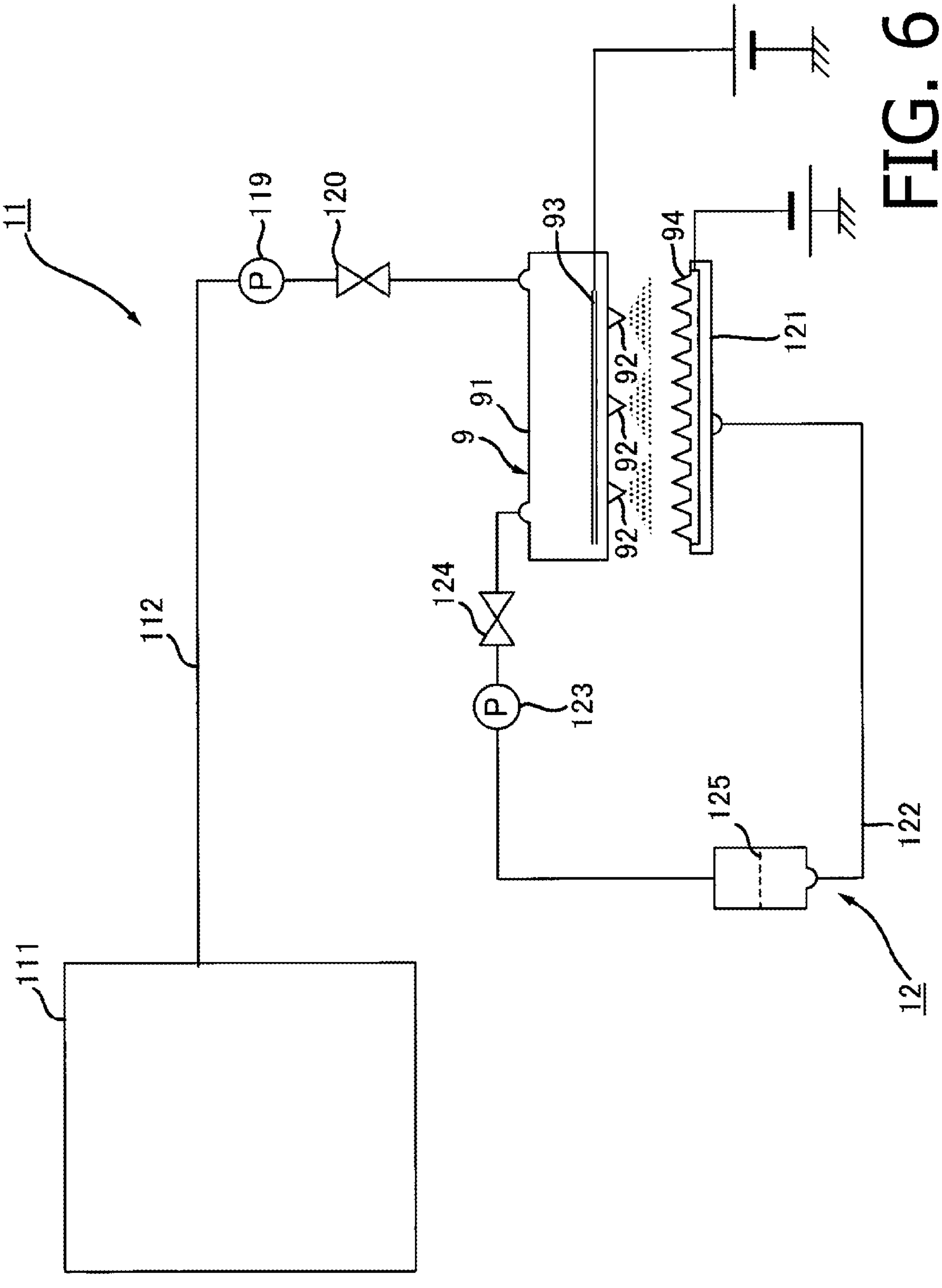
FIG. 6 is an explanatory diagram for explaining a third modification of the image forming apparatus according to the first embodiment.

(3) As shown in FIG. 6, the supplying device 11 may not include the supply tank 115. The collecting device 12 may be independent of the supplying device 11 and may not include the collection tank 126. The housing 91 is connected to the first supply pipe 112 and the collection pipe 122, and can accommodate the fixing liquid that has passed through the first supply pipe 112 and the fixing liquid that has passed through the collection pipe 122.

In this modification, it is possible to obtain the same effects as those of the first embodiment described above.

(4) The controller 100 may execute the pump driving process (S6) and the pump stop process (S8) while forming an image on the sheet S in accordance with the print job.

SECOND EMBODIMENT

Next, an image forming apparatus according to a second embodiment of the present invention will be described in detail with reference to FIGS. 7 to 15.

In the second embodiment, the same components as those described in the first embodiment are denoted by the same reference numerals.

An outline of an image forming apparatus 201 according to the second embodiment will be described with reference to FIG. 7.

The image forming apparatus 201 includes a main body housing 2, a sheet cassette 3, a photosensitive drum 4, a charger 5, an exposure device 6, a developing device 7, a transfer device 8, and a spraying device 9.

The main body housing 2 accommodates the sheet cassette 3, the photosensitive drum 4, the charger 5, the exposure device 6, the developing device 7, the transfer device 8, and the spraying device 9.

The sheet cassette 3 can accommodate the sheets S. The sheet S is, for example, printing paper. The sheet S is conveyed toward the transfer device 8. The sheet cassette 3 may be a sheet cassette attachable to the main body housing 2.

The photosensitive drum 4 extends in a first direction, and is rotatable about a drum axis. The drum axis extends in the first direction.

The charger 5 charges a surface of the photosensitive drum 4. In the present embodiment, the charger 5 is a charging roller. The charger may be a scorotron type charger.

The exposure device 6 can expose the surface of the photosensitive drum 4 charged by the charger 5. Specifically, the exposure device 6 is a laser scanner. The exposure device 6 may be an LED array.

The developing device 7 supplies toner onto the photosensitive drum 4. The developing device 7 may be detachable from the main body housing 2. The developing device 7 has a developing housing 71 and a developing roller 72.

The developing housing 71 can accommodate toner. In other words, the developing device 7 can accommodate toner. The toner contains toner particles and, if necessary, an external additive. The toner particles contain binder resin and, if necessary, coloring agent, pigment dispersing agent, release agent, magnetic material and charge control agent. The binder resin is the base of the toner particles. The binder resin binds components contained in the toner particles. The coloring agent imparts a desired color to the toner particles. The coloring agent is dispersed in the binder resin. The pigment dispersing agent improves dispersibility of the coloring agent. The charge control agent imparts charge to the toner particles. The charge may be either positive or negative. The external additive controls the charge, fluidity and storage stability of the toner particles.

The developing roller 72 can supply toner in the developing housing 71 to the surface of the photosensitive drum 4. The developing roller 72 comes into contact with the photosensitive drum 4. The developing roller 72 may not be in contact with the photosensitive drum 4. The developing roller 72 extends in the first direction. The developing roller 72 is rotatable about a developing axis. The developing axis extends in the first direction.

The transfer device 8 transfers toner on the photosensitive drum 4 to the sheet S. In the present embodiment, the transfer device 8 has a transfer roller 81. The transfer roller 81 is in contact with the photosensitive drum 4. The transfer roller 81 may not be in contact with the photosensitive drum 4. The transfer roller 81 extends in the first direction. The transfer roller 81 is rotatable about a transfer axis. The transfer axis extends in the first direction. The transfer device 8 may include a transfer belt.

The spraying device 9 sprays the fixing liquid onto the sheet S onto which the toner has been transferred. The fixing liquid fixes the toner onto the sheet S. The fixing liquid can soften the binder resin of the toner. The fixing liquid is, for example, aliphatic monocarboxylic acid ester, aliphatic dicarboxylic acid ester, carbonic acid ester, or the like.

The spraying device 9 is of an electrostatic spray type. The spraying device 9 sprays the fixing liquid toward the sheet S by electrostatic spraying. The spraying device 9 includes a housing 91, a plurality of nozzle 92, a nozzle electrode 93, and a counter electrode 94.

The housing 91 can accommodate the fixing liquid.

The plurality of nozzle 92 extend downward from the housing 91. Each of the plurality of nozzle 92 communicates with an internal space of the housing 91. Each of the plurality of nozzle 92 sprays the fixing liquid that is inside the housing 91. The plurality of nozzle 92 are disposed between the nozzle electrode 93 and the counter electrode 94.

The nozzle electrode 93 is disposed inside the housing 91. A voltage is to be applied to the nozzle electrode 93. The nozzle electrode 93 charges the fixing liquid inside the housing 91. In other words, the nozzle electrode 93 charges the fixing liquid to be supplied to the plurality of nozzle 92.

The counter electrode 94 faces the plurality of nozzle 92 with a gap therebetween. The counter electrode 94 is disposed on a side opposite to the nozzle electrode 93 with respect to the plurality of nozzle 92. A voltage having a polarity opposite to that of the voltage applied to the nozzle electrode 93 is applied to the counter electrode 94. In the present embodiment, a positive voltage is applied to the nozzle electrode 93, and a negative voltage is applied to the counter electrode 94. As a result, a potential difference (electric field) is generated between the nozzles 92 and the counter electrode 94, and the counter electrode 94 attracts the fixing liquid sprayed from each of the plurality of nozzle 92 by electrostatic force.

The sheet S onto which the toner has been transferred passes between the plurality of nozzle 92 and the counter electrode 94. At this time, the fixing liquid is sprayed onto the sheet S from each of the plurality of nozzle 92. The sheet S onto which the fixing liquid has been sprayed is discharged onto an upper surface of the main body housing 2.

Figure 8:
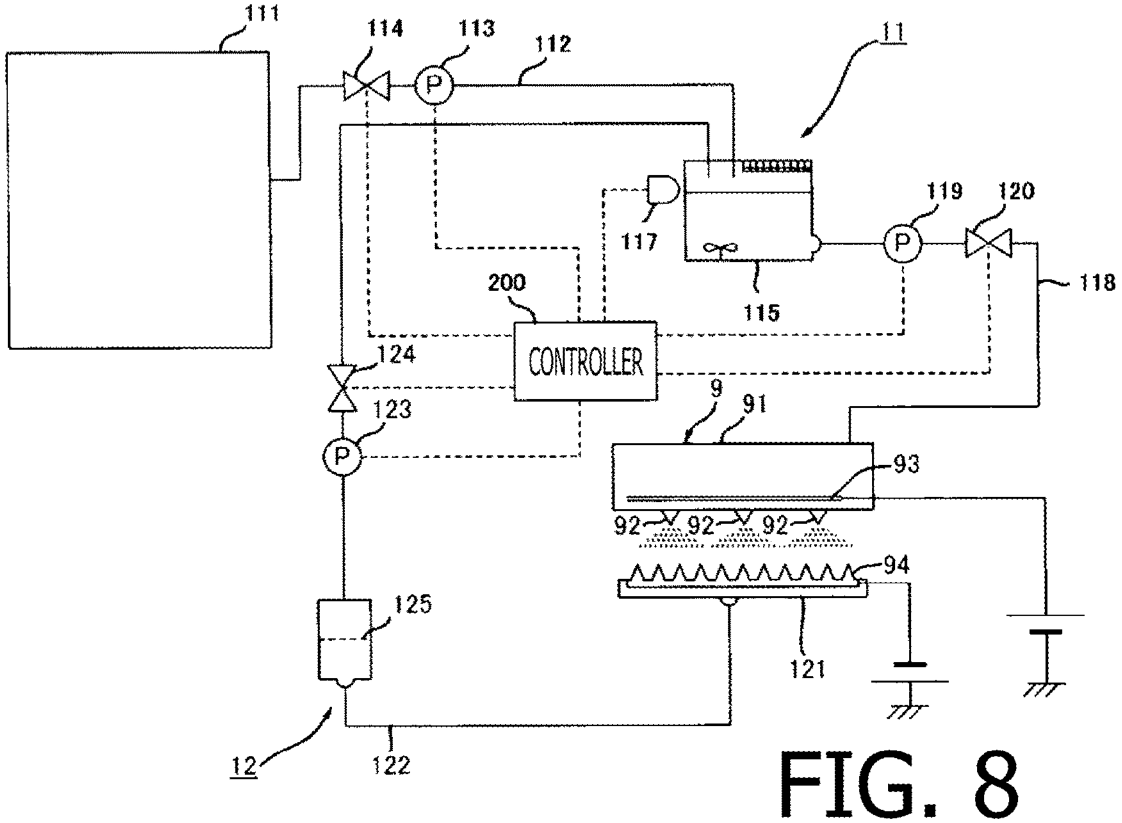
FIG. 8 is a piping diagram of a supplying device and a collecting device according to the second embodiment.

Next, details of the image forming apparatus 201 according to the second embodiment will be described with reference to FIG. 8.

The image forming apparatus 201 includes a supplying device 11, a collecting device 12, and a controller 200.

The supplying device 11 can supply the fixing liquid to the housing 91 of the spraying device 9. The supplying device 11 includes a supply tank 115, a sensor 117, a supply pipe 118, a supply pump 119, a supply valve 120, a fixing liquid cartridge 111, a refill pipe 112, a refill pump 113, and a refill valve 114.

The supply tank 115 can accommodate the fixing liquid to be supplied to the housing 91 of the spraying device 9.

The sensor 117 detects whether an amount of the fixing liquid in the supply tank 115 is less than a prescribed amount or not. In the present embodiment, the prescribed amount is an amount that is less than the maximum amount of the fixing liquid that can be accommodated in the supply tank 115 and is an amount with which the supply tank 115 does not become empty even when the maximum number of sheets S that can be accommodated in the sheet cassette 3 is printed. The sensor 117 transmits a signal when it is detected that the amount of the fixing liquid in the supply tank 115 is equal to or more than the prescribed amount. When the sensor 117 is transmitting a signal, the sensor 117 is on. On the other hand, the sensor does not transmit the signal when it is detected that the amount of the fixing liquid in the supply tank 115 is less than the prescribed amount. When the sensor 117 is not transmitting the signal, the sensor 117 is off.

Specifically, the sensor 117 detects whether the amount of the fixing liquid in the supply tank 115 is less than the prescribed amount or not by detecting a position of a liquid surface of the fixing liquid in the supply tank 115. The sensor 117 is, for example, a photosensor. The sensor 117 may be a level sensor such as a float type level sensor.

One end of the supply pipe 118 is connected to the supply tank 115. The other end of the supply pipe 118 is connected to the housing 91. The supply pipe 118 allows the fixing liquid going from the supply tank 115 toward the housing 91 to pass therethrough. Therefore, the fixing liquid in the supply tank 115 passes through the supply pipe 118 and enters the housing 91.

The supply pump 119 sends the fixing liquid in the supply pipe 118 toward the housing 91. The supply pump 119 is arranged between one end of the supply pipe 118 and the other end of the supply pipe 118. The supply pump 119 is arranged between the supply tank 115 and the housing 91. The supply pump 119 is, for example, a gear pump.

The supply valve 120 is arranged between one end of the supply pipe 118 and the other end of the supply pipe 118. The supply valve 120 is arranged between the supply tank 115 and the housing 91. The supply valve 120 is arranged between the supply pump 119 and the housing 91.

When the supply pump 119 is driven in a state where the supply valve 120 is open, the fixing liquid in the supply pipe 118 passes through the supply valve 120. On the other hand, in a state where the supply valve 120 is closed, the fixing liquid in the supply pipe 118 cannot pass through the supply valve 120. Therefore, the supply valve 120 prevents the fixing liquid from passing through the supply pipe 118. The supply valve 120 is, for example, an electromagnetic valve.

The fixing liquid cartridge 111 can accommodate the fixing liquid to be supplied to the supply tank 115. The fixing liquid cartridge 111 can be attached to the main body housing 2. The fixing liquid cartridge 111 attached to the main body housing 2 can be detached from the main body housing 2.

In a state where the fixing liquid cartridge 111 is attached to the main body housing 2, one end of the refill pipe 112 is connected to the fixing liquid cartridge 111. The other end of the refill pipe 112 is connected to the supply tank 115. The refill pipe 112 allows the fixing liquid going from the fixing liquid cartridge 111 toward the supply tank 115 to pass therethrough. Therefore, the fixing liquid in the fixing liquid cartridge 111 passes through the refill pipe 112 and enters the supply tank 115.

The refill pump 113 sends the fixing liquid in the refill pipe 112 toward the supply tank 115. The refill pump 113 is arranged between one end of the refill pipe 112 and the other end of the refill pipe 112. In a state where the fixing liquid cartridge 111 is attached to the main body housing 2, the refill pump 113 is arranged between the fixing liquid cartridge 111 and the supply tank 115. The refill pump 113 is, for example, a gear pump.

The refill valve 114 is arranged between one end of the refill pipe 112 and the other end of the refill pipe 112. In a state where the fixing liquid cartridge 111 is attached to the main body housing 2, the refill valve 114 is arranged between the fixing liquid cartridge 111 and the supply tank 115. In a state where the fixing liquid cartridge 111 is attached to the main body housing 2, the refill valve 114 is arranged between the fixing liquid cartridge 111 and the refill pump 113.

When the refill pump 113 is driven in a state where the refill valve 114 is open, the fixing liquid in the refill pipe 112 passes through the refill valve 114. On the other hand, in a state where the refill valve 114 is closed, the fixing liquid in the refill pipe 112 cannot pass through the refill valve 114. Therefore, the refill valve 114 prevents the fixing liquid in the fixing liquid cartridge 111 from passing through the refill pipe 112. The refill valve 114 is, for example, an electromagnetic valve.

The collecting device 12 can collect the fixing liquid that has been sprayed from the spraying device 9 and has not adhered to the sheet S. The collecting device 12 includes a collection tray 121, a collection pipe 122, a collection pump 123, and a collection valve 124.

The collection tray 121 can accommodate the fixing liquid that has been jet from the plurality of nozzle 92 and has not adhered to the sheet S. The collection tray 121 faces the plurality of nozzle 92 with a gap therebetween. The collection tray 121 is disposed on a side opposite to the nozzle electrode 93 with respect to the plurality of nozzle 92. The counter electrode 94 is disposed in the collection tray 121. Therefore, the fixing liquid sprayed from the plurality of nozzle 92 can be drawn into the collection tray 121 by the counter electrode 94. As a result, the fixing liquid that has not adhered to the sheet S can be reliably accommodated in the collection tray 121.

One end of the collection pipe 122 is connected to the collection tray 121. The other end of the collection pipe 122 is connected to the supply tank 115. The other end of the collection pipe 122 may be connected to the fixing liquid cartridge 111. The collection pipe 122 allows the fixing liquid going from the collection tray 121 toward the supply tank 115 to pass therethrough. Therefore, the fixing liquid in the collection tray 121 passes through the collection pipe 122 and enters the supply tank 115. A portion of the collection pipe 122 extends vertically. The collection pipe 122 has a filter 125.

The filter 125 is arranged between one end of the collection pipe 122 and the other end of the collection pipe 122. The filter 125 is arranged between the collection tray 121 and the supply tank 115. The filter 125 is disposed at a portion of the collection pipe 122 extending vertically. The filter 125 extends in a direction intersecting with the vertical direction. There is a possibility that foreign matter such as toner or paper dust is mixed in the fixing liquid accommodated in the collection tray 121. The filter 125 allows the fixing liquid to pass therethrough but does not allow foreign matter mixed in the fixing liquid to pass therethrough. The filter 125 removes foreign matter mixed in the fixing liquid from the fixing liquid.

The collection pump 123 sends the fixing liquid in the collection pipe 122 toward the supply tank 115. The collection pump 123 thereby sends the fixing liquid accommodated in the collection tray 121 toward the supplying device 11. The collection pump 123 is arranged between one end of the collection pipe 122 and the other end of the collection pipe 122. The collection pump 123 is arranged between the collection tray 121 and the supply tank 115. The collection pump 123 is arranged between the filter 125 and the supply tank 115. Specifically, the collection pump 123 is a gear pump.

The collection valve 124 is arranged between one end of the collection pipe 122 and the other end of the collection pipe 122. The collection valve 124 is arranged between the collection tray 121 and the supply tank 115. The collection valve 124 is arranged between the collection pump 123 and the supply tank 115.

When the collection pump 123 is driven in a state where the collection valve 124 is open, the fixing liquid in the collection pipe 122 passes through the collection valve 124. On the other hand, in a state where the collection valve 124 is closed, the fixing liquid in the collection pipe 122 cannot pass through the collection valve 124. Therefore, the collection valve 124 prevents the fixing liquid from passing through the collection pipe 122. The collection valve 124 is, for example, an electromagnetic valve.

The controller 200 controls operations of the supply pump 119, the collection pump 123, and the refill pump 113. The controller 200 controls the opening and closing of the supply valve 120, the collection valve 124, and the refill valve 114. The controller 200 can receive a signal transmitted by the sensor 117. The controller 200 is electrically connected to the supply pump 119, the supply valve 120, the collection pump 123, the collection valve 124, the refill pump 113, the refill valve 114, and the sensor 117.

The controller 200 stores a first set value P1, a second set value P2, and a third set value P3. Specifically, the controller 200 has a processor and a non-volatile memory. The non-volatile memory stores the first set value P1, the second set value P2, and the third set value P3.

The first set value P1 is the number of pages that can be continuously printed until the supply tank 115 becomes empty. The first set value P1 is set based on the capacity of the supply tank 115. The first set value P1 is, for example, the number of pages that is expected to make the supply tank 115 in a full state empty. The supply tank 115 in the full state is a state in which the supply tank 115 holds the fixing liquid at a level at which the state of the sensor 117 changes from off to on. In other words, the supply tank 115 in the full state is a state in which a prescribed amount of the fixing liquid is accommodated in the supply tank 115. That is, the first set value P1 is the number of pages that can be continuously printed using the prescribed amount of the fixing liquid in the supply tank 115. The first set value P1 is set based on a normal amount of the fixing liquid used to print one page which is set in advance based on experiments, simulations, or the like, and the amount of the fixing liquid in the supply tank 115 in the full state which is set in advance based on the capacity of the supply tank 115. In the present embodiment, the first set value P1 is set to the same value as the maximum number of sheets S that the sheet cassette 3 can accommodate.

The second set value P2 is set based on the capacity of the collection tray 121. The second set value P2 is, for example, the number of pages that is expected to be printable until the amount of the fixing liquid in the collection tray 121 reaches 80% of the capacity of the collection tray 121 from an empty state. An amount of the fixing liquid collected in the collection tray 121 in printing one page is a value that is set in advance based on experiments, simulations, or the like, and the second set value P2 is set based on this value and the capacity of the collection tray 121. In the present embodiment, the second set value P2 is smaller than the first set value P1.

The third set value P3 is the number of pages that is expected to change the state of the sensor 117 from on to off. The third set value P3 is a value that is set in advance through experiments or simulations based on the capacity of the supply tank 115, and is set by converting the amount of the fixing liquid in the supply tank 115 consumed from the state in which the supply tank 115 is full until the state of the sensor 117 changes to on into the number of pages. In the present embodiment, the third set value P3 is smaller than the first set value P1 and smaller than the second set value P2.

Next, control by the controller 200 will be described with reference to FIGS. 9 to 15.

Figure 9:
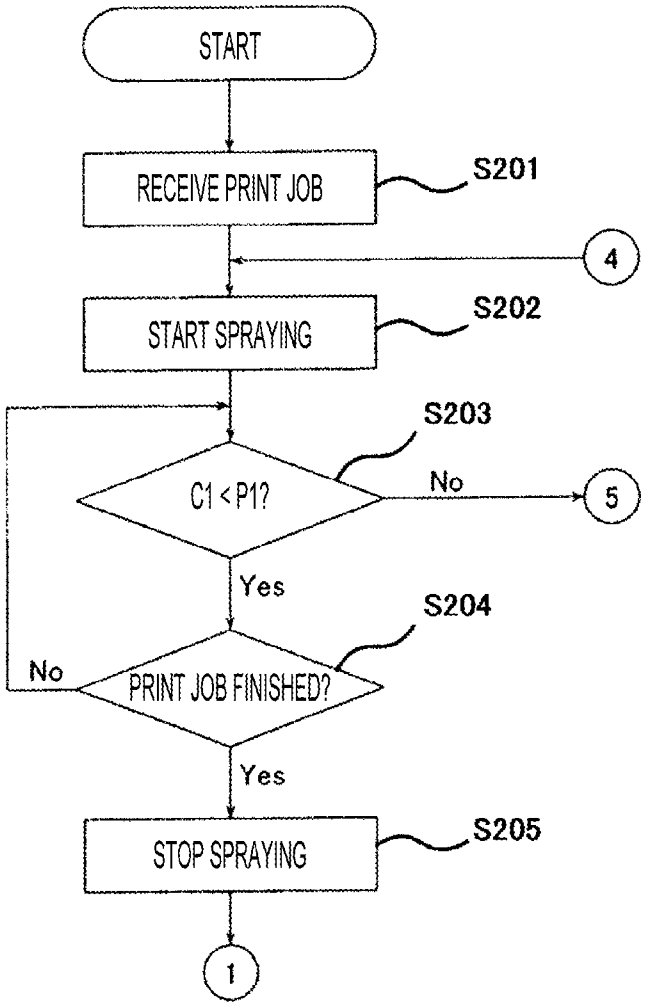
FIG. 9 is a flowchart for explaining control by a controller according to the second embodiment.

As shown in FIG. 9, when a print job is received (S201), the controller 200 prints an image on the sheet S in accordance with the print job. The print job includes a print command, print data to be printed on the sheet S, the number of pages, and the like. When printing an image on the sheet S, the controller 200 causes the spraying device 9 to spray the fixing liquid (S202).

Specifically, the controller 200 drives the supply pump 119 in a state where a voltage is applied to the nozzle electrode 93 and a voltage is applied to the counter electrode 94. Then, the controller 200 opens the supply valve 120 after the operation of the supply pump 119 is stabilized. The fixing liquid is thereby supplied to the housing 91. The fixing liquid in the housing 91 is sprayed from each of the plurality of nozzle 92.

The controller 200 counts the cumulative number of printed pages, and defines the cumulative number of printed pages as a first cumulative number of pages C1.

When the first cumulative number of pages C1 is less than the first set value P1 (S203: YES) and the execution of the print job is finished (S204: YES), the controller 200 stops the spraying of the fixing liquid from the spraying device 9 (S205).

Specifically, in S205, the controller 200 closes the supply valve 120 and then stops the supply pump 119. Then, the controller 200 stops the application of the voltage to the nozzle electrode 93 and stops the application of the voltage to the counter electrode 94. The spraying of the fixing liquid from the spraying device 9 thereby stops.

Figure 10:
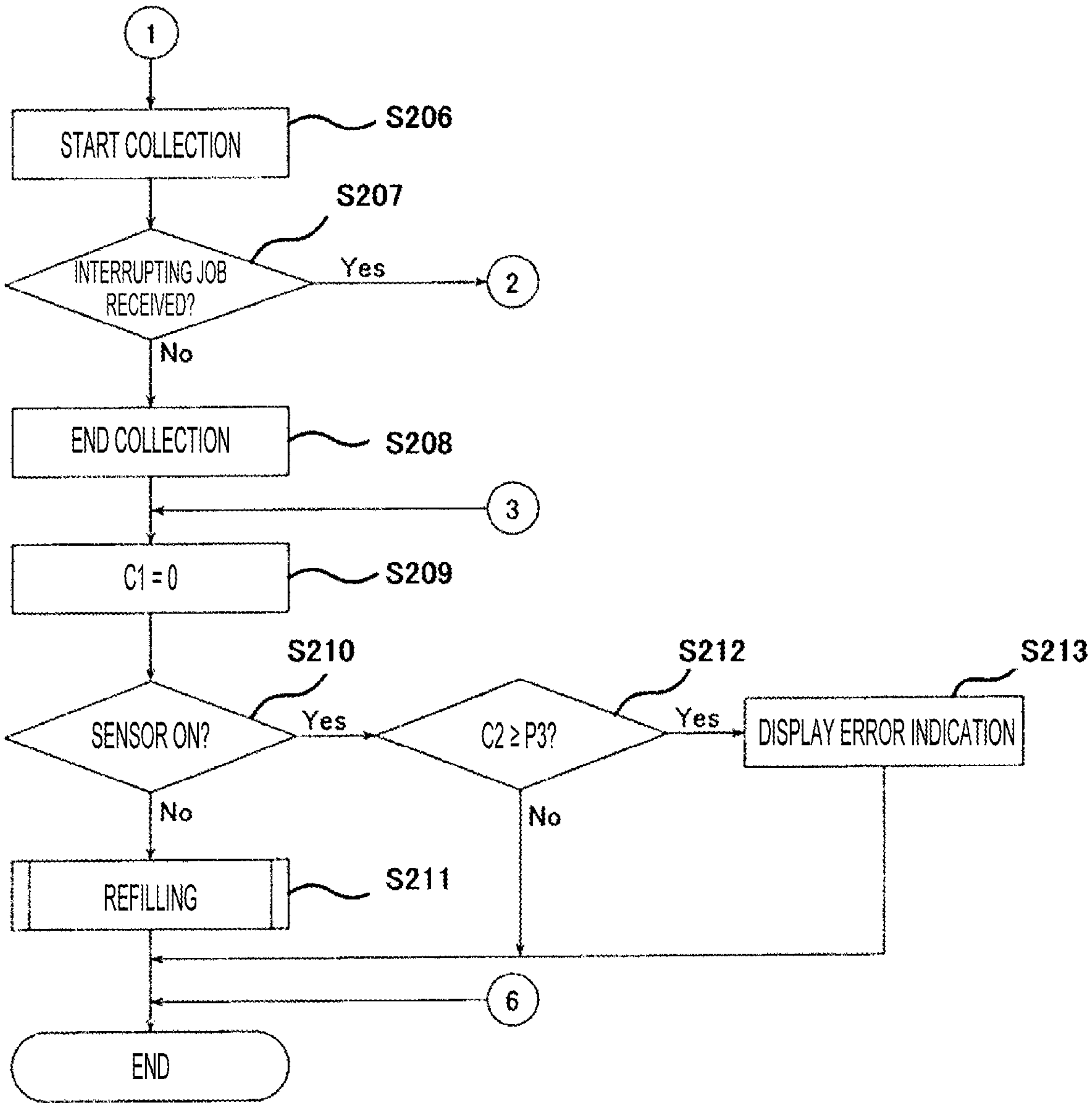
FIG. 10 is a flowchart continuing from FIG. 9.

Then, as shown in FIG. 10, the controller 200 starts a collection process (S206). That is, when the execution of the print job is finished (S204: YES), the controller 200 executes the collection process (S206).

In the collection process, the controller 200 drives the collection pump 123 to send the fixing liquid in the collection tray 121 to the supply tank 115 of the supplying device 11. In the collection process, the controller 200 may send the fixing liquid in the collection tray 121 to the fixing liquid cartridge 111 of the supplying device 11.

Specifically, the controller 200 drives the collection pump 123. Then, the controller 200 opens the collection valve 124 after the operation of the collection pump 123 is stabilized. The fixing liquid in the collection tray 121 is thereby sent to the supply tank 115.

The larger the first cumulative number of pages C1 is, the larger the amount of the fixing liquid in the collection tray 121 is. The smaller the first cumulative number of pages C1 is, the smaller the amount of the fixing liquid in the supply tank 115 is. Therefore, the controller 200 lengthens the driving time of the collection pump 123 in the collection process as the first cumulative number of pages C1 increases. In other words, the controller 200 lengthens time of the collection process as the first cumulative number of pages C1 increases.

Then, in a case where a new print job is not received during the collection process (S207: NO), the controller 200 ends the collection process (S208). The new print job is herein defined as an interrupting job.

Specifically, the controller 200 closes the collection valve 124 and then stops the collection pump 123. The flow of the fixing liquid from the collection tray 121 to the supply tank 115 thereby stops and the collection process ends.

Then, when the collection process is finished (S208), the controller 200 resets the first cumulative number of pages C1 (S209). That is, the next first cumulative number of pages C1 is the cumulative number of pages printed after the current first cumulative number of pages C1 is reset. In other words, the first cumulative number of pages C1 is the cumulative number of pages printed after the previous collection process.

Figure 11:
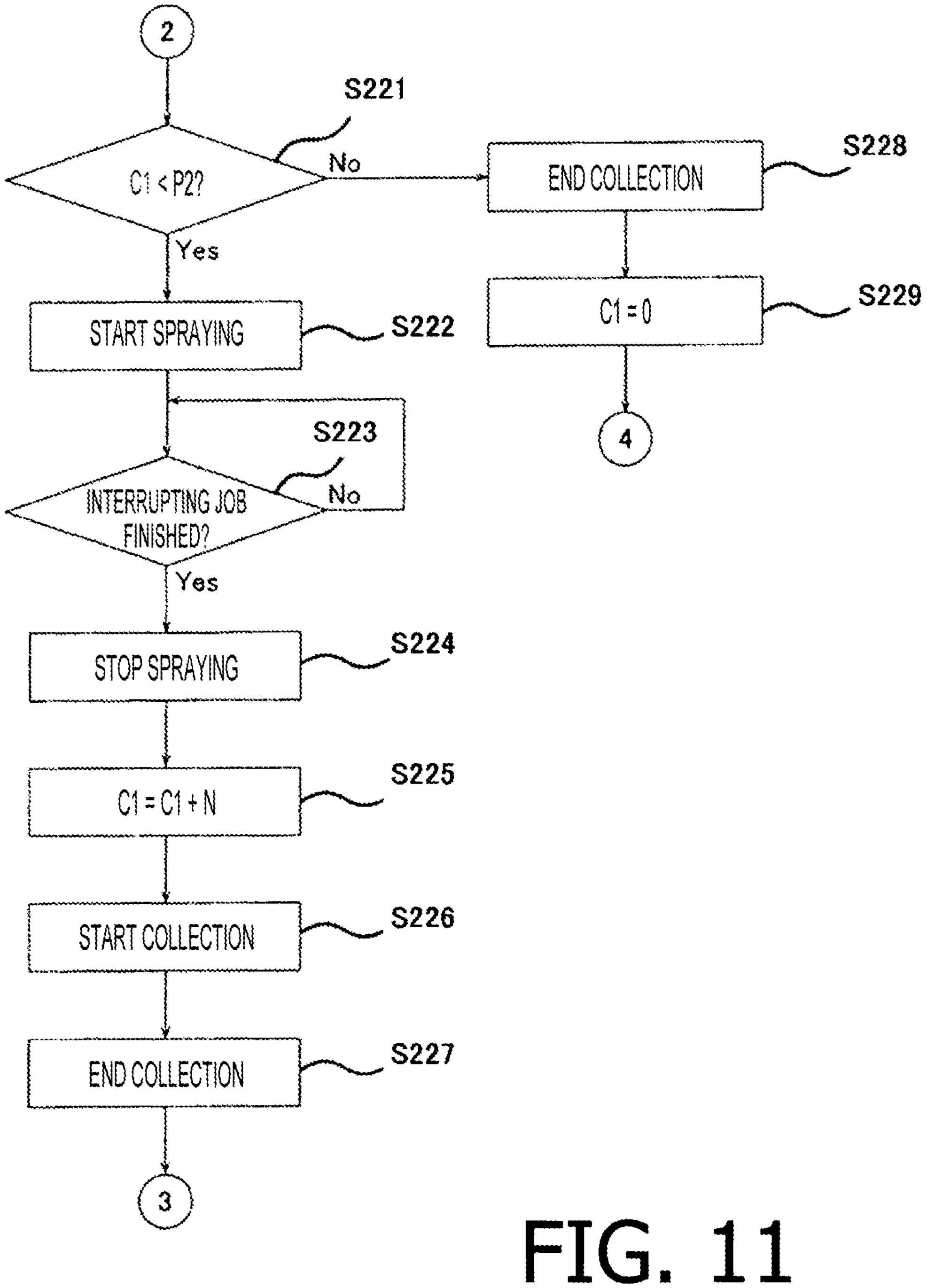
FIG. 11 is a flowchart for a case where an interrupting job is received during a collection process shown in FIG. 10.

As shown in FIG. 11, when the interrupting job is received during the collection process (S207: YES, see FIG. 10) and the first cumulative number of pages C1 is less than the second set value P2 (S221: YES), the controller 200 executes the collection process after executing the interrupting job (S226).

Specifically, in order to print an image on the sheet S in accordance with the interrupting job, the controller 200 aborts the collection process and causes the spraying device 9 to spray the fixing liquid (S222).

Then, after the interrupting job is finished (S223: YES), the controller 200 stops the spraying of the fixing liquid from the spraying device 9 (S224).

Then, the controller 200 executes collection process (S226).

The controller 200 adds the number of pages N printed in the interrupting job to the first cumulative number of pages C1 (S225).

Then, in the collection process (S226) after the interrupting job, based on the first cumulative number of pages C1 to which the number of pages N printed in the interrupting job is added, the controller 200 lengthens the driving time of the collection pump 123 in the collection process as the first cumulative number of pages C1 increases.

Then, after the collection process is finished (S227), the controller 200 resets the first cumulative number of pages C1 (S209, see FIG. 10).

On the other hand, when the interrupting job is received during the collection process (S207: YES, see FIG. 10) and the first cumulative number of pages C1 is equal to or greater than the second set value P2 (S221: NO), the controller 200 executes the interrupting job (S202, see FIG. 9) after the collection process (S228).

Specifically, the controller 200 continues the collection process without executing the interrupting job, and finishes the collection process (S228).

Then, the controller 200 resets the first cumulative number of pages C1 (S229) and executes the interrupting job (S202, see FIG. 9).

Figure 12:
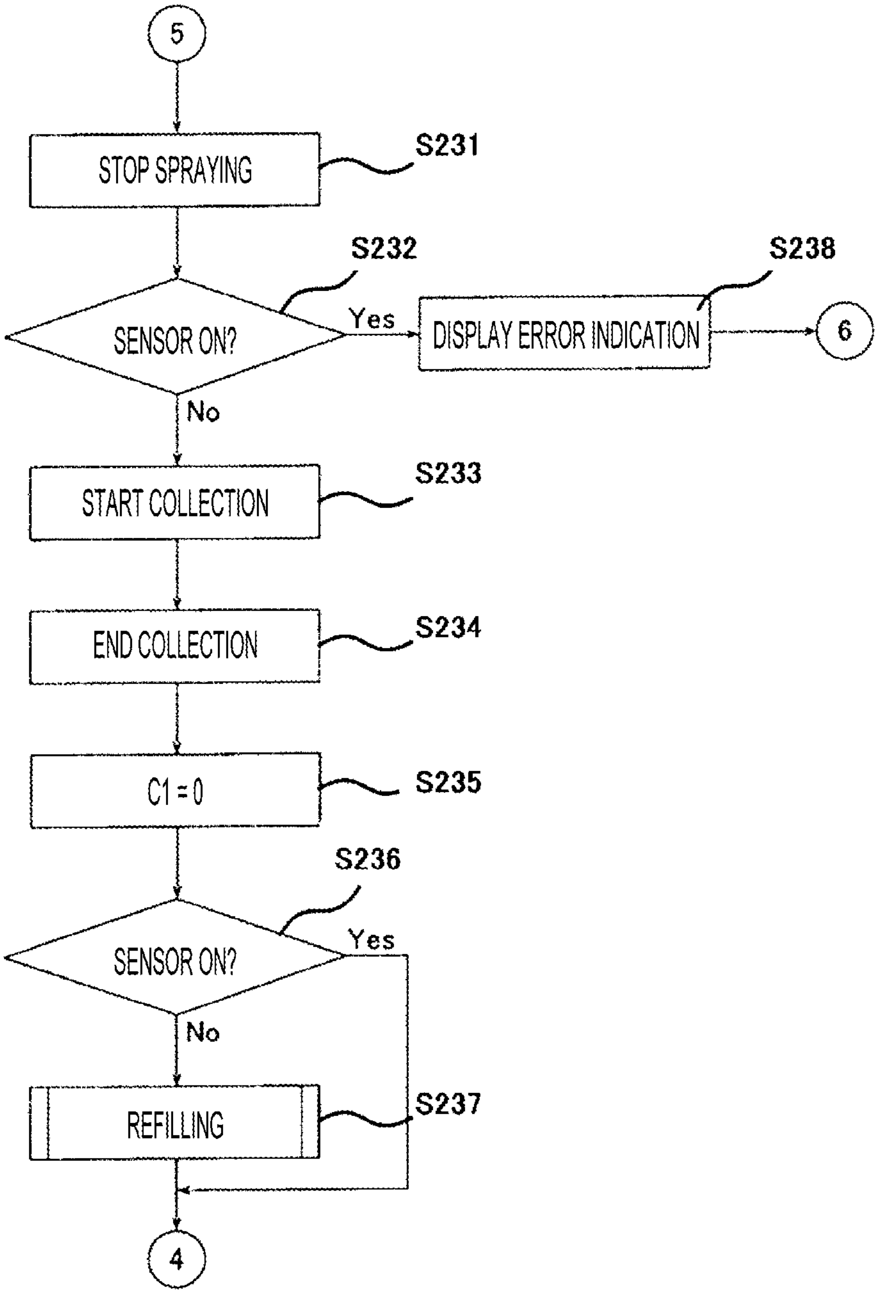
FIG. 12 is a flowchart for a case where a first cumulative number of pages becomes equal to or greater than a first set value during execution of a print job shown in FIG. 9.

As shown in FIG. 12, when the first cumulative number of pages C1 becomes equal to or greater than the first set value P1 while executing the print job (S203: NO, see FIG. 9), the controller 200 aborts the print job (S231) and executes the collection process (S233).

Specifically, when the first cumulative number of pages C1 becomes equal to or greater than the first set value P1 while executing the print job (S203: NO, see FIG. 9), the controller 200 stops the spraying of the fixing liquid from the spraying device 9 (S231).

Then, when the sensor 117 is off (S232: NO), the controller 200 starts the collection process (S233). The controller 200 lengthens the driving time of the collection pump 123 in the collection process as the first cumulative number of pages C1 increases.

Then, after finishing the collection process (S234), the controller 200 resets the first cumulative number of pages C1 (S235).

Figure 13:
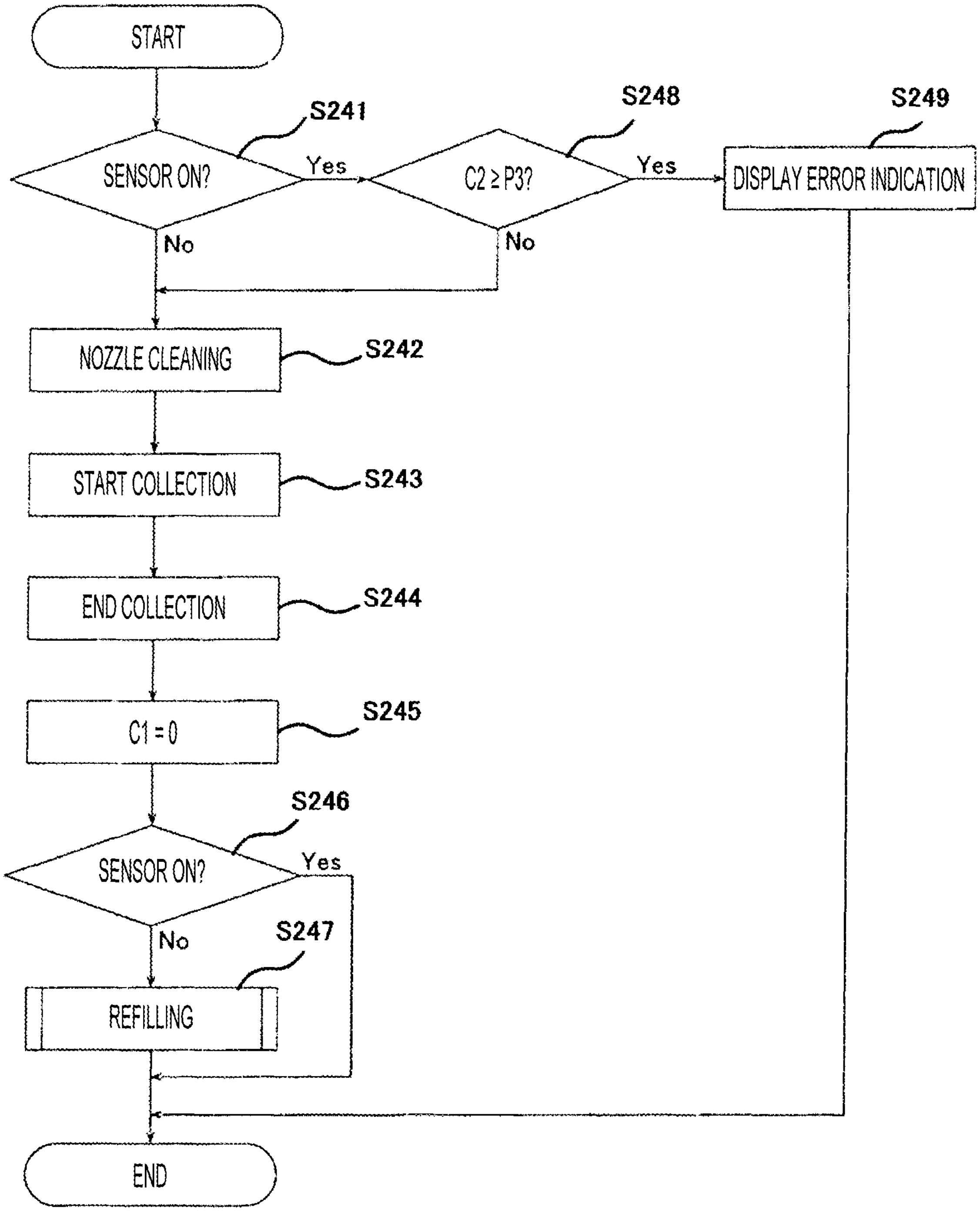
FIG. 13 is a flowchart of a recovery process after a sheet stuck in the image forming apparatus according to the second embodiment is removed.

FIG. 13 is a flowchart showing a recovery process of the image forming apparatus 201 when an error such as clogging of the sheet S occurred in the image forming apparatus 201 and the error is resolved by, for instance, removal of the clogged sheet S by the user.

As shown in FIG. 13, in the recovery process, the controller 200 executes the collection process (S243) after a nozzle cleaning (S242).

Specifically, when the sensor 117 is off (S241: NO), the controller 200 executes the nozzle cleaning (S242). In the nozzle cleaning (S242), the controller 200 cleans the nozzles 92 by spraying the fixing liquid from the nozzles 92.

When the sensor 117 is in on (S241: YES) and a second cumulative number of pages C2 is less than the third set value P3 (S248: NO), the controller 200 executes the nozzle cleaning (S242). The second cumulative number of pages C2 is the cumulative number of pages printed after the previous refilling process. The refilling process will be described later.

Then, the controller 200 starts the collection process (S243). The controller 200 lengthens the driving time of the collection pump 123 in the collection process as the first cumulative number of pages C1 increases.

Then, after finishing the collection process (S244), the controller 200 resets the first cumulative number of pages C1 (S245).

As shown in FIGS. 10, 12, and 13, when the sensor 117 is off after the collection process (S210: NO, S236: NO, S246: NO), the controller 200 executes the refilling process (S211, S237, S247) In other words, when the sensor 117 detects that the amount of the fixing liquid in the supply tank 115 is less than the prescribed amount after the collection process, the controller 200 executes the refilling process.

When the sensor 117 is on after the collection process (S210: YES, S236: YES, S246: YES), the controller 200 does not execute the refilling process (S211, S237, S247).

Figure 14:
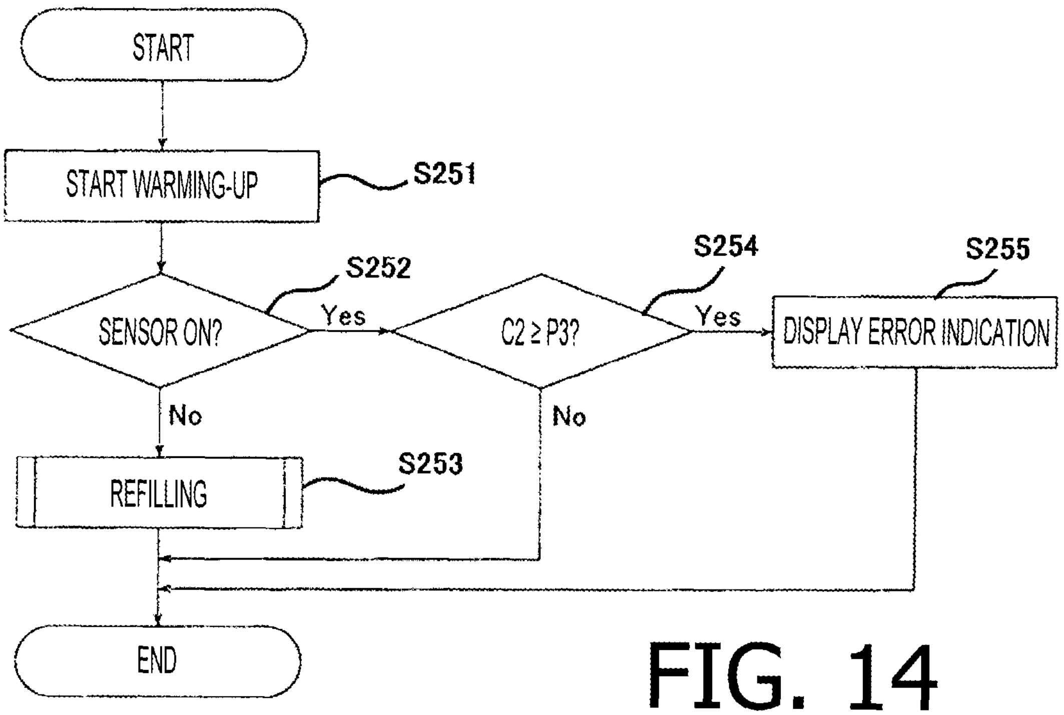
FIG. 14 is a flowchart of a warming up process of the image forming apparatus according to the second embodiment.

As shown in FIG. 14, during a warming-up process (S251) of the image forming apparatus 201, when the sensor 117 is off (S252: NO), the controller 200 executes the refilling process (S253). In other words, during the warming-up process of the image forming apparatus 201, when the sensor 117 detects that the amount of the fixing liquid in the supply tank 115 is less than the prescribed amount, the controller 200 executes the refilling process. The warming-up process is a process required until the image forming apparatus 201 becomes ready to execute printing after the image forming apparatus 201 is powered on.

When the sensor 117 is on (S252: YES), the controller 200 does not execute the refilling process (S253).

In the refilling process, the controller 200 drives the refill pump 113 to send the fixing liquid accommodated in the fixing liquid cartridge 111 to the supply tank 115.

Specifically, the controller 200 drives the refill pump 113. Then, the controller 200 opens the refill valve 114 after the operation of the refill pump 113 is stabilized. The fixing liquid in the fixing liquid cartridge 111 is thereby sent to the supply tank 115.

Figure 15:
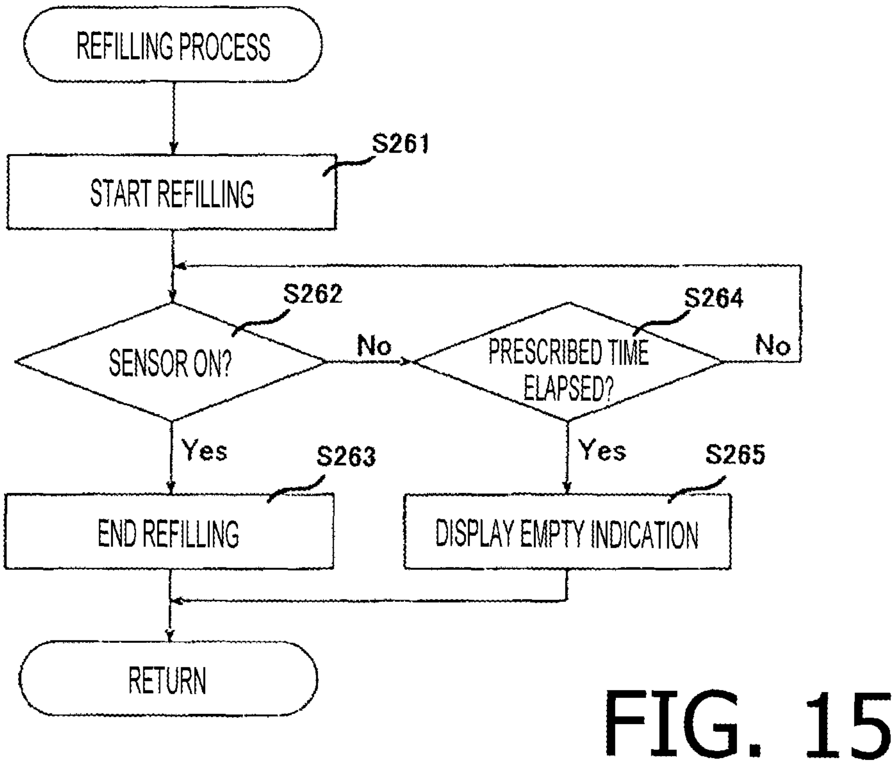
FIG. 15 is a flowchart of a refilling process shown in FIGS. 10, 12, 13, and 14.

As a result, as shown in FIG. 15, refilling of the supply tank 115 with the fixing liquid from the fixing liquid cartridge 111 starts (S261).

Then, when the sensor 117 is turned on before a prescribed time elapses (S262: YES), the controller 200 ends the refilling of the supply tank with the fixing liquid from the fixing liquid cartridge 111 (S263). The controller 200 may change the prescribed time in accordance with the first cumulative number of pages C1. Specifically, the controller 200 may lengthen the prescribed time as the first cumulative number of pages increases.

Specifically, the controller 200 closes the refill valve 114 and then stops the refill pump 113. The flow of the fixing liquid from the fixing liquid cartridge 111 to the supply tank 115 thereby stops and the refilling process ends.

On the other hand, when the sensor 117 does not turn on even after the elapse of the prescribed time (S262: NO, S264: YES), the controller 200 displays that the fixing liquid cartridge 111 is empty (S265).

The controller 200 executes an error displaying process when a failure of the sensor 117 is suspected. In the present embodiment, the error displaying process is executed when the sensor 117 is on although it is expected that the sensor 117 turns off.

Specifically, as shown in FIGS. 10, 13, and 14, when the sensor 117 is on (S210: YES, S241: YES, S252: YES) and the second cumulative number of pages C2 is equal to or greater than the third set value P3 (S212: YES, S248: YES, S254: YES), the controller 200 executes the error displaying process (S213, S249, S255). In other words, when the second cumulative number of pages C2 is equal to or greater than the third set value P3 and the sensor 117 does not detect that the amount of the fixing liquid in the supply tank 115 is less than the prescribed amount, the controller 200 executes the error displaying process.

More specifically, as shown in FIG. 10, after finishing the execution of the print job (S204: YES, see FIG. 9), when the sensor 117 is on (S210: YES) and the second cumulative number of pages C2 is equal to or greater than the third set value P3 (S212: YES), the controller 200 executes the error displaying process (S213). In other words, after finishing the execution of the print job, when the second cumulative number of pages C2 is equal to or greater than the third set value P3 and the sensor 117 does not detect that the amount of the fixing liquid in the supply tank 115 is less than the prescribed amount, the controller 200 executes the error displaying process.

As shown in FIG. 13, in the recovery process, the controller 200 executes the error displaying process (S249) when the sensor 117 is on (S241: YES) and the second cumulative number of pages C2 is equal to or greater than the third set value P3 (S248: YES). In other words, in the recovery process after the sheet S clogged in the image forming apparatus 201 is removed, the controller 200 executes the error displaying process when the second cumulative number of pages C2 is equal to or greater than the third set value P3 and the sensor 117 does not detect that the amount of the fixing liquid in the supply tank 115 is less than the prescribed amount.

As shown in FIG. 14, during the warming-up process of the image forming apparatus 201, the controller 200 executes the error displaying process (S255) when the sensor 117 is on (S252: YES) and the second cumulative number of pages C2 is equal to or greater than the third set value P3 (S254: YES). In other words, during the warming-up process of the image forming apparatus 201, the controller 200 executes the error displaying process when the second cumulative number of pages C2 is equal to or greater than the third set value P3 and the sensor 117 does not detect that the amount of the fixing liquid in the supply tank 115 is less than the prescribed amount.

As shown in FIG. 12, when the first cumulative number of pages C1 becomes equal to or greater than the first set value P1 during execution of the print job (S203: NO, see FIG. 9) and the sensor 117 is in the ON state (S203: YES), the controller 200 executes the error displaying process (S238).

In the error displaying process, for example, the controller 200 causes a display device 21 provided on an outer surface of the main body housing 2 (see FIG. 7) to display an error indication indicating that the sensor 117 may have failed.

As shown in FIG. 10, after the collection process, when the sensor 117 is on (S210: YES) and the second cumulative number of pages C2 is less than the third set value P3 (S212: NO), the control controller 200 ends the process without executing the refilling process. Similarly, as shown in FIG. 14, after during the warming-up process, when the sensor 117 is on (YES) and the second cumulative number of pages C2 is less than the third set value P3 (S254: NO), the control controller 200 ends the process without executing the refilling process and the error displaying process.

The display device is not limited. For example, the display device may be an LED, and the error indication indicating that the sensor 117 may have failed may be a blinking pattern of the LED. The display device may be a display of a personal computer connected to the image forming apparatus 201 via a local area network or the like, and an error message indicating that the sensor 117 may have failed may be displayed.

Effects of Second Embodiment (1) According to the image forming apparatus 201 of the second embodiment, as shown in FIGS. 9 and 10, when the execution of the print job is finished (S204: YES), the fixing liquid in the collection tray 121 can be sent to the supply tank 115 (S206).

Therefore, it is possible to collect the fixing liquid that has not adhered to the sheet S while suppressing grow in size of the collection tray 121.

It is also possible to execute the collection process when the amount of the fixing liquid in the collection tray 121 reaches a prescribed amount regardless of whether or not the execution of the print job is finished.

However, in the present embodiment, the fixing liquid in the housing 91 is positively charged by the nozzle electrode 93 to which the positive voltage is applied. In this case, the fixing liquid in the supply tank 115 connected to the housing 91 is also positively charged. On the other hand, the fixing liquid in the collection tray 121 is negatively charged by the counter electrode 94 to which the negative voltage is applied.

Therefore, if the collection process is executed while the fixing liquid is sprayed from the spraying device 9, the negatively charged fixing liquid in the collection tray 121 will be collected in the supply tank 115 accommodating the positively charged fixing liquid.

As a result, in the supply tank 115, electrical interference (phenomena such as short) occurs between the negatively charged fixing liquid and the positively charged fixing liquid, and the spraying state may become unstable.

Therefore, when executing the collection process while executing the print job, it is necessary to abort the execution of the print job to execute the collection process.

If the execution of the print job is aborted to execute the collection process, printing speed decreases.

In this respect, according to the image forming apparatus 201 of the second embodiment, since the collection process (S206) is executed after the execution of the print job is finished (S204: YES), the collection process during the execution of the print job can be suppressed and thus the decrease in the printing speed can be suppressed.

(2) According to the image forming apparatus 201 of the second embodiment, the controller 200 lengthens the driving time of the collection pump 123 in the collection process (S206) as the first cumulative number of pages C1 increases.

Therefore, when the first cumulative number of pages C1 is small and the amount of fixing liquid in the collection tray 121 is small, the time of the collection process (S206) can be shortened to shorten waiting time for printing.

When the first cumulative number of pages C1 is large and the amount of the fixing liquid in the collection tray 121 is large, the time of the collection process (S206) can be lengthened to reliably send the fixing liquid in the collection tray 121 to the supply tank 115.

(3) According to the image forming apparatus 201 of the second embodiment, as shown in FIG. 11, when the first cumulative number of pages C1 is less than the first set value P1 (S203: YES, see FIG. 9), the interrupting job is received during the collection process (S207: YES, see FIG. 10), and the first cumulative number of pages C1 is equal to or greater than the second set value P2 (S221: NO), the controller 200 executes the interrupting job (S202, see FIG. 9) after the collection process (S228).

When the first cumulative number of pages C1 is equal to or greater than the second set value P2, there is a high possibility that the collection tray 121 overflows.

In this respect, the collection tray 121 can be prevented from overflowing by giving priority to the collection process over the interrupting job.

On the other hand, when the first cumulative number of pages C1 is less than the first set value P1 (S203: YES, see FIG. 9), the interrupting job is received during the collection process (S207: YES, see FIG. 10), and the first cumulative number of pages C1 is less than the second set value P2 (S221: YES), the controller 200 executes the collection process (S226) after the interrupting job (S223: YES).

When the first cumulative number of pages C1 is less than the second set value P2, the collection tray 121 is less likely to overflow.

Therefore, by giving priority to the interrupting job over the collection process, the waiting time for printing can be shortened.

(4) According to the image forming apparatus 201 of the second embodiment, in the collection process (S226) after the interrupting job, based on the first cumulative number of pages C1 obtained by adding the number of pages printed in the interrupting job, the controller 200 lengthens the driving time of the collection pump 123 in the collection process (S226) as the first cumulative number of pages C1 increases.

Therefore, when the interrupting job is given priority over the collection process, time of the collection process time can be lengthened by a time period corresponding to the number of pages printed in the interrupting job.

Therefore, even when the interrupting job is given priority over the collection process, the fixing liquid in the collection tray 121 can be reliably sent to the supply tank 115.

(5) According to the image forming apparatus 201 of the second embodiment, as shown in FIG. 12, when the first cumulative number of pages C1 becomes equal to or greater than the first set value P1 during execution of the print job (S203: NO, see FIG. 9), the controller 200 aborts the print job (S231) and executes the collection process (S233).

As a result, it is possible to prevent air from entering the nozzles 92 by continuing the print job in a state where the fixing liquid in the supply tank 115 is empty.

(6) According to the image forming apparatus 201 of the second embodiment, as shown in FIGS. 10, 12, and 13, after the collection process (S208, S234, S244), when the sensor 117 detects that the amount of the fixing liquid in the supply tank 115 is less than the prescribed amount (S210: NO, S236: NO, S246: NO), the controller 200 executes the refilling process (S211, S237, S247).

If the collection process is executed after the refilling process, the fixing liquid may be sent from the collection tray 121 to the supply tank 115 by the collection process after the supply tank 115 becoming full due to the refilling process, and the supply tank 115 may overflow.

In this respect, according to such a configuration, since the refilling process is executed after the collection process, it is possible to prevent the supply tank 115 from overflowing due to the collection process.

(7) According to the image forming apparatus 201 of the second embodiment, as shown in FIGS. 10, 13, and 14, when the second cumulative number of pages C2 is equal to or greater than the third set value P3 (S212: YES, S248: YES, S254: YES) and the sensor 117 does not detect that the amount of the fixing liquid in the supply tank 115 is less than the prescribed amount (S210: YES, S241: YES, S252: YES), the controller 200 executes the error displaying process (S213, S249, S255).

Figure 7:
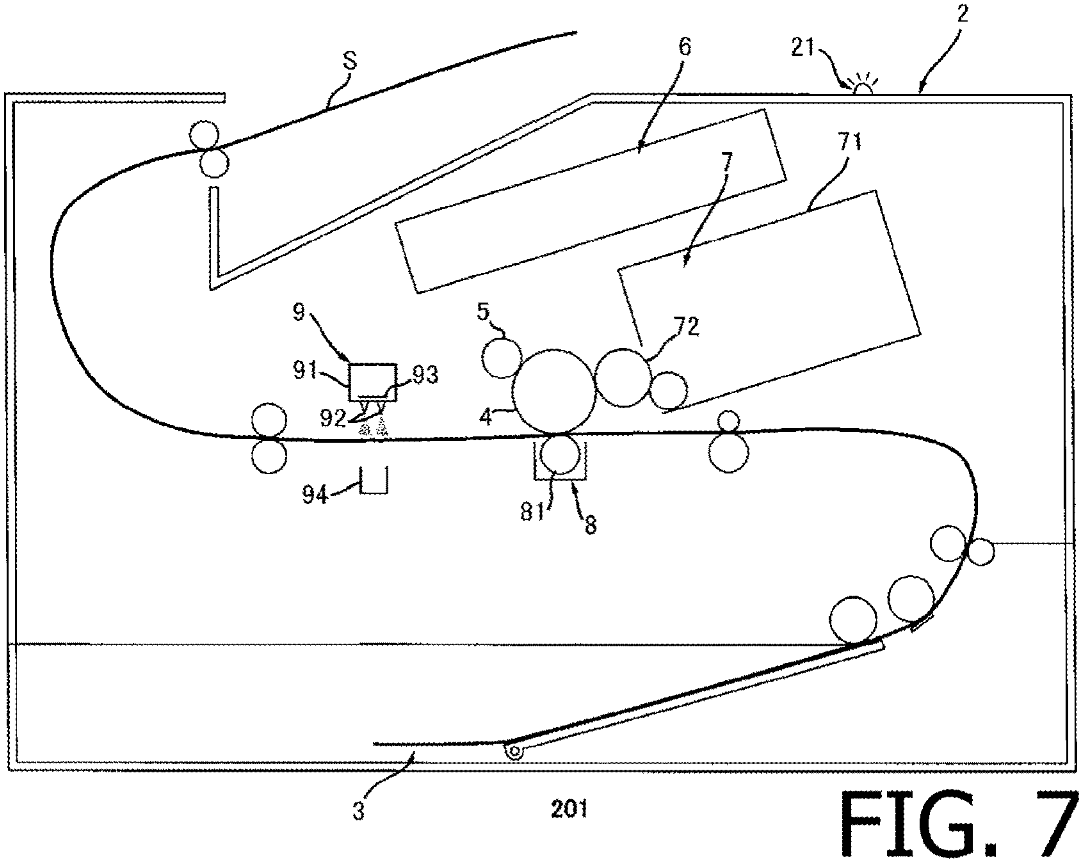
FIG. 7 is a diagram showing a schematic configuration of an image forming apparatus according to a second embodiment of the present invention.

Therefore, when the sensor 117 does not detect the decrease in the amount of the fixing liquid in the supply tank 115 although it is expected that the amount of the fixing liquid in the supply tank 115 is decreasing, the failure of the sensor 117 can be displayed on the display device 21 (see FIG. 7).

THIRD EMBODIMENT

Next, an image forming apparatus according to a third embodiment of the present invention will be described in detail with reference to FIGS. 16 to 21.

In an image forming apparatus provided with a fixing device that sprays fixing liquid accommodated in a reservoir toward a sheet to perform fixing and a collection tray that collects the fixing liquid which has not adhered to the sheet, the fixing liquid remaining inside the reservoir or on the collection tray may leak out due to vibration, impact, or inclination of the image forming apparatus when the image forming apparatus is moved or transported. The third embodiment addresses such problem.

In the following description, directions will be described in accordance with directions shown in FIG. 16. That is, in FIG. 16, the right side when facing the plane of paper is referred to as "front side," the left side when facing the plane of paper is referred to as "rear side," the back side when facing the plane of paper is referred to as "right side," and the front side when facing the plane of paper is referred to as "left side." The vertical direction when facing the plane of paper is referred to as "up-down direction."

Figure 16:
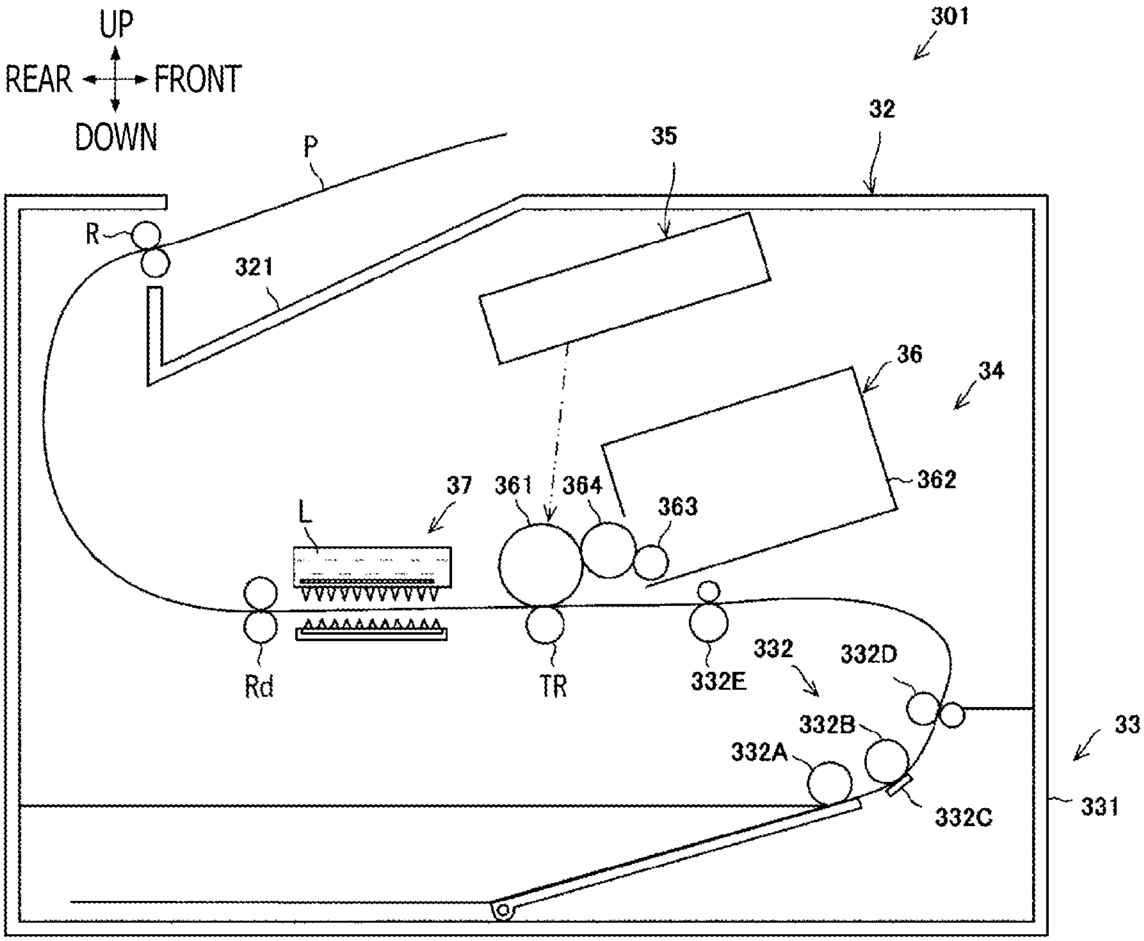
FIG. 16 is a diagram showing a configuration of a laser printer according to a third embodiment of the present invention.

FIG. 16 is a diagram showing a configuration of a laser printer 301 as an example of an image forming apparatus according to the third embodiment of the present invention. As shown in FIG. 16, the laser printer 301 includes a main body housing 32, a feeder 33 for feeding a paper P as an example of a recording sheet, and an image forming engine 34 for forming an image on the paper P.

The feeder 33 includes a sheet feed tray 331 detachably mounted on a lower portion of the main body housing 32, and a sheet feed mechanism 332 that feeds the paper P in the sheet feed tray 331 toward the image forming engine 34. The sheet feed mechanism 332 includes a sheet feed roller 332A, a separation roller 332B, a separation pad 332C, a paper dust removing roller 332D, and a registration roller 332E. The registration roller 332E is a roller that aligns a leading end position of the paper P, and can be stopped and rotated appropriately by a controller 300 described later.

The image forming engine 34 is accommodated in the main body housing 32, and mainly includes a scanner 35, a process cartridge 36, a transfer roller TR, and a fixing device 37.

The scanner 35 is provided at an upper portion inside the main body housing 32, and includes a laser emitter, a polygon mirror, a lens, a reflecting mirror and the like which are not shown. In the scanner 35, a laser beam is irradiated onto a surface of a photosensitive drum 361 which will be described later by high-speed scanning.

The process cartridge 36 is detachable from the main body housing 32. The process cartridge 36 includes the photosensitive drum 361 on which an electrostatic latent image is to be formed, a not-shown charger, a toner reservoir 362 that accommodates toner, and a supply roller 363 and a developing roller 364 that supply toner inside the toner reservoir 362 to the photosensitive drum 361.

In the process cartridge 36, the not-shown charger uniformly charges the surface of the rotating photosensitive drum 361. The scanner 35 emits a laser beam to the surface of the photosensitive drum 361 to expose the surface of the photosensitive drum 361, thereby forming an electrostatic latent image based on image data on the surface of the photosensitive drum 361.

Then, the developing roller 364, which is driven to rotate, supplies toner to the electrostatic latent image on the photosensitive drum 361, thereby forming a toner image on the surface of the photosensitive drum 361. Then, the toner image carried on the surface of the photosensitive drum 361 is attracted by the transfer roller TR when the paper P is conveyed between the photosensitive drum 361 and the transfer roller TR, and is transferred onto the paper P.

The fixing device 37 is a device that fixes the toner image on the paper P by supplying charged fixing liquid L to the toner image on the paper P by electrostatic spraying. The configuration of the fixing device 37 will be described in detail later.

On the downstream side of the fixing device 37, there are provided a pair of downstream-side conveying rollers Rd for nipping and conveying the paper P discharged from the fixing device 37 to the downstream side. The paper P conveyed by the downstream-side conveying rollers Rd is conveyed to a sheet discharge roller R, and is discharged from the sheet discharge roller R onto a sheet discharge tray 321. Next, the configuration of the fixing device 37 will be described in detail.

Figure 17:
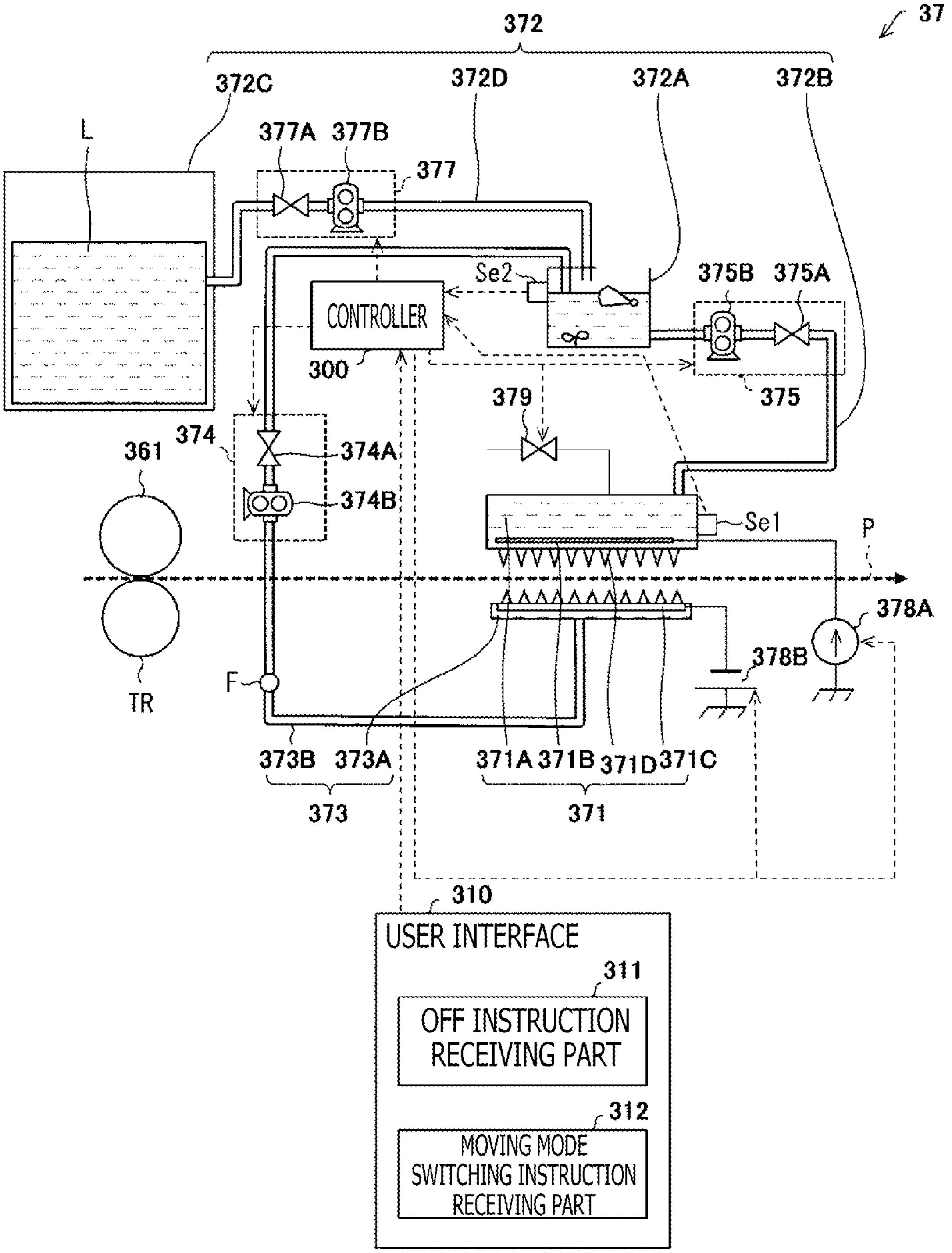
FIG. 17 is a diagram showing a configuration of a fixing device according to the third embodiment.

FIG. 17 is a diagram showing a specific configuration of the fixing device 37. As shown in FIG. 17, the fixing device 37 includes a spraying unit 371, a supply unit 372, a collecting unit 373, and a controller 300. The fixing device 37 further includes an air supply section 379, a first power source 378A, and a second power source 378B.

The spraying unit 371 sprays the fixing liquid L for fixing the toner transferred onto the paper P to the paper P. The spraying unit 371 has a housing 371A configured to accommodate the fixing liquid L, a nozzle electrode 371B that charges the fixing liquid L inside the housing 371A, a counter electrode 371C spaced apart from the nozzle electrode 371B, and nozzles 371D that spray the fixing liquid L inside the housing 371A to the paper P onto which the toner has been transferred when a potential difference between the nozzle electrode 371B and the counter electrode 371C is equal to or greater than a prescribed spraying potential difference (prescribed value).

As the fixing liquid L, a solution in which a solute for dissolving the toner is dispersed in a solvent having a high dielectric constant can be used in order to favorably perform electrostatic spraying and perform fixing. As the solvent having a high dielectric constant, safe water can be used. That is, in the present embodiment, the toner is dissolved by a so-called oil-in-water type emulsion in which a solute for dissolving the toner is dispersed in water. That is, a fixing liquid formed by dispersing, in water, a solute which is insoluble or hardly soluble in water being a solvent. Surfactant may be added to favorably form emulsion.

The supply unit 372 supplies the fixing liquid L to the spraying unit 371. The supply unit 372 has a tank 372A configured to accommodate the fixing liquid L, and a supply pipe 372B connected to the tank 372A and that allows the fixing liquid L accommodated in the tank 372A to pass therethrough.

The supply pipe 372B has a second liquid sending section 375 that controls the supply of the fixing liquid L. Specifically, as the second liquid sending section 375, the supply pipe 372B is provided with a second pump 375B and a second valve 375A in this order from the tank 372A side. The second pump 375B has a function of pressurizing the fixing liquid L by sending the fixing liquid L from the tank 372A to the housing 371A, and is controlled by a motor. The second valve 375A has a function of adjusting a flow rate of the fixing liquid L supplied from the tank 372A to the housing 371A by using an electromagnetic valve. However, the second liquid sending section 375 does not necessarily need to include the second valve 375A, and may include the second pump 375B only.

The supply unit 372 further has a cartridge 372C that accommodates the fixing liquid L, and a cartridge supply pipe 372D connected to the cartridge 372C and that allows the fixing liquid L accommodated in the cartridge 372C to pass therethrough.

The cartridge supply pipe 372D has a fourth liquid sending section 377 that controls the supply of the fixing liquid L. Specifically, as the fourth liquid sending section 377, the cartridge supply pipe 372D is provided with a fourth valve 377A and a fourth pump 377B in this order from the cartridge 372C side. The fourth valve 377A has a function of adjusting a flow rate of the fixing liquid L supplied from the cartridge 372C to the tank 372A by using an electromagnetic valve. The fourth pump 377B has a function of pressurizing the fixing liquid L by sending the fixing liquid L from the cartridge 372C to the tank 372A, and is controlled by a motor. However, the fourth liquid sending section 377 does not necessarily need to include the fourth valve 377A, and may include the fourth pump 377B only.

The collecting unit 373 collects the fixing liquid L sprayed from the nozzles 371D but not adhered to the paper P. The collecting unit 373 has a collection tray 373A configured to accommodate the fixing liquid L, and a collection pipe 373B connected to the collection tray 373A and that allows the fixing liquid L in the collection tray 373A to pass therethrough.

In the spraying unit 371, the housing 371A, the nozzle electrode 371B, and the nozzles 371D are disposed above the collection tray 373A. In particular, the nozzles 371D are disposed so as to spray the fixing liquid L downward. On the other hand, the counter electrode 371C is disposed in the collection tray 373A. The counter electrode 371C has a plurality of projection extending toward the nozzles 371D.

The collection pipe 373B has a first liquid sending section 374 that sends the fixing liquid L to the tank 372A. Specifically, as the first liquid sending section 374, the collection pipe 373B is provided with a first pump 374B and a first valve 374A in this order from the collection tray 373A side. The first pump 374B has a function of pressurizing the fixing liquid L by sending the fixing liquid L from the collection tray 373A to the tank 372A, and is controlled by a motor. The first valve 374A has a function of adjusting a flow rate of the fixing liquid L circulating from the collection tray 373A to the tank 372A by using an electromagnetic valve. However, the first liquid sending section 374 does not necessarily need to have the first valve 374A, and may have the first pump 374B only. A filter F for removing impurities from the fixing liquid L is provided to the collection pipe 373B between the collection tray 373A and the first liquid sending section 374.

The first power source 378A is a constant current source that applies a voltage by inputting a current to the nozzle electrode 371B. The second power source 378B is a constant voltage source that applies a constant voltage to the counter electrode 371C.

The air supply section 379 supplies air to the housing 371A. In the present embodiment, the air supply section 379 has a function of adjusting a flow rate of air flowing into the housing 371A by using an electromagnetic valve. In a state where the air supply section 379 is closed, air is not supplied to the housing 371A. Therefore, the fixing liquid L in the housing 371A does not go out from the nozzles 371D except when the voltage is applied to the nozzle electrode 371B and the counter electrode 371C. In a state where the air supply section 379 is open, air is supplied to the housing 371A. Therefore, atmospheric pressure acts on the fixing liquid L in the housing 371A, and the fixing liquid L is pushed out from the nozzles 371D and falls.

The fixing device 37 further includes a first sensor Se1 configured to detect an accommodating state of the fixing liquid L in the housing 371A and a second sensor Se2 configured to detect an accommodating state of the fixing liquid L in the tank 372A. The first sensor Se1 is, for example, a pressure sensor that outputs a signal corresponding to the pressure by the fixing liquid L to the controller 300, and the second sensor Se2 is, for example, a photoelectric sensor that outputs a signal having a magnitude corresponding to the amount of received light.

Figure 18:
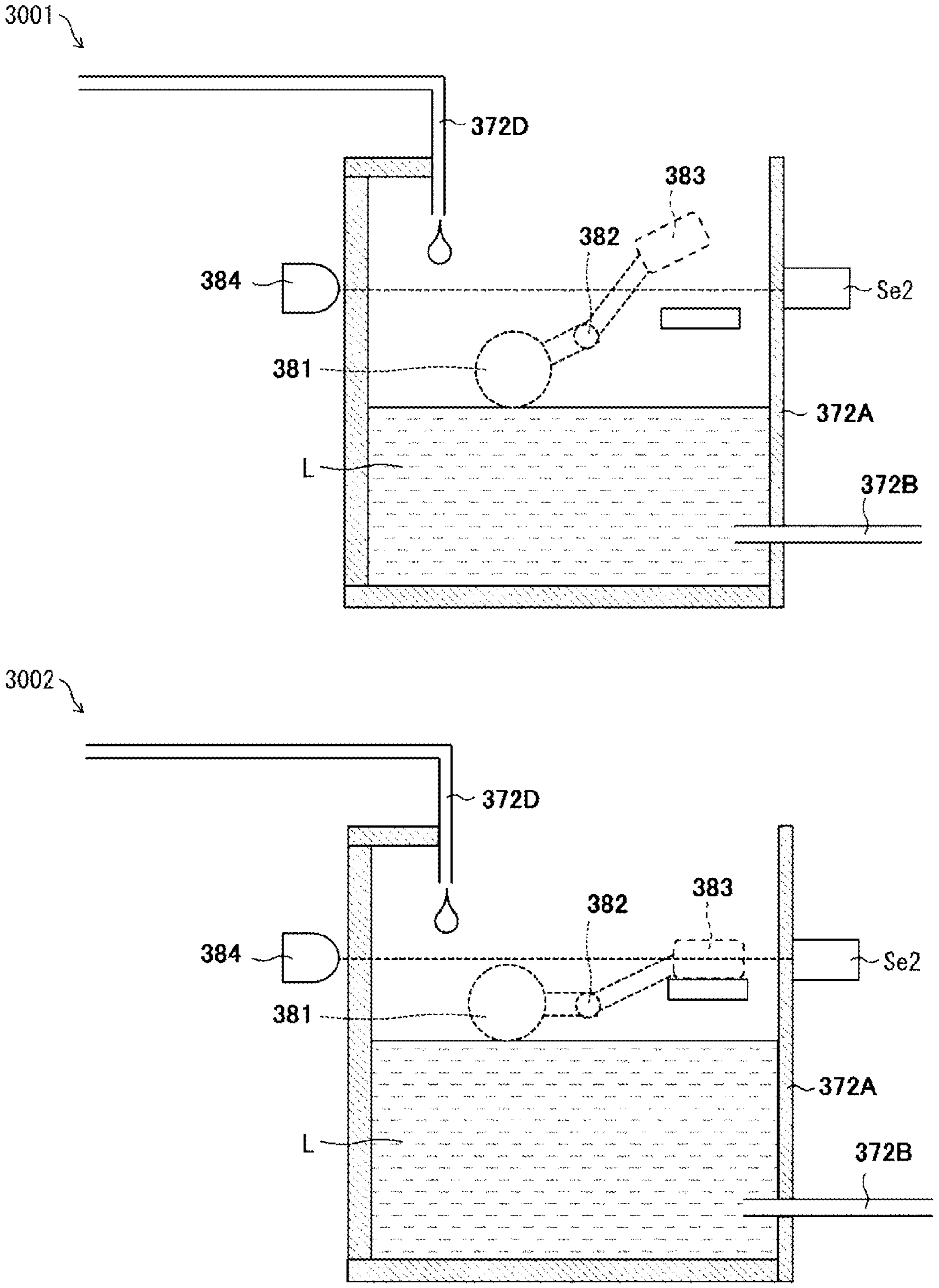
FIG. 18 is a diagram showing an example of a configuration of a second sensor according to the third embodiment.

FIG. 18 is a diagram showing a method for detecting the accommodating state of the fixing liquid L inside the tank 372A in case the second sensor Se2 is a photoelectric sensor. In FIG. 18, reference numeral 3001 indicates a state in which the amount of the fixing liquid L accommodated in the tank 372A is less than a prescribed amount, and reference numeral 3002 indicates a state in which the amount of the fixing liquid L accommodated in the tank 372A is equal to or greater than the prescribed amount.

The tank 372A is provided with a float 381, a rotation shaft 382, a light blocker 383, and a light projector 384. The float 381 is formed of a material floating on the fixing liquid L. The float 381 has a spherical shape but is not limited to this shape. The light blocker 383 is formed of a material that does not transmit light. The light blocker 383 has a plate-like shape but is not limited to this shape.

The float 381 and the light blocker 383 are connected to the rotation shaft 382 such that their relative angle is constant. Therefore, as shown by reference numerals 3001 and 3002 in FIG. 18, positions of the float 381 and the light blocker 383 change in accordance with the amount of the fixing liquid L accommodated in the tank 372A.

The light projector 384 and the second sensor Se2 are provided on a side wall of the tank 372A so as to face each other. The light projector 384 emits light toward the second sensor Se2, and is a light-emitting diode, an infrared light emitter, or the like. As shown by the reference numeral 3002 in FIG. 18, the second sensor Se2 is provided at a position where the light from the light projector 384 is blocked by the light blocker 383 when the amount of the fixing liquid L accommodated in the tank 372A is equal to or greater than a prescribed amount. Therefore, when the amount of the fixing liquid L accommodated in the tank 372A is equal to or greater than the prescribed amount, a signal output from the second sensor Se2 becomes weak.

The laser printer 301 further includes a user interface 310. The user interface 310 receives instructions from a user to the laser printer 301. The user interface 310 includes an off instruction receiving part 311 and a moving mode switching instruction receiving part 312. The off instruction receiving part 311 receives an instruction to turn off the power of the laser printer 301. The off instruction receiving part 311 is a software-realized switch that generates an off signal upon receiving the instruction to turn off the power. The moving mode switching instruction receiving part 312 receives instructions to switch the moving mode on and off.

The controller 300 controls the first liquid sending section 374. The controller 300 also controls the fourth liquid sending section 377, and the air supply section 379. In the laser printer 301, the controller 300 integrally controls operation of the laser printer 301.

Operation of Laser Printer 301

Figure 19:
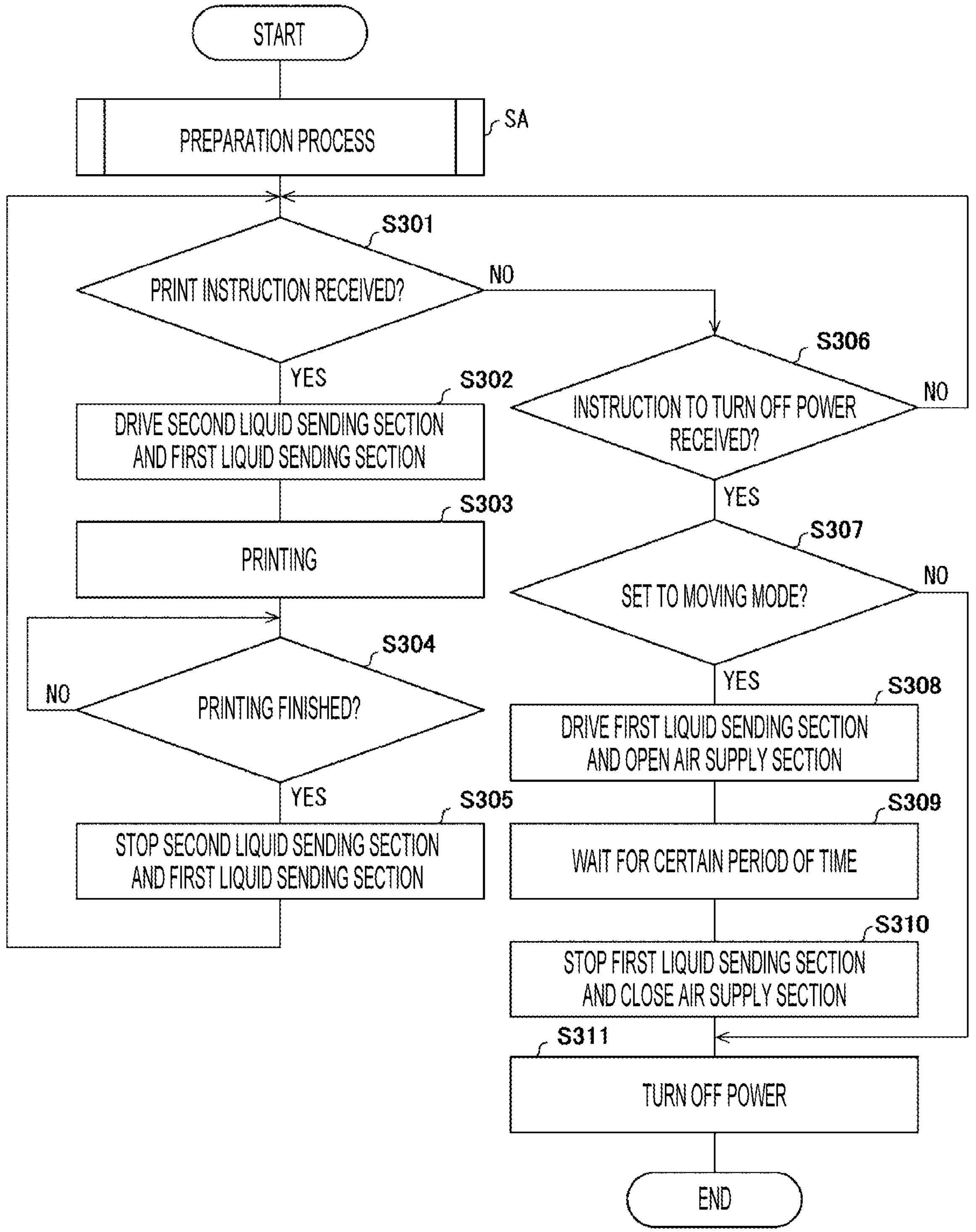
FIG. 19 is a flowchart showing an example of a process in the fixing device according to the third embodiment.

FIG. 19 is a flowchart showing an example of processes in the fixing device 37. When the power of the laser printer 301 is turned on, first, the controller 300 executes a preparation process (SA). Contents of the preparation process will be described later. Then, the controller 300 determines whether or not a print instruction to print on the paper P has been received (S301). In a case where the print instruction to print on the paper P has been received (Yes in S301), the controller 300 outputs a signal for driving the second liquid sending section 375 and the first liquid sending section 374 (S302). In this state, the controller 300 executes printing (image formation) on the paper P (S303). At this time, the controller 300 outputs signals for generating a potential difference necessary for spraying the fixing liquid L between the nozzle electrode 371B and the counter electrode 371C to the first power source 378A and the second power source 378B, and sprays the fixing liquid L from the nozzles 371D toward the toner image on the paper P. The controller 300 also outputs a signal for driving the fourth liquid sending section 377 as necessary to supply the fixing liquid L from the cartridge 372C to the tank 372A.

After starting printing on the paper P, the controller 300 determines whether or not the printing has been finished (S304). If the printing process has not been finished (NO in S304), the controller 300 continues spraying the fixing liquid L. If the printing process has been finished (YES in S304), the controller 300 stops the second liquid sending section 375 and the first liquid sending section 374 (S305). Then, the controller 300 repeats the processes from S301.

If the print instruction to print on the paper P has not been received (NO in S301), the controller 300 determines whether or not the off instruction receiving part 311 has received the instruction to turn off the power (S306). If the off instruction receiving part 311 has not received the instruction to turn off the power (NO in S306), the controller 300 repeats the processes from S301.

If the off instruction receiving part 311 has received the instruction to turn off the power (YES in S306), the controller 300 determines whether or not the mode of the fixing device 37 is set to the moving mode (S307). If the mode of the fixing device 37 is set to the moving mode (YES in S307), the controller 300 drives the first liquid sending section 374 and outputs a signal to open the air supply section 379 (S308) and waits for a certain period of time in this state (S309). Then, the controller 300 stops the first liquid sending section 374, outputs a signal to close the air supply section 379 (S310), and turns off the power of the laser printer 301 (S311). On the other hand, if the mode of the fixing device 37 is not set to the moving mode (NO in S307), the controller 300 turns off the power of the laser printer 301 (S311) without executing S308 to S310.

Figure 20:
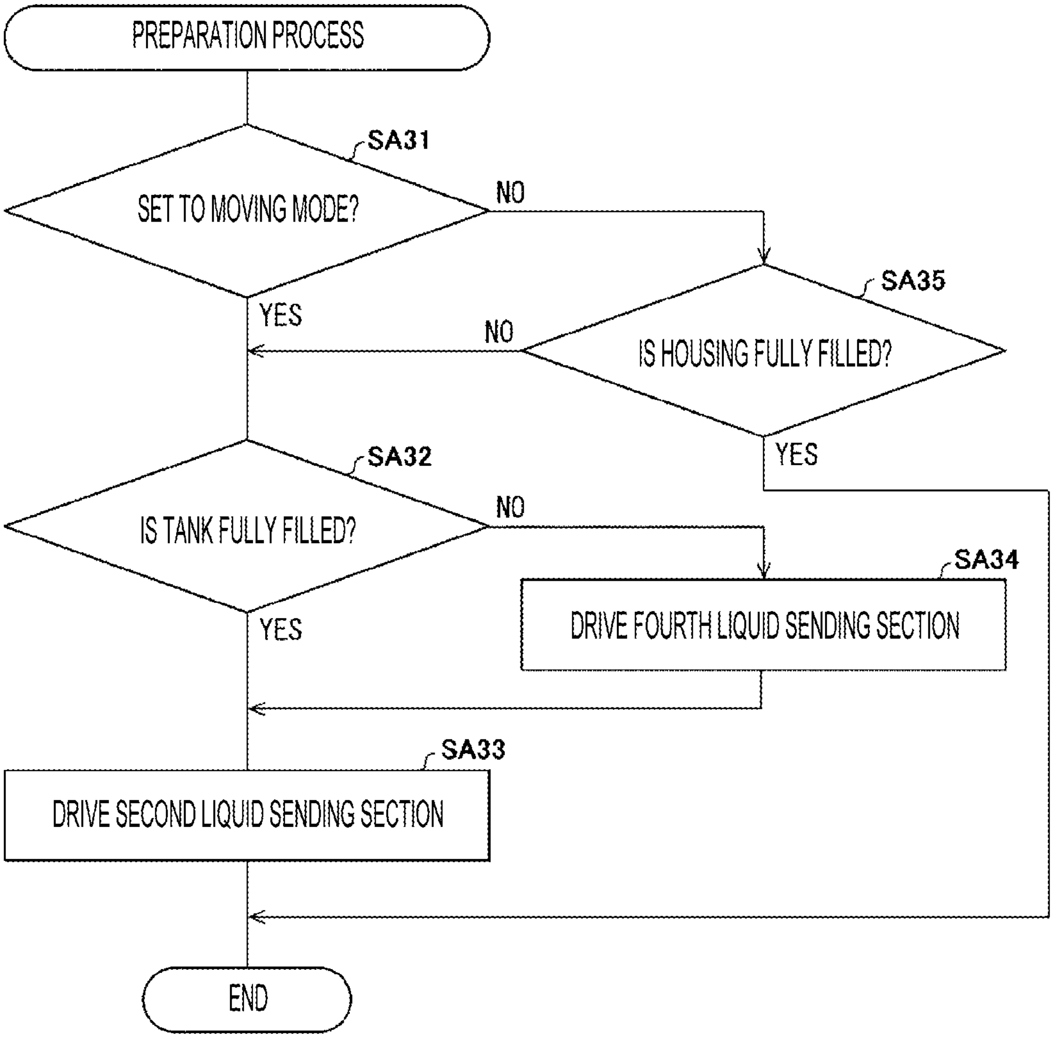
FIG. 20 is a flowchart showing contents of a "preparation process" in the flowchart shown in FIG. 19.

FIG. 20 is a flow chart showing the contents of the "preparation process" in the flow chart shown in FIG. 19. In the following description, a state of the housing 371A or the tank 372A when a signal indicating the detection result of the first sensor Se1 or the second sensor Se2 indicates that a prescribed amount of the fixing liquid L is accommodated in the housing 371A or the tank 372A may be expressed as being "fully filled."

In the preparation process, first, the controller 300 determines whether or not the fixing device 37 is set in the moving mode (SA31). When the fixing device 37 is set in the moving mode (YES in SA31), the controller 300 determines whether or not the tank 372A is fully filled with the fixing liquid L (SA32). When the tank 372A is fully filled with the fixing liquid L (YES in SA32), the controller 300 outputs a signal for causing the second liquid sending section 375 to drive (SA33). The housing 371A is thereby filled with the fixing liquid L. When the tank 372A is not fully filled with the fixing liquid L (NO in SA32), the controller 300 outputs a signal that causes the fourth liquid sending section 377 to drive (SA34). The tank 372A is thereby filled with the fixing liquid L. In this state, the controller 300 executes SA33.

When the fixing device 37 is not set in the moving mode (NO in SA31), the controller 300 determines whether or not the housing 371A is fully filled with the fixing liquid L (SA35). When the fixing liquid L is not set in the moving mode (NO in SA35), the controller 300 executes the processes of SA32 to SA34 as in the case where the fixing device 37 is set in the moving mode. When the housing 371A is fully filled with the fixing liquid L (YES in SA35), the controller 300 ends the preparation process.

When the off instruction receiving part 311 receives an instruction to turn off the power in the manner described above, in other words, when the off signal generated by the off instruction receiving part 311 is detected, the controller 300 executes the following liquid sending process. In the liquid sending process, the controller 300 outputs, to the air feeding section 379, a signal for causing the fixing liquid L in the housing 371A to be sprayed from the nozzles 371D, and outputs, to the first pump 374B, a signal for causing the fixing liquid L collected by the collecting unit 373 to be sent to the tank 372A. In a case where the first liquid sending section 374 includes the first valve 374A, the controller 300 also outputs, to the first valve 374A, a signal for causing the fixing liquid L to be sent to the tank 372A. The liquid sending process corresponds to S308 to S310 in the flowchart shown in FIG. 19. This makes it possible to suppress the fixing liquid L remaining in the housing 371A or the collecting unit 373 from leaking when the power of the laser printer 301 is off. Then, at S311, the laser printer 301 is turned off.

The air supply section 379 may further include a pump for supplying air from the outside to the housing 371A. In this case, the controller 300 may drive the pump in accordance with the opening of the air supply section 379 and output a signal for causing the pump to stop in accordance with the closing of the air supply section 379.

When the laser printer 301 is activated, the controller 300 outputs, to the second pump 375B, a signal for causing the fixing liquid L to be supplied from the tank 372A to the housing 371A in a case where the signal indicating the detection result of the first sensor Set indicates that the housing 371A does not accommodate the prescribed amount of the fixing liquid L. In a case where the second liquid sending section 375 includes the second valve 375A, the controller 300 also outputs, to the second valve 375A, a signal for causing the fixing liquid L to be supplied from the tank 372A to the housing 371A. This process corresponds to SA33 in the flowchart shown in FIG. 20. Thus, when the housing 371A does not accommodate the prescribed amount of the fixing liquid L when the laser printer 301 is activated, the controller 300 supplies the fixing liquid L from the tank 372A to the housing 371A. Therefore, printing on the paper P by the laser printer 301 becomes possible.

When the laser printer 301 is activated, the controller 300 causes the fourth pump 377B to supply the fixing liquid L from the cartridge 372C to the tank 372A when the signal indicating the detection result of the second sensor Se2 indicates that the prescribed amount of the fixing liquid L is not accommodated in the tank 372A. In a case where the fourth liquid sending section 377 includes the fourth valve 377A, the controller 300 also outputs, to the fourth valve 377A, a signal for causing the fixing liquid L to be sent to the tank 372A. This process corresponds to SA34 in the flowchart shown in FIG. 20. Thus, when the prescribed amount of the fixing liquid L is not accommodated in the tank 372A when the laser printer 301 is activated, the controller 300 causes the fixing liquid L to be supplied from the cartridge 372C to the tank 372A. Therefore, supply of the fixing liquid L from the tank 372A to the housing 371A and printing on the paper P by the laser printer 301 become possible.

When the moving mode switching instruction receiving part 312 receives the instruction to switch off the moving mode, the controller 300 does not execute the above-described liquid sending process from S308 to S310 until the moving mode switching instruction receiving part 312 receives an instruction to switch on the moving mode.

As described above, the moving mode is a mode in which, when the power of the laser printer 301 is turned off to prepare for the movement of the laser printer 301 caused by the moving or the like, the fixing liquid L in the housing 371A and the like is sent to the tank 372A. In the third embodiment, the moving mode is set to on in the initial state of the laser printer 301. When the power of the laser printer 301 is turned off in a state where the moving mode is off, the liquid sending process is not executed. That is, the instruction to switch off the moving mode can be said to be an instruction to cancel the liquid sending process. When the power of the laser printer 301 is turned off in a state where the moving mode is switched from off to on, the liquid sending process, which was cancelled in the state where the moving mode is off, is executed. That is, the instruction to switch on the moving mode can be said to be an instruction to cancel the cancellation of the liquid sending process.

In the laser printer 301, it is possible to prevent the liquid sending process from being executed in accordance with the user's selection. Therefore, when the liquid sending process is unnecessary, it is possible to reduce: (i) time required for the liquid sending process when the power of the laser printer 301 is turned off, that is, time required to execute steps S308 to S310 in the flowchart shown in FIG. 19, and (ii) time required for the supply of the fixing liquid L to the housing 371A and the like when the laser printer 301 is turned on, that is, time required to execute steps SA31 to SA35 in the flowchart shown in FIG. 20. However, when the laser printer 301 is turned on, if the housing 371A was not fully filled with the fixing liquid L when the power of the laser printer 301 was last turned off, time to supply the fixing liquid L to the housing 371A is required.

Modification of Third Embodiment

A modification of the third embodiment will be described below. For convenience of explanation, members having the same functions as those in the third embodiment described above are denoted by the same reference numerals, and descriptions thereof will be omitted.

Figure 21:
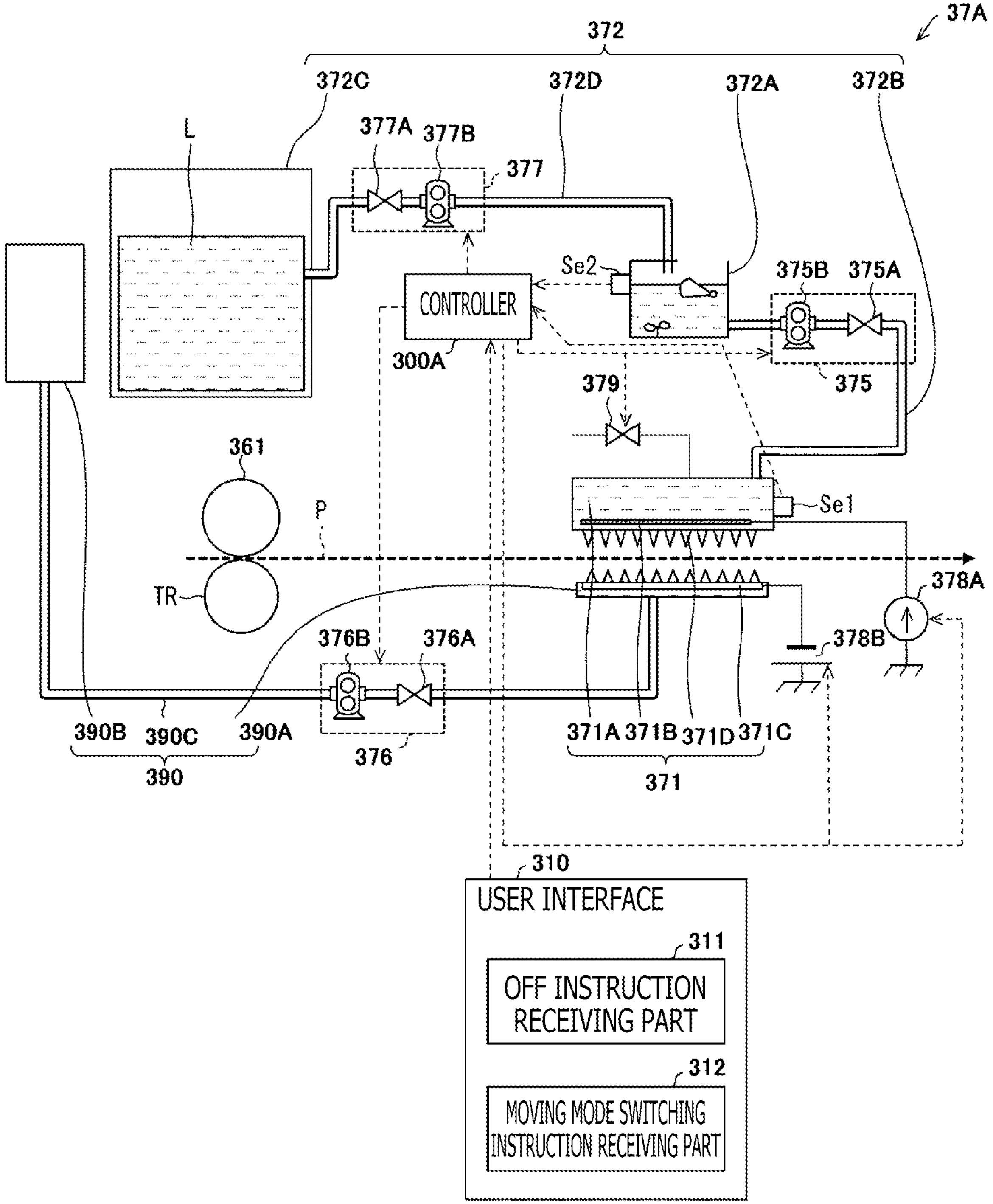
FIG. 21 is a diagram showing a modification of the fixing device according to the third embodiment.

FIG. 21 is a diagram showing a configuration of a fixing device 37A according to the modification. As shown in FIG. 21, the fixing device 37A differs from the fixing device 37 in that a second collecting unit 390 is provided in place of the collecting unit 373. The second collecting unit 390 has a collection tray 390A, a second collection tank 390B, and a second collection pipe 390C.

The collection tray 390A has the same configuration as the collection tray 373A. The second collection tank 390B accommodates the fixing liquid accommodated in the collection tray 390A. The second collection pipe 390C is connected to the collection tray 390A and the second collection tank 390B, and allows the fixing liquid L in the collection tray 390A to pass therethrough. Since the fixing liquid L sent to the second collection tank 390B is not directly reused, the second collection pipe 390C is not provided with a filter.

The second collection pipe 390C has a third liquid sending section 376 that controls collection of the fixing liquid L. Specifically, the second collection pipe 390C is provided with a third valve 376A and a third pump 376B in this order from the collection tray 390A side. The third valve 376A has a function of adjusting a flow rate of the fixing liquid L to be collected from the collection tray 390A to the second collection tank 390B by using an electromagnetic valve. The third pump 376B has a function of pressurizing the fixing liquid L by sending the fixing liquid L from the collection tray 390A to the second collection tank 390B, and is controlled by, for example, a motor (not shown). However, the third liquid sending section 376 does not necessarily need to include the third valve 376A, and may include the third pump 376B only.

In the fixing device 37A, a controller 300A executes the following liquid sending process when the off instruction receiving part 311 receives the instruction to turn off the power. In the liquid sending process, the controller 300A causes the fixing liquid L in the housing 371A to be sprayed from the nozzles 371D, and outputs, to the third pump 376B, a signal for causing the fixing liquid L collected by the collection tray 390A to be sent from the collection tray 390A to the second collection tank 390B. In a case where the third liquid sending section 376 includes the third valve 376A, the controller 300A also outputs, to the third valve 376A, a signal for causing the fixing liquid L collected by the collection tray 390A to be sent to the second collection tank 390B. Such a fixing device 37A can also suppress leaking of the fixing liquid L remaining in the housing 371A or the collection tray 390A when the power of the laser printer 301 is off.

Specific processes by the controller 300A is basically the same as the processes by the controller 300 shown in FIGS. 19 and 20. However, in steps S302, S305, S308 and S310 shown in FIG. 19, the controller 300A outputs a signal for driving or stopping the third liquid sending section 376 in place of the signal for driving the first liquid sending section 374.

Software Implementation Example

Control blocks (particularly, the controllers 300 and 300A) of the laser printer 301 and the fixing device 37 may be realized by a logic circuit (hardware) formed in an integrated circuit (IC chip) or the like, or may be realized by software.

In the latter case, the laser printer 301 and the fixing device 37 include a computer that executes instructions of a program which is software for realizing each function. The computer includes, for example, one or more processors, and also includes a computer-readable recording medium storing the program. In the computer, the processor reads the program from the recording medium and executes the program, thereby achieving the object of the present invention. As the processor, for example, a Central Processing Unit (CPU) may be used. As the recording medium, a "non-transitory physical medium" such as a Read Only Memory (ROM) or the like, a tape, a disk, a card, a semiconductor memory, a programmable logic circuit, or the like may be used. The recording medium may further include a Random Access Memory (RAM) or the like for developing the program. The program may be supplied to the computer via any transmission medium (communication network, broadcast wave, or the like) capable of transmitting the program. One aspect of the present invention may also be realized in the form of a data signal embedded in a carrier wave, in which the program is embodied by electronic transmission.

FOURTH EMBODIMENT

Next, an image forming apparatus according to a fourth embodiment of the present invention will be described in detail with reference to FIGS. 22 to 29.

In an image forming apparatus provided with a fixing device that sprays a fixing liquid accommodated in a reservoir toward a sheet to perform fixing and a collection tray that collects the fixing liquid which has not adhered to the sheet, there is a problem that it is difficult to appropriately control the amount of the fixing liquid sprayed. The fourth embodiment addresses this problem.

In the following description, directions will be described with reference to the directions shown in FIG. 22. That is, in FIG. 22, the right side when facing the plane of paper is referred to as "front side," the left side when facing the plane of paper is referred to as "rear side," the back side when facing the plane of paper is referred to as "right side," and the front side when facing the plane of paper is referred to as "left side." The vertical direction when facing the plane of paper is referred to as "up-down direction."

Figure 22:
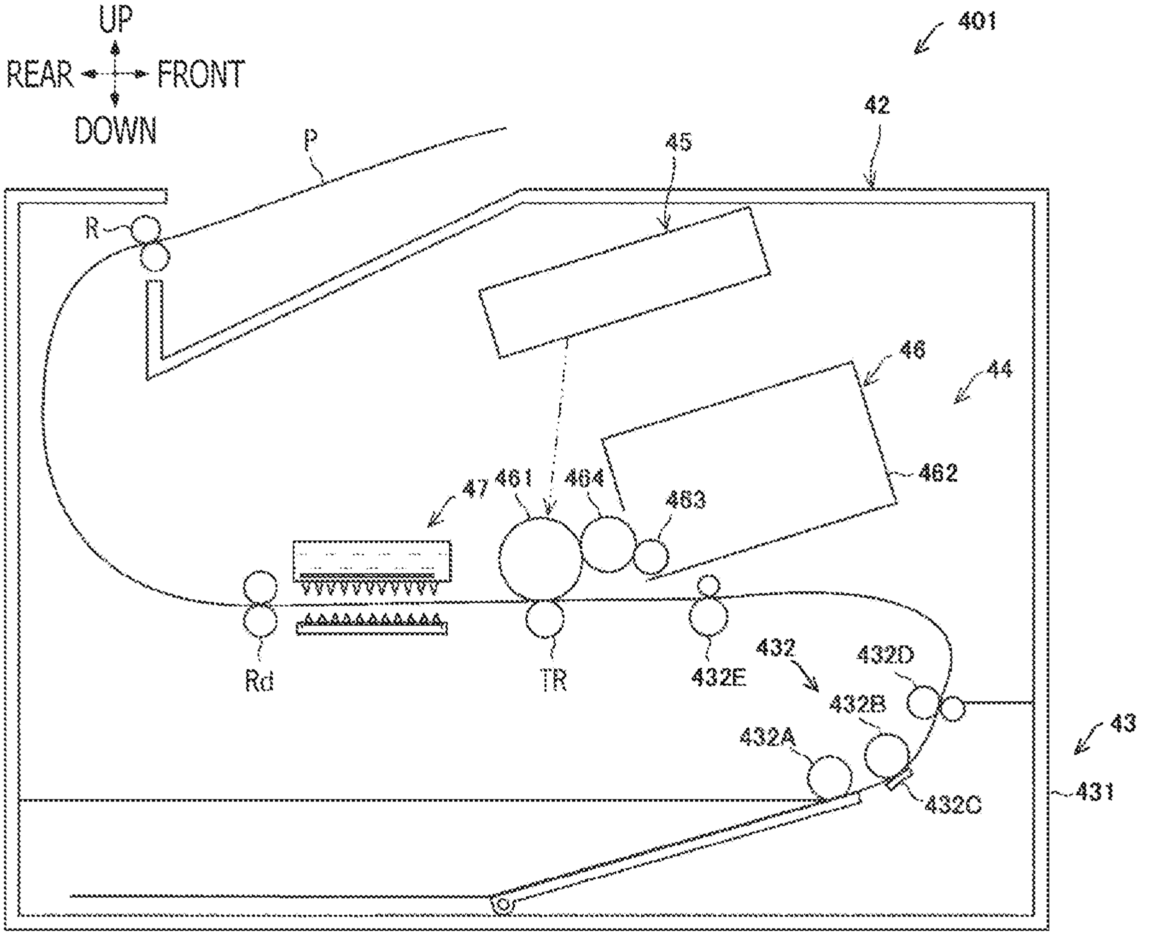
FIG. 22 is a diagram showing a configuration of a laser printer according to a fourth embodiment of the present invention.

FIG. 22 is a diagram showing a laser printer 401 as an example of an image forming apparatus according to the fourth embodiment of the present invention. As shown in FIG. 22, the laser printer 401 includes a main body housing 42, a feeder 43 for feeding a paper P as an example of a sheet, and an image forming engine 44 for forming an image on the paper P.

The feeder 43 includes a sheet feed tray 431 detachably mounted on a lower portion of the main body housing 42, and a sheet feed mechanism 432 that feeds the paper P in the sheet feed tray 431 toward the image forming engine 44. The sheet feed mechanism 432 includes a sheet feed roller 432A, a separation roller 432B, a separation pad 432C, a paper dust removing roller 432D, and a registration roller 432E. The registration roller 432E is a roller that aligns a leading end position of the paper P, and can be stopped and rotated appropriately by a controller 400 described later.

The image forming engine 44 is accommodated in the main body housing 42, and mainly includes a scanner 45, a process cartridge 46, a transfer roller TR, and a fixing device 47.

The scanner 45 is provided at an upper portion inside the main body housing 42, and includes a laser emitter, a polygon mirror, a lens, a reflecting mirror and the like which are not shown. In the scanner 45, a laser beam is irradiated onto a surface of a photosensitive drum 461 which will be described later by high-speed scanning.

The process cartridge 46 is detachable from the main body housing 42. The process cartridge 46 includes the photosensitive drum 461 on which an electrostatic latent image is to be formed, a not-shown charger, a toner reservoir 462 that accommodates toner being an example of a developer, and a supply roller 463 and a developing roller 464 that supply toner inside the toner reservoir 462 to the photosensitive drum 461.

In the process cartridge 46, the not-shown charger uniformly charges the surface of the rotating photosensitive drum 461. The scanner 45 emits a laser beam to the surface of the photosensitive drum 461 to expose the surface of the photosensitive drum 461, thereby forming an electrostatic latent image based on image data on the surface of the photosensitive drum 461.

Then, the developing roller 464, which is driven to rotate, supplies toner to the electrostatic latent image on the photosensitive drum 461, thereby forming a toner image on the surface of the photosensitive drum 461. Then, the toner image carried on the surface of the photosensitive drum 461 is attracted by the transfer roller TR when the paper P is conveyed between the photosensitive drum 461 and the transfer roller TR, and is transferred onto the paper P.

The fixing device 47 sprays the fixing liquid L onto the paper P on which the toner image is formed. Specifically, the fixing device 47 is a device that supplies charged fixing liquid L to the toner image on the paper P by electrostatic spraying to fix the toner image on the paper P. The configuration of the fixing device 47 will be described in detail later.

On the downstream side of the fixing device 47, there are provided a pair of downstream-side conveying rollers Rd that nip and convey the paper P discharged from the fixing device 47 to the downstream side. The paper P conveyed by the downstream-side conveying rollers Rd is conveyed to a sheet discharge roller R, and is discharged from the sheet discharge roller R onto a sheet discharge tray 321. Next, the configuration of the fixing device 37 will be described in detail.

Figure 23:
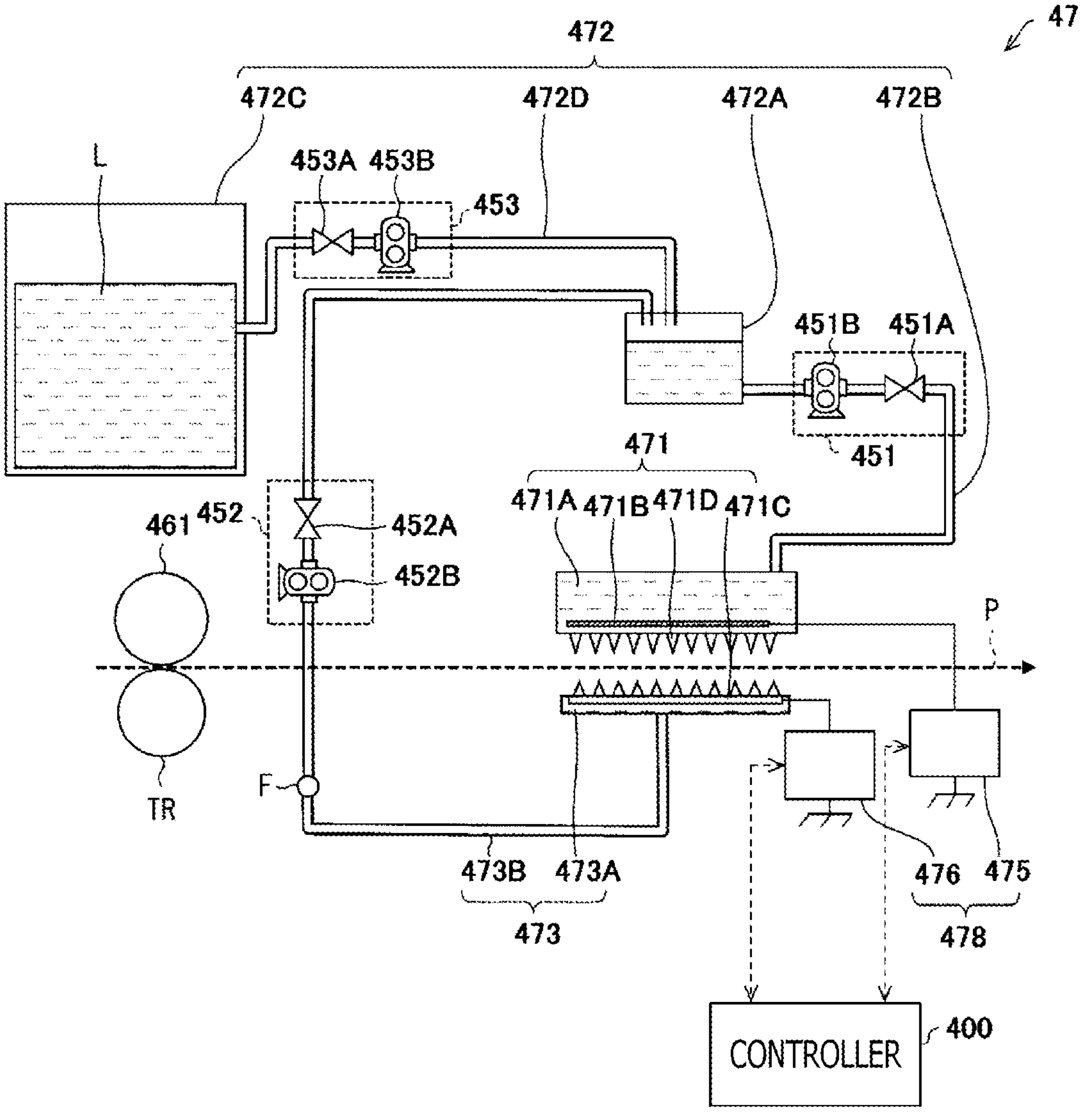
FIG. 23 is a diagram showing a specific configuration of a fixing device provided in the laser printer according to the fourth embodiment.

FIG. 23 is a diagram showing a specific configuration of the fixing device 47. As shown in FIG. 23, the fixing device 47 includes a spraying unit 471, a supply unit 472, a collecting unit 473, a first voltage generating circuit 475, a second voltage generating circuit 476, and a controller 400.

The spraying unit 471 sprays the fixing liquid L for fixing the toner transferred onto the paper P to the paper P. The spraying unit 471 has a housing 471A configured to accommodate the fixing liquid L, a nozzle electrode 471B that charges the fixing liquid L inside the housing 471A, a counter electrode 471C spaced apart from the nozzle electrode 471B, and nozzles 471D that spray the fixing liquid L inside the housing 471A to the paper P onto which the toner has been transferred when a potential difference between the nozzle electrode 471B and the counter electrode 471C is equal to or greater than a prescribed spraying potential difference (prescribed value).

As the fixing liquid L, a solution in which a solute for dissolving the toner is dispersed in a solvent having a high dielectric constant can be used in order to favorably perform electrostatic spraying and perform fixing. As the solvent having a high dielectric constant, safe water can be used. That is, in the present embodiment, the toner is dissolved by a so-called oil-in-water type emulsion in which a solute for dissolving the toner is dispersed in water. That is, a fixing liquid formed by dispersing, in water, a solute which is insoluble or hardly soluble in water being a solvent. Surfactant may be added to favorably form emulsion.

The supply unit 472 supplies the fixing liquid L to the spraying unit 471. The supply unit 472 has a tank 472A configured to accommodate the fixing liquid L, and a supply pipe 472B connected to the tank 472A and that allows the fixing liquid L accommodated in the tank 472A to pass therethrough, a cartridge 472C, and a supply pipe 472D.

The supply pipe 472B has a first liquid sending section 451 that controls the supply of the fixing liquid L. Specifically, as the first liquid sending section 451, the supply pipe 472B is provided with a first pump 451B and a first valve 451A in this order from the tank 472A side. The first pump 451B has a function of pressurizing the fixing liquid L by sending the fixing liquid L from the tank 472A to the housing 471A, and is controlled by a motor. The first valve 451A has a function of adjusting a flow rate of the fixing liquid L supplied from the tank 472A to the housing 471A by using an electromagnetic valve.

The collecting unit 473 collects the fixing liquid L sprayed from the nozzles 471D but not adhered to the paper P. The collecting unit 473 has a collection tray 473A configured to accommodate the fixing liquid L, and a collection pipe 473B connected to the collection tray 473A and that allows the fixing liquid L in the collection tray 473A to pass therethrough.

In the spraying unit 471, the housing 471A, the nozzle electrode 471B, and the nozzles 471D are disposed above the collection tray 473A. In particular, the nozzles 471D are disposed so as to spray the fixing liquid L downward. On the other hand, the counter electrode 471C is disposed in the collection tray 473A. The counter electrode 471C has a plurality of projection extending toward the nozzles 471D.

The collection pipe 473B has a second liquid sending section 452 that sends the fixing liquid L to the tank 472A. Specifically, as the second liquid sending section 452, the collection pipe 473B is provided with a second pump 452B and a second valve 452A in this order from the collection tray 473A side. The second pump 452B has a function of pressurizing the fixing liquid L by sending the fixing liquid L from the collection tray 473A to the tank 472A, and is controlled by a motor. The second valve 452A has a function of adjusting a flow rate of the fixing liquid L circulating from the collection tray 473A to the tank 472A by using an electromagnetic valve. A filter F for removing impurities from the fixing liquid L is provided to the collection pipe 473B between the collection tray 473A and the second liquid sending section 452.

The cartridge 472C is a tank that accommodates the fixing liquid L and is detachably attached to the main body housing 42. The supply pipe 472D is connected to the cartridge 472C and allows the fixing liquid L accommodated in the cartridge 472C to pass therethrough.

The supply pipe 472D has a third liquid sending section 453 that controls the supply of the fixing liquid L. Specifically, as the third liquid sending section 453, the supply pipe 472D is provided with a third valve 453A and a third pump 453B in this order from the cartridge 472C side. The third valve 453A has a function of adjusting a flow rate of the fixing liquid L supplied from the cartridge 472C to the tank 472A by using an electromagnetic valve. The third pump 453B has a function of pressurizing the fixing liquid L by sending the fixing liquid L from the cartridge 472C to the tank 472A, and is controlled by a motor.

The first voltage generating circuit 475 is connected to the nozzle electrode 471B and generates a first voltage to be applied to the nozzle electrode 471B. In the fourth embodiment, the first voltage generating circuit 475 is a constant current source that applies the first voltage V1 by outputting a constant first current I1 to the nozzle electrode 471B. The first voltage generating circuit 475 may also output a constant first voltage V1.

The second voltage generating circuit 476 is connected to the counter electrode 471C and generates a second voltage to be applied to the counter electrode 471C. In the present embodiment, the second voltage generating circuit 476 is a constant voltage source that applies a constant second voltage V2 to the counter electrode 471C. At this time, a second current I2 flows from the counter electrode 471C to the second voltage generating circuit 476.

In the example shown in FIG. 23, the fixing device 47 has a voltage generating circuit 478 including the first voltage generating circuit 475 and the second voltage generating circuit 476. That is, the first voltage generating circuit 475 and the second voltage generating circuit 476 are formed on a single voltage generating circuit board. Therefore, the number of parts of the laser printer 401 can be reduced.

The controller 400 controls the first voltage generating circuit 475 and the second voltage generating circuit 476. In the fourth embodiment, description will be made while assuming that the controller 400 controls the first voltage generating circuit 475 and the second voltage generating circuit 476 by Pulse Width Modulation (PWM) control. However, the controller 400 may control the first voltage generating circuit 475 and the second voltage generating circuit 476 by a control method other than the PWM control.

The fixing device 47 shown in FIG. 23 is an image forming apparatus provided with a collection pipe 473B for returning the fixing liquid L collected by the collection tray 473A to the tank 472A that accommodates the fixing liquid L in order to reuse the fixing liquid L collected by the collecting unit 473. In the fixing device 47, the fixing liquid L in the collection pipe 473B and the fixing liquid L in the tank 472A may be linked via the fixing liquid L adhered to an inner wall surface of the tank 472A near an inlet. In this case, in the laser printer 401, a leakage current flows through a bypass circuit formed via the nozzle electrode 471B, the supply pipe 472B, the tank 472A, the collection pipe 473B, and the counter electrode 471C.

In the fourth embodiment, the controller 400 calculates a resistance (circulation resistance Rcir1) of the bypass circuit based on the value of the first current I1 or the second current I2 when the fixing liquid L is not sprayed by the nozzles 471D. Hereinafter, description will be made while assuming that the controller 400 calculates the resistance of the bypass circuit based on the first current I1.

Figure 24:
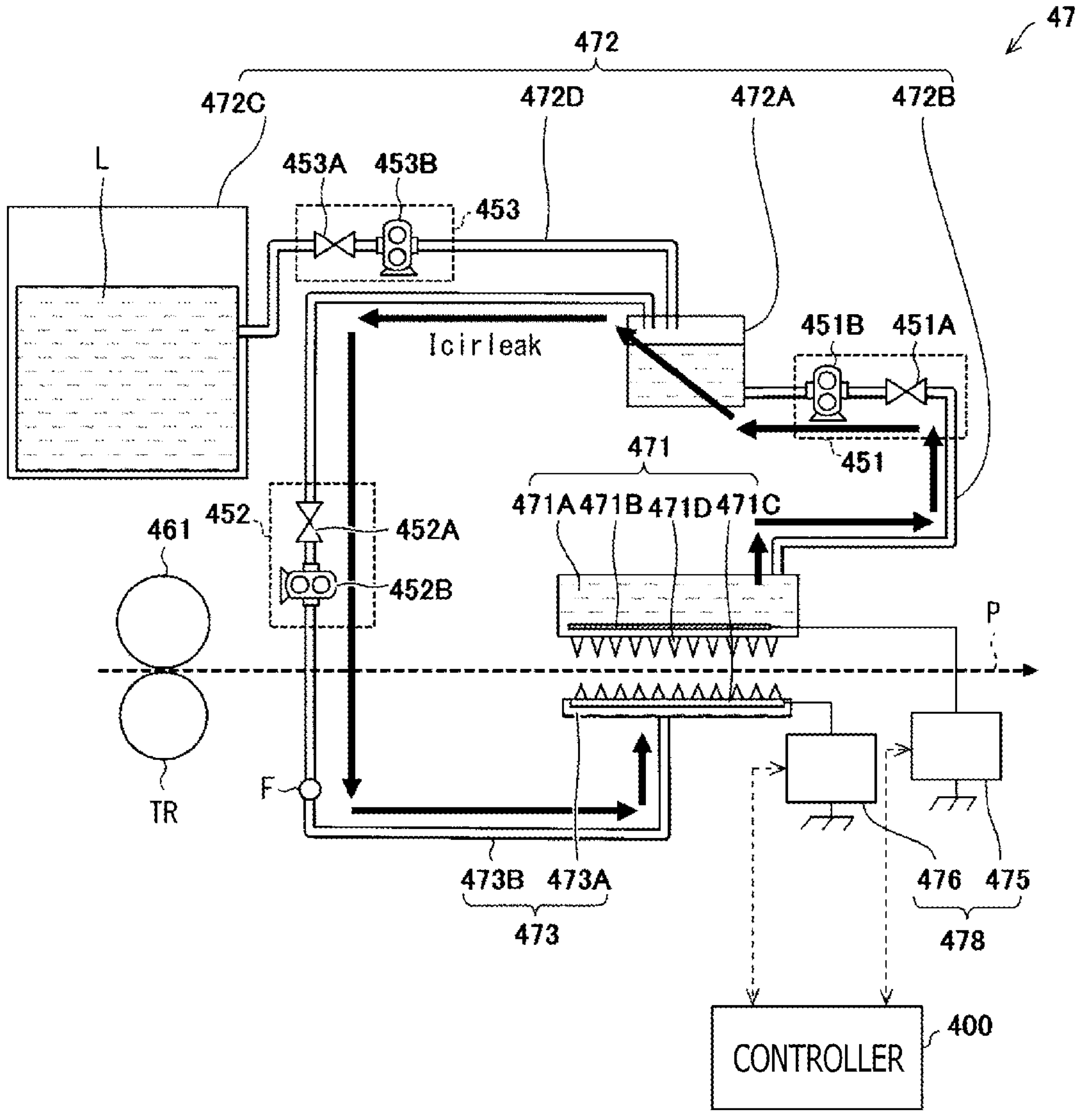
FIG. 24 is a diagram showing a bypass circuit of the fixing device provided in the laser printer according to the fourth embodiment.

FIG. 24 is a diagram showing the bypass circuit in the fixing device 47. In the fixing device 47, the bypass circuit is a circuit extending from the nozzle electrode 471B to the counter electrode 471C through the supply pipe 472B, the tank 472A, the collection pipe 473B, and the collection tray 473A, as indicated by an arrow in FIG. 24. In the normal state, since the fixing liquid L in the collection pipe 473B and the fixing liquid L in the tank 472A are separated from each other, these fixing liquids L are insulated from each other, and thus no current flows in the bypass circuit. However, when the fixing liquid L in the collection pipe 473B and the fixing liquid L in the tank 472A become electrically connected due to adhesion of the fixing liquid L to the inner wall of the tank 472A, a current Icirleak flows in the bypass circuit.

Figure 25:
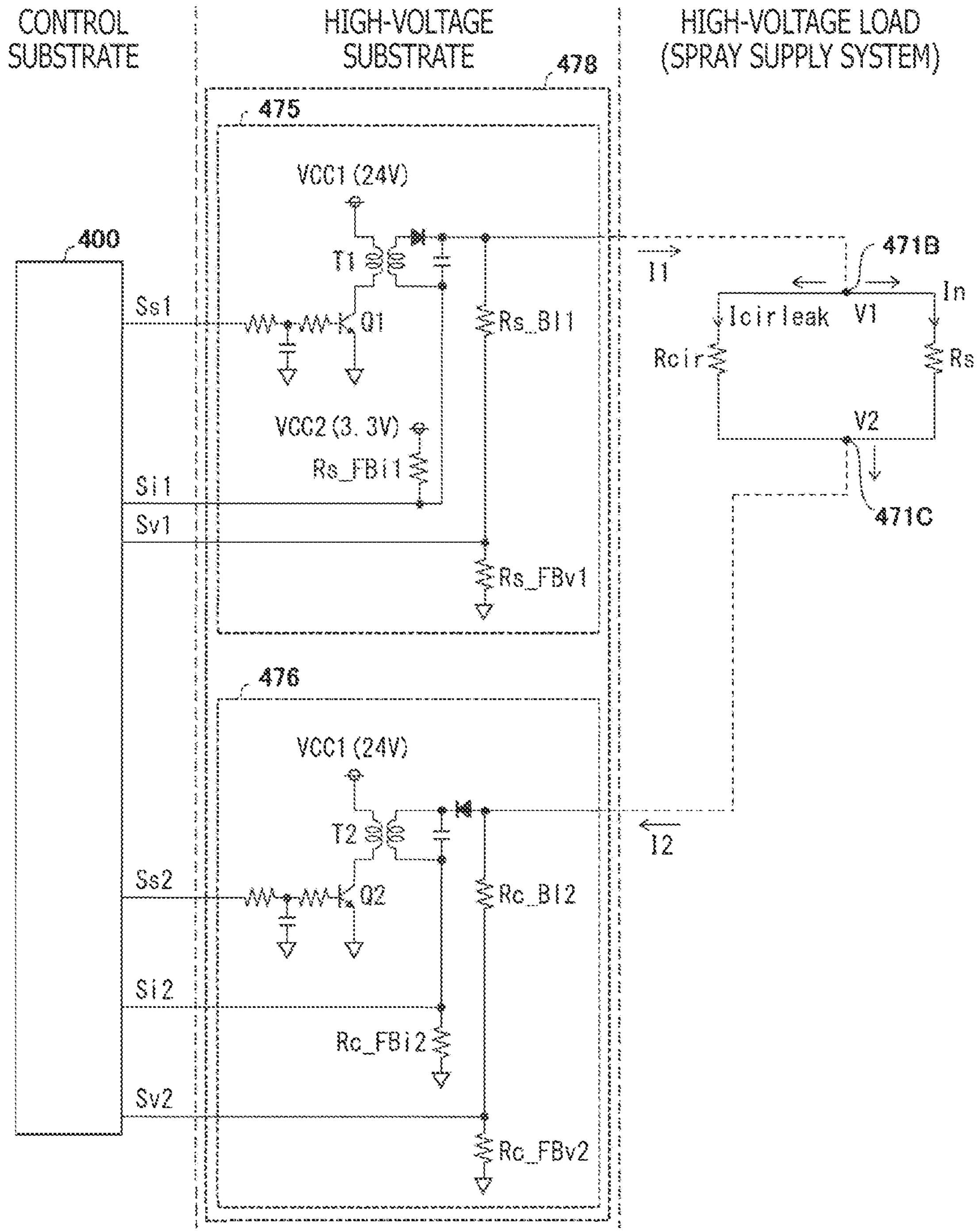
FIG. 25 is a diagram showing a schematic circuit configuration of the fixing device provided in the laser printer according to the fourth embodiment.

FIG. 25 is a circuit diagram showing a schematic configuration of the first voltage generating circuit 475 and the second voltage generating circuit 476 controlled by the controller 400. An equivalent electric circuit between the nozzle electrode 471B and the counter electrode 471C is also shown in FIG. 25.

In the equivalent electric circuit, there is a circulating resistor Rcir having the above-described circulation resistance Rcir1 between the nozzle electrode 471B and the counter electrode 471C. A current flowing through the circulating resistor Rcir is the current Icirleak.

When spraying the fixing liquid L with the nozzles 471D, a current In accompanying the spraying of the fixing liquid L flows between the nozzle electrode 471B and the counter electrode 471C. In the equivalent electric circuit, the current In accompanying the spraying is expressed as a current flowing through a resistor Rs connected in parallel with the circulating resistor Rcir. Since the current In accompanying the spraying is a current corresponding to an amount of the fixing liquid L sprayed per unit time, the laser printer 401 performs control so that the current In accompanying the spraying falls within a set target current range in order to obtain a required spray state.

The first voltage generating circuit 475 is a DC-DC converter that chops a DC voltage VCC1 connected to a primary side of a transformer T1 by a switching element Q1 and outputs a DC power obtained by voltage conversion through a rectifying and smoothing circuit connected to a secondary side of the transformer T1. The first voltage generating circuit 475 can apply a positive voltage to the nozzle electrode 471B.

On and off of the switching element Q1 is controlled by a switching control signal Ss1 generated by the controller 400. The first voltage V1 which is an output voltage of the first voltage generating circuit 475 is proportionally divided by a resistor Rs_Bl1 and a shunt resistor Rs_FBv1 to be a first voltage signal Sv1. The first voltage V1 is monitored by the controller 400 through the first voltage signal Sv1 which depends on a magnitude of the first voltage V1.

The first current I1 which is an output current from the first voltage generating circuit 475 is monitored by the controller 400 through a first current signal Si1 which is based on a voltage applied to a shunt resistor RS_Fbi1 by the first current I1. That is, the shunt resistor RS_Fbi1 configures a current detection circuit that generates the first current signal Si1.

Similarly, the second voltage generating circuit 476 is a DC-DC converter that chops a DC voltage VCC1 connected to a primary side of a transformer T2 by a switching element Q2 and outputs a DC power obtained by voltage conversion through a rectifying and smoothing circuit connected to a secondary side of the transformer T2. The second voltage generating circuit 476 can apply a negative voltage to the counter electrode 471C.

On and off of the switching element Q2 is controlled by a switching control signal Ss2 generated by the controller 400. The second voltage V2 which is an output voltage of the second voltage generating circuit 476 is proportionally divided by a resistor Rc_Bl2 and a resistor Rc_FBv2 to be a second voltage signal Sv2. The second voltage V2 is monitored by the controller 400 through the second voltage signal Sv2 which depends on a magnitude of the second voltage V2.

The second current I2 which is an output current from the second voltage generating circuit 476 is monitored by the controller 400 through a second current signal Si2 which is based on a voltage applied to the shunt resistor Rc_Fbi2. That is, the shunt resistor Rc_Fbi2 configures a current detection circuit that generates the second current signal Si2.

The controller 400 refers to the magnitude of the first voltage V1 monitored in this manner and adjusts the switching control signal Ss1 to cause the first voltage generating circuit 475 to output the first voltage V1 of a required magnitude. Alternatively, the controller 400 refers to the magnitude of the first current I1 or the second current I2 to adjust the switching control signal Ss1 to cause the first voltage generating circuit 475 to output the first current I1 of a required current value.

The controller 400 also refers to the magnitude of the second voltage V2 monitored in this manner and adjusts the switching control signal Ss2 to cause the second voltage generating circuit 476 to output the second voltage V2 of a required magnitude.

Before spraying the fixing liquid L with the nozzles 471D, the controller 400 controls the first voltage generating circuit 475 and the second voltage generating circuit 476 so that the potential difference between the nozzle electrode 471B and the counter electrode 471C becomes less than the spraying potential difference. Then, the controller 400 calculates the resistance of the bypass circuit from the value of the current detected by the current detection circuit and the potential difference between the nozzle electrode 471B and the counter electrode 471C.

In the fourth embodiment, before the spraying of the fixing liquid L with the nozzles 471D, the controller 400 applies a negative voltage to the counter electrode 471C using the second voltage generating circuit 476 while not causing the first voltage generating circuit 475 to apply a voltage to the nozzle electrode 471B, and controls the second voltage generating circuit 476 so that the potential difference between the nozzle electrode 471B and the counter electrode 471C becomes less than the spraying potential difference. The voltage applied to the counter electrode 471C by the controller 400 using the second voltage generating circuit 476 is, for example, −2 kV. By controlling the first voltage generating circuit 475 and the second voltage generating circuit 476 in this manner, the controller 400 can generate a potential difference between the nozzle electrode 471B and the counter electrode 471C while not causing the nozzles 471D to spray the fixing liquid L and calculate the resistance of the bypass circuit.

Before the spraying of the fixing liquid L with the nozzles 471D, the controller 400 may apply a positive voltage to the nozzle electrode 471B using the first voltage generating circuit 475 while not causing the second voltage generating circuit 476 to apply a voltage to the counter electrode 471C, and may control the first voltage generating circuit 475 so that the potential difference between the nozzle electrode 471B and the counter electrode 471C becomes less than the spraying potential difference. In this case, the controller 400 sets the voltage to be applied to the nozzle electrode 471B using the first voltage generating circuit 475 to, for example, 2 kV. By controlling the first voltage generating circuit 475 and the second voltage generating circuit 476 in this manner, the controller 400 can generate a potential difference between the nozzle electrode 471B and the counter electrode 471C while not causing the nozzles 471D to spray the fixing liquid L and calculate the resistance of the bypass circuit.

When spraying the fixing liquid L using the nozzles 471D, the controller 400 controls the first voltage generating circuit 475 and the second voltage generating circuit 476 so that the potential difference between the nozzle electrode 471B and the counter electrode 471C becomes equal to or greater than the spraying potential difference. At this time, the controller 400 sets a target current range for a current value to be detected by a current detection circuit based on a preset target current value for spraying an appropriate amount of the fixing liquid L.

The controller 400 also calculates a current value Ifix for correction from the potential difference between the nozzle electrode 471B and the counter electrode 471C and the resistance of the bypass circuit. The controller 400 determines whether or not a current value obtained by correcting the current value detected by the current detection circuit with the current value Ifix for correction is within the target current range, and when the corrected current value is outside the target current range, the controller 400 controls the first voltage generating circuit 475 and the second voltage generating circuit 476 so that the corrected current value falls within the target current range.

Specifically, the controller 400 calculates the corrected current value by subtracting the current value Ifix for correction from the current value detected by the current detection circuit. The corrected current value is a net current value flowing between the nozzle electrode 471B and the counter electrode 471C obtained by subtracting a current value flowing through the bypass circuit from the current value detected by the current detection circuit. Therefore, the net current value flowing between the nozzle electrode 471B and the counter electrode 471C can be made to fall within the target current range and the appropriate amount of the fixing liquid L can be sprayed by the controller 400 controlling the first voltage generating circuit 475 and the second voltage generating circuit 476 so that the corrected current falls within the target current range.

Hereinafter, control of the laser printer 401 by the controller 400 will be described. In the following description, the controller 400 controls the laser printer 401 using the first current I1 monitored using the shunt resistor RS_Fbi1 as the current detection circuit. However, the controller 400 may control the laser printer 401 using the second current I2 monitored using the shunt resistor Rc_Fbi2 as the current detection circuit.

Figure 26:
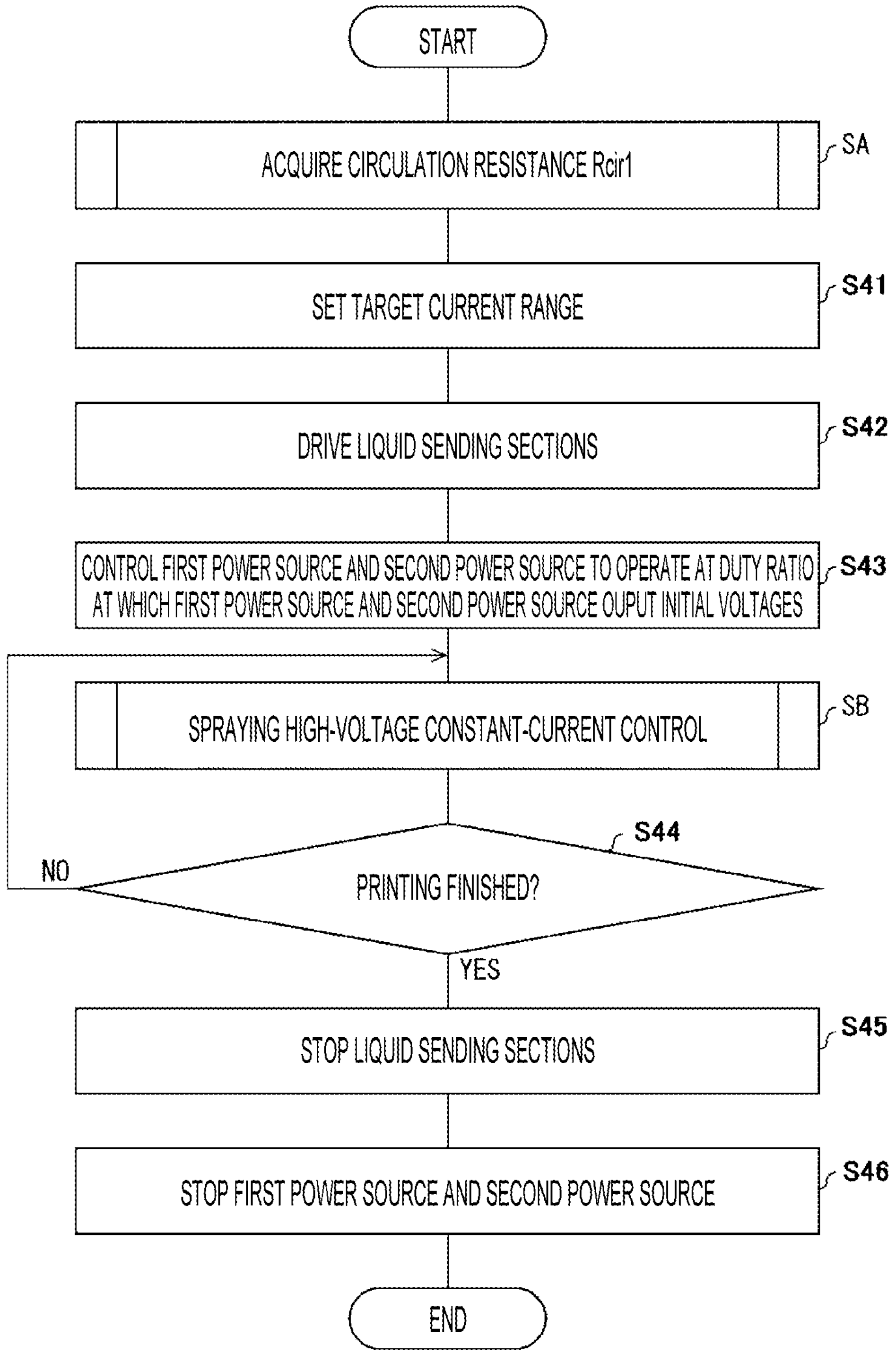
FIG. 26 is a flowchart showing a process by a controller for a case where the laser printer according to the fourth embodiment forms an image on a paper.

FIG. 26 is a flowchart showing processes by the controller 400 when the laser printer 401 forms (prints) an image on the paper P. First, the controller 400 acquires the circulation resistance Rcir1 (SA). A content of the process for acquiring the circulation resistance Rcir1 will be described later.

The controller 400 sets the target current range as a target of the current when spraying the fixing liquid L (S41). The target current range is a range of Is −α or more and Is+α or less with respect to a target current value Is. The target current value Is is a value that is set in advance and is stored in a not-shown storage. The value of a is a value that is appropriately set in accordance with printing conditions or the like and is, for example, set to 50 mA.

Then, the controller 400 outputs a signal for driving the first liquid sending section 451, the second liquid sending section 452, and the third liquid sending section 453 (S42). The controller 400 also outputs a PWM signal for causing the first voltage generating circuit 475 and the second voltage generating circuit 476 to operate at a duty ratio at which the first voltage generating circuit 475 and the second voltage generating circuit 476 output initial voltages (S43). For example, the controller 400 causes the first voltage generating circuit 475 and the second voltage generating circuit 476 to operate so that a potential difference of 5 kV is generated between the nozzle electrode 471B and the counter electrode 471C. In this state, the controller 400 executes a spraying high-voltage constant-current control for spraying the appropriate amount of the fixing liquid L (SB). A content of the spraying high-voltage constant-current control will be described later. The controller 400 also executes process operations such as charging of the photosensitive drum 461, development on the photosensitive drum 461 by the developing roller 464, and transfer of toner from the photosensitive drum 461 to the paper P in parallel with step SB.

The controller 400 determines whether or not printing is finished (S44), and continues step SB until the printing is finished (NO in S44) When the printing is finished (YES in S44), the controller 400 outputs a signal for causing the first liquid sending section 451, the second liquid sending section 452, and the third liquid sending section 453 to stop (S45). The controller 400 also outputs a signal for causing the first voltage generating circuit 475 and the second voltage generating circuit 476 to stop (S46).

Figure 27:
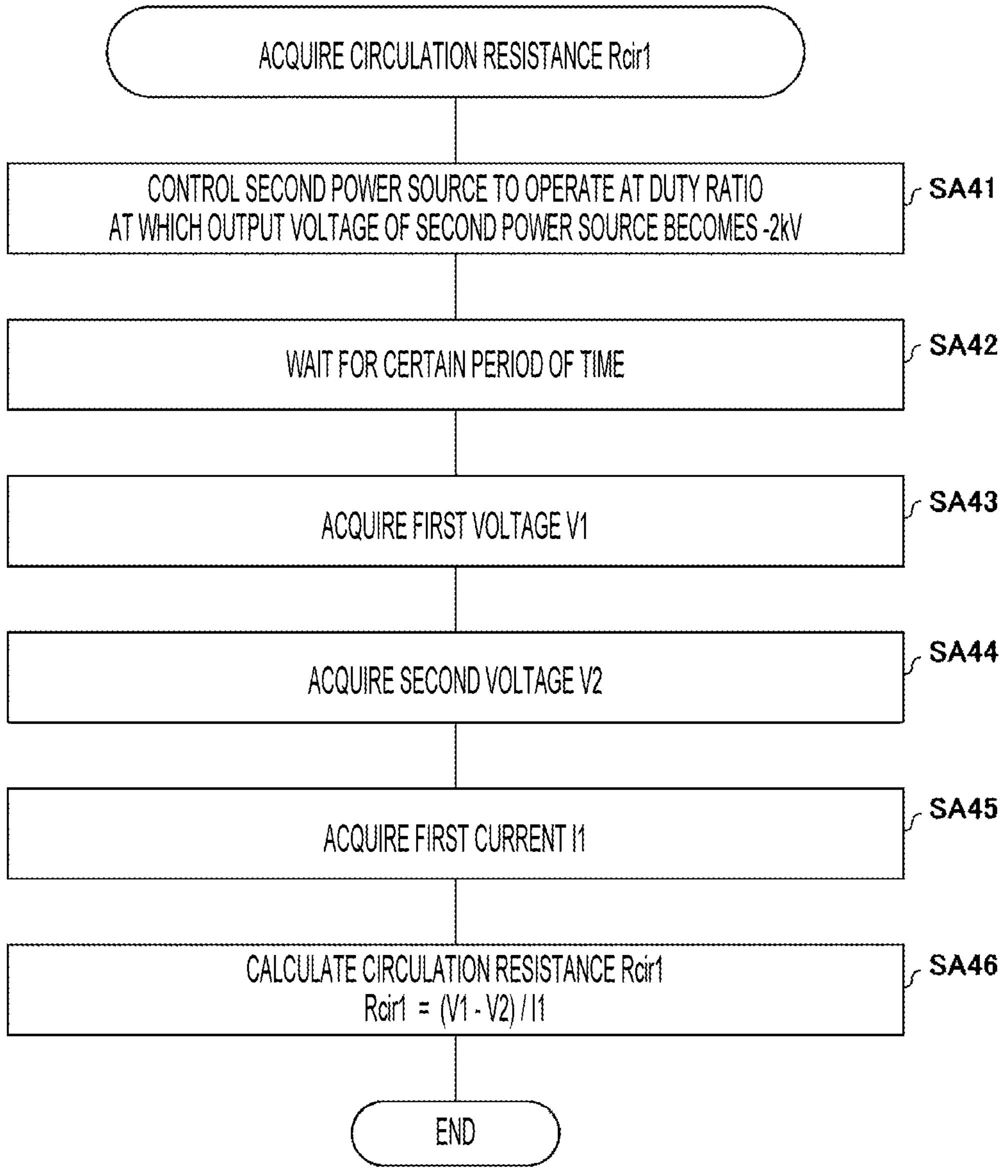
FIG. 27 is a flowchart showing a process by the controller according to the fourth embodiment for calculating a circulation resistance.

FIG. 27 is a flowchart showing a process in which the controller 400 calculates the circulation resistance Rcir1. The controller 400 outputs a PWM signal for causing the second voltage generating circuit 476 to operate at a duty ratio at which the output voltage of the second voltage generating circuit 476 becomes −2 kV (SA41). At this time, the first voltage generating circuit 475 does not apply a voltage to the nozzle electrode 471B. In this state, the controller 400 waits for a certain period of time (SA42). The certain period of time is a period of time long enough for the output current of the second voltage generating circuit 476 to reach a steady state and is, for example, 3 seconds.

After the end of step SA42, the controller 400 acquires the actual first voltage V1 of the nozzle electrode 471B from the first voltage generating circuit 475 (SA43), and acquires the actual second voltage V2 of the counter electrode 471C from the second voltage generating circuit 476 (SA44). The controller 400 also acquires the first current I1 from the current detection circuit (SA45). The order of steps SA43 to SA45 is arbitrary. The controller 400 further calculates the circulation resistance Rcir1 by the following equation (1) (SA46).

$$R\text{cir1}=(V1-V2)/I1 \quad (1)$$

The first current I1 here is equal to the current Icirleak flowing through the bypass circuit.

Figure 28:
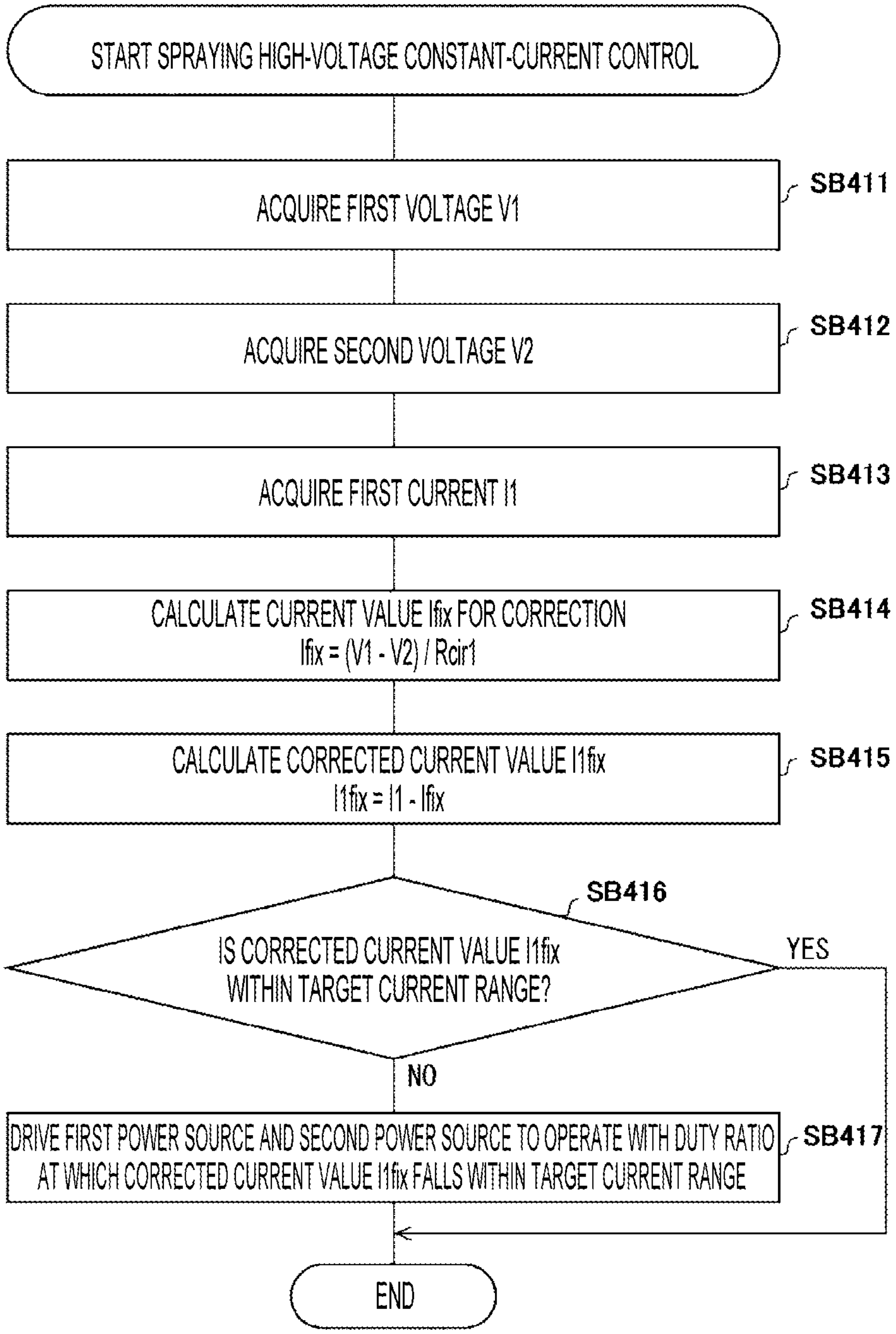
FIG. 28 is a flowchart showing a process by the controller according to the fourth embodiment for controlling a first voltage generating circuit and a second voltage generating circuit to spray fixing liquid.

FIG. 28 is a flowchart showing a process in which, in the fourth embodiment, the controller 400 controls the first voltage generating circuit 475 and the second voltage generating circuit 476 to spray the fixing liquid L. First, the controller 400 acquires the first voltage V1 from the first voltage generating circuit 475 (SB411) and acquires the second voltage V2 from the second voltage generating circuit 476 (SB412). The controller 400 further acquires the first current I1 from the current detection circuit (SB413). The order of steps SB411 to SB413 is arbitrary. The controller 400 may also execute two or more of steps SB411 to SB413 in parallel.

Using the first voltage V1, the second voltage V2, and the circulation resistance Rcir1 calculated in step SA, the controller 400 calculates the current value Ifix for correction by the following equation (2) (SB414).

$$I\text{fix}=(V1-V2)/R\text{cir1} \quad (2)$$

Step SB414 may be executed prior to step SB413.

The controller 400 further calculates the corrected current value I1fix by the following equation (3) using the first current I1 and the current value Ifix for correction (SB415).

$$I1\text{fix}=I1-I\text{fix} \quad (3)$$

The controller 400 determines whether or not the corrected current value I1fix is within the target current range (SB416). When the corrected current value I1fix is not within the target current range (NO in SB416), the controller 400 outputs a PWM signal for causing the first voltage generating circuit 475 and the second voltage generating circuit 476 to operate with a duty ratio at which the corrected current value I1fix falls within the target current range (SB417). When the corrected current value I1fix is within the target current range (YES in SB416), the controller 400 ends the process without executing step SB417.

As described above, in the laser printer 401 according to the fourth embodiment, a bypass circuit may be formed by a flow path for collecting and reusing the fixing liquid L that has not adhered to the paper P. In the fourth embodiment, the controller 400 calculates the current value Ifix for correction, which is the current flowing in the bypass circuit during spraying, by using the circulation resistance Rcir1 calculated before spraying the fixing liquid L. Further, the controller 400 controls the first voltage generating circuit 475 and the second voltage generating circuit 476 so that the corrected current value I1fix obtained by correcting the first current I1 using the current value Ifix for correction falls within the target current range. Therefore, it is possible to realize an image forming apparatus in which the amount of the fixing liquid sprayed can be appropriately adjusted while allowing the collected fixing liquid to be reused.

Modification of Fourth Embodiment

A modification of the fourth embodiment will be described below. The laser printer 401 according to the modification is different from the laser printer 401 according to the fourth embodiment described above only in the process by the controller 400 for spraying the fixing liquid from the nozzles (the process of the spraying high-voltage constant-current control). For convenience of explanation, members having the same functions as those described in the fourth embodiment are denoted by the same reference numerals, and descriptions thereof will be omitted.

In the modification, the controller 400 determines whether or not the current value detected by the current detection circuit is within the target current range corrected using the current value for correction, and when the current value detected by the current detection circuit is outside the corrected target current range, the controller 400 controls the first voltage generating circuit 475 and the second voltage generating circuit 476 so that the current value detected by the current detection circuit falls within the corrected target current range. By such control by the controller 400, the net current value flowing between the nozzle electrode 471B and the counter electrode 471C can be made to fall within the target current range and the appropriate amount of the fixing liquid L can be sprayed.

Figure 29:
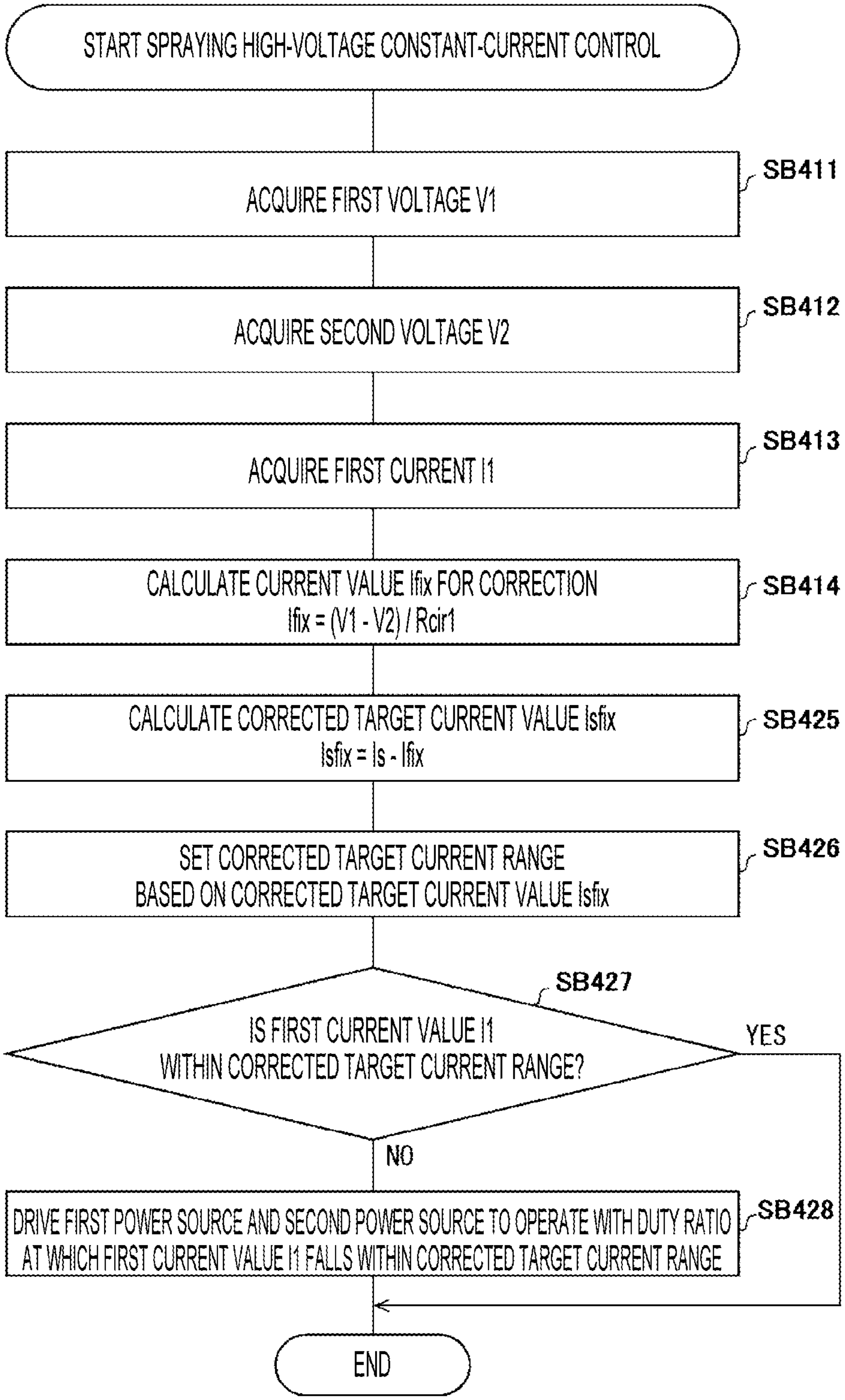
FIG. 29 is a modification of the flowchart showing the process by the controller according to the fourth embodiment for controlling the first voltage generating circuit and the second voltage generating circuit to spray the fixing liquid.

FIG. 29 is a flowchart showing a process in the modification in which the controller 400 controls the first voltage generating circuit 475 and the second voltage generating circuit 476 to spray the fixing liquid L. As in the fourth embodiment, the controller 400 executes steps SB411 to SB414. Then, the controller 400 calculates a corrected target current value Isfix by the following equation (4) using the target current value Is and the current value Ifix for correction (SB425).

$$Isfix = Is + Ifix \quad (4)$$

The controller 400 sets the corrected target current range based on the corrected target current value Isfix (SB426). The procedure for setting the corrected target current range is the same as the procedure for setting the target current range in step S1 described above except that the corrected target current value Isfix is used in place of the target current value Is.

The controller 400 determines whether or not the first current I1 is within the corrected target current range (SB427). When the first current I1 is not within the corrected target current range (NO in SB427), the controller 400 outputs a PWM signal for causing the first voltage generating circuit 475 and the second voltage generating circuit 476 to operate at a duty ratio at which the first current I1 falls within the corrected target current range (SB428). When the first current I1 is within the corrected target current range (YES in SB427), the controller 400 ends the process without changing the duty ratio.

As described above, in the modification, the controller 400 controls the first voltage generating circuit 475 and the second voltage generating circuit 476 so that the first current I1 falls within the corrected target current range corrected by the current value Ifix for correction. Therefore, it is possible to realize an image forming apparatus capable of appropriately adjusting the amount of the fixing liquid sprayed while enabling reuse of the collected fixing liquid.

Software Implementation

Control blocks of the laser printer 401 (especially the controller 400) may be realized by logic circuits (hardware) formed in integrated circuits (IC chips) or the like, or may be realized by software.

In the latter case, the laser printer 401 includes a computer that executes instructions of a program which is software for realizing each function. The computer includes, for example, one or more processors, and also includes a computer-readable recording medium storing the program. In the computer, the processor reads the program from the recording medium and executes the program, thereby achieving the object of the present invention. As the processor, for example, a Central Processing Unit (CPU) may be used. As the recording medium, a "non-transitory physical medium" such as a Read Only Memory (ROM) or the like, a tape, a disk, a card, a semiconductor memory, a programmable logic circuit, or the like may be used. The recording medium may further include a Random Access Memory (RAM) or the like for developing the program. The program may be supplied to the computer via any transmission medium (communication network, broadcast wave, or the like) capable of transmitting the program. One aspect of the present invention may also be realized in the form of a data signal embedded in a carrier wave, in which the program is embodied by electronic transmission.

Arbitrary configurations and processes in the first to fourth embodiments and their modifications may be combined with configurations and processes of different embodiments.

The first supply pipe 112, the cartridge supply pipe 372D, and the supply pipe 472D are examples of a refill pipe according to aspects of the present disclosure. The first supply pump 113, the fourth pump 377B, and the third pump 453B are examples of a refill pump according to aspects of the present disclosure. The second supply pump 119, the second pump 375B, and the first pump 451B are examples of a supply pump according to aspects of the present disclosure. The second supply pipe 118 is an example of a supply pipe according to aspects of the present disclosure. The jetting device 9, the spraying unit 371, and the spraying unit 471 are examples of a spraying device according to aspects of the present disclosure. The supply unit 372 and the supply unit 472 are examples of a supplying device according to aspects of the present disclosure. The collecting unit 373 and the collecting unit 473 are examples of a collecting device according to aspects of the present disclosure. The tank 372A and the tank 472A are examples of a supply tank according to aspects of the present disclosure. The cartridge 372C and the cartridge 472C are examples of a fixing liquid cartridge according to aspects of the present disclosure. The first valve 374A and the second valve 452A are examples of a collection valve according to aspects of the present disclosure. The first pump 374B and the second pump 452B are examples of a collection pump according to aspects of the present disclosure.

What is claimed is:

1. An image forming apparatus, comprising:

a photosensitive drum;

a developing device configured to supply toner onto the photosensitive drum;

a transfer device configured to transfer the toner supplied onto the photosensitive drum onto a sheet;

a spraying device configured to spray a fixing liquid for fixing the toner onto the sheet toward the sheet onto which the toner has been transferred, the spraying device including a housing configured to accommodate the fixing liquid and nozzles configured to spray the fixing liquid inside the housing; and a collecting device configured to collect the fixing liquid sprayed from the spraying device toward the sheet and did not adhere to the sheet, the collecting device including a collection tray configured to accommodate the fixing liquid, a collection pipe connected to the collection tray and configured to allow the fixing liquid in the collection tray to pass therethrough, and a collection pump configured to send the fixing liquid in the collection pipe toward the housing.

2. The image forming apparatus according to claim 1, further comprising:

a main body housing; and a supplying device configured to supply the fixing liquid to the housing, wherein the supplying device includes:

a fixing liquid cartridge configured to accommodate the fixing liquid, the fixing liquid cartridge being attachable to the main body housing;

a refill pipe connected to the fixing liquid cartridge in a state where the fixing liquid cartridge is attached to the main body housing and configured to allow the fixing liquid in the fixing liquid cartridge to pass therethrough;

a supply tank connected to the refill pipe and configured to accommodate the fixing liquid that has passed through the refill pipe; and a supply pipe connected to the supply tank and configured to allow the fixing liquid in the supply tank to pass therethrough, and wherein the housing is connected to the supply pipe and is configured to accommodate the fixing liquid that has passed through the supply pipe.

3. The image forming apparatus according to claim 2, wherein:

the collection pipe is connected to the supply tank, and the collection pump sends the fixing liquid in the collection pipe to the housing via the supply tank.

4. The image forming apparatus according to claim 2, comprising a refill pump configured to send the fixing liquid in the refill pipe toward the supply tank.

5. The image forming apparatus according to claim 2, wherein the collecting device includes a collection valve configured to prevent the fixing liquid in the collection tray from passing through the collection pipe and being sent to the supply tank.

6. The image forming apparatus according to claim 2, wherein:

the collection pipe is connected to the refill pipe, and the refill pipe allows the fixing liquid that has passed through the collection pipe to path therethrough.

7. The image forming apparatus according to claim 2, comprising:

a collection tank connected to the collection pipe and configured to accommodate the fixing liquid that has passed through the collection pipe; and a second collection pipe connected to the collection tank and configured to allow the fixing liquid in the collection tank to path therethrough, wherein the housing is connected to the second collection pipe and is configured to accommodate the fixing liquid that has passed through the second collection pipe.

8. The image forming apparatus according to claim 1, further comprising a control device, Wherein the control device is configured to drive the collection pump to send the fixing liquid in the collection tray toward the housing when execution of a print job is finished.

9. The image forming apparatus according to claim 8, wherein the control device counts a first cumulative number of pages being a cumulative number of pages printed after the previous driving of the collection pump.

10. The image forming apparatus according to claim 9, wherein the control device lengthens a driving time of the collection pump as the first cumulative number of pages increases.

11. The image forming apparatus according to claim 9, further comprising a supplying device configured to supply the fixing liquid to the spraying device, the supplying device including:

a supply tank configured to accommodate the fixing liquid to be supplied to the spraying device; and a sensor configured to detect whether or not an amount of the fixing liquid in the supply tank is less than a prescribed amount, wherein the control device stores a first set value being a number of pages that can be continuously printed by the prescribed amount of the fixing liquid and a second set value being set based on a capacity of the collection tray, and in a case where the first cumulative number of pages is less than the first set value and a new print job is received during the driving of the collection pump, the control device:

executes the new print job after the driving of the collection pump when the first cumulative number of pages is equal to or greater than the second set value; or executes the driving of the collection pump after executing the new print job when the first cumulative number of pages is less than the second set value.

12. The image forming apparatus according to claim 11, wherein when the first cumulative number of pages is less than the first set value and the new print job is received during the driving of the collection pump, and the first cumulative number of pages is less than the second set value, in the driving of the collection pump after the new print job, based on the first cumulative number of pages to which a number of pages printed in the new print job is added, the control device lengthens a driving time of the collection pump in the driving of the collection pump as the first cumulative number of pages increases.

13. The image forming apparatus according to claim 11, wherein when the first cumulative number of pages becomes equal to or greater than the first set value during execution of a print job, the control device aborts execution of the print job and executes the driving of the collection pump.

14. The image forming apparatus according to claim 9, wherein the control device resets the first cumulative number of pages when the driving of the collection pump is completed.

15. The image forming apparatus according to claim 8, comprising a supplying device configured to supply the fixing liquid to the spraying device, the supplying device including:

a supply tank configured to accommodate the fixing liquid to be supplied to the spraying device;

a fixing liquid cartridge configured to accommodate the fixing liquid to be supplied to the supply tank;

a refill pipe connected to the fixing liquid cartridge and the supply tank and configured to allow the fixing liquid moving from the fixing liquid cartridge to the supply tank to pass therethrough;

a refill pump configured to send the fixing liquid in the refill pipe toward the supply tank; and a sensor configured to detect whether or not an amount of the fixing liquid in the supply tank is less than a prescribed amount.

16. The image forming apparatus according to claim 1, further comprising:

an off instruction receiving part configured to receive an instruction to turn off power; and a control device, wherein the control device causes the nozzles to spray the fixing liquid in the housing and drives the collection pump to send the fixing liquid in the collection tray toward the housing when the off instruction receiving part receives the instruction to turn off the power.

17. The image forming apparatus according to claim 16, further comprising a supplying device configured to supply the fixing liquid toward the spraying device and including a supply tank configured to accommodate the fixing liquid, wherein the collection pipe is connected to the supply tank, and wherein the collection pump sends the fixing liquid in the collection pipe to the housing via the supply tank.

18. The image forming apparatus according to claim 17, wherein the supplying device further includes:

a supply pipe connected to the supply tank and the housing;

a supply pump configured to supply the fixing liquid in the supply tank toward the housing through the supply pipe; and a first sensor configured to detect an accommodation state of the fixing liquid in the housing, wherein when the image forming apparatus is turned on, the control device causes the supply pump to supply the fixing liquid from the supply tank to the housing when a detection result of the first sensor indicates that a prescribed amount of the fixing liquid is not accommodated in the housing.

19. The image forming apparatus according to claim 18, further comprising a second sensor configured to detect an accommodation state of the fixing liquid in the supply tank, wherein the supplying device further includes:

a fixing liquid cartridge configured to accommodate the fixing liquid;

a refill pipe connected to the fixing liquid cartridge and configured to allow the fixing liquid accommodated in the fixing liquid cartridge to pass therethrough; and a refill pump configured to supply the fixing liquid in the fixing liquid cartridge to the supply tank through the refill pipe, wherein when the image forming apparatus is turned on, the control device causes the refill pump to execute refilling of the supply tank with the fixing liquid from the fixing liquid cartridge when the detection result of the second sensor indicates that a prescribed amount of the fixing liquid is not accommodated in the supply tank.

20. The image forming apparatus according to claim 17, further comprising a cancel instruction receiving part configured to receive an instruction to cancel the driving of the collection pump and an instruction to cancel the cancellation of the driving of the collection pump, wherein when the cancel instruction receiving part receives the instruction to cancel the driving of the collection pump, the control device does not execute the driving of the collection pump until the cancel instruction receiving part subsequently receives the instruction to cancel the cancellation of the driving of the collection pump.

* * * * *